United States Patent
Zhang

(10) Patent No.: US 11,388,446 B2
(45) Date of Patent: Jul. 12, 2022

(54) ENCODING METHOD, DECODING METHOD, AND APPARATUS

(71) Applicant: HUAWEI TECHNOLOGIES CO., LTD., Guangdong (CN)

(72) Inventor: Dejun Zhang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/930,655

(22) Filed: Jul. 16, 2020

(65) Prior Publication Data
US 2020/0351522 A1  Nov. 5, 2020

Related U.S. Application Data

(63) Continuation of application No. PCT/CN2018/112215, filed on Oct. 26, 2018.

(30) Foreign Application Priority Data

Jan. 17, 2018 (CN) .................. 201810045808.X

(51) Int. Cl.
*H04N 19/00* (2014.01)
*H04N 19/90* (2014.01)
(Continued)

(52) U.S. Cl.
CPC .......... *H04N 19/90* (2014.11); *H04N 19/176* (2014.11); *H04N 19/597* (2014.11)

(58) Field of Classification Search
CPC .......... G06T 9/001; G06T 2207/10028; G06T 17/20; G06T 9/004; H04N 19/90;
(Continued)

(56) References Cited

U.S. PATENT DOCUMENTS

| 7,689,051 B2 | 3/2010 | Mukerjee | |
|---|---|---|---|
| 2011/0205338 A1* | 8/2011 | Choi | G06T 7/74 348/46 |

(Continued)

FOREIGN PATENT DOCUMENTS

| CN | 107230225 A | 10/2017 |
|---|---|---|
| CN | 107240129 A | 10/2017 |

(Continued)

OTHER PUBLICATIONS

Mammou. "PCC Test Model Category 2 v0". Oct. 2017. (Year: 2017).*

(Continued)

*Primary Examiner* — Zhihan Zhou
(74) *Attorney, Agent, or Firm* — Womble Bond Dickinson (US) LLP

(57) ABSTRACT

An encoding method, a decoding method, and an apparatus are provided. The encoding method includes: determining X first patches from M first patches in a current frame, where there is a matching relationship between the X first patches and X second patches, the X second patches are included in a previous frame of the current frame, X is less than or equal to M, and both X and M are positive integers; obtaining auxiliary information of the X first patches and auxiliary information of X second patches; obtaining X groups of auxiliary information differences based on the auxiliary information of the X first patches and the auxiliary information of the X second patches; and encoding the X groups of auxiliary information differences. The encoding method improves coding performance by using a correlation between point cloud data of two adjacent frame.

22 Claims, 8 Drawing Sheets

Partition point cloud data →

(51) Int. Cl.
*H04N 19/176* (2014.01)
*H04N 19/597* (2014.01)

(58) Field of Classification Search
CPC .... H04N 19/597; H04N 19/503; H04N 19/70; H04N 19/176
See application file for complete search history.

(56) References Cited

U.S. PATENT DOCUMENTS

| | | | |
|---|---|---|---|
| 2016/0253807 A1* | 9/2016 | Jones | G06K 9/00221 382/154 |
| 2017/0347120 A1* | 11/2017 | Chou | H04N 19/147 |
| 2017/0347122 A1* | 11/2017 | Chou | H04N 19/36 |
| 2019/0139266 A1* | 5/2019 | Budagavi | G06T 17/00 |
| 2019/0355152 A1* | 11/2019 | Li | G06T 3/4084 |

FOREIGN PATENT DOCUMENTS

| CN | 107403456 A | 11/2017 |
|---|---|---|
| CN | 107481315 A | 12/2017 |
| JP | 2012068881 A | 4/2012 |
| JP | 2017530626 A | 10/2017 |

OTHER PUBLICATIONS

Tim Golla et al. Real-time Point Cloud Compression, 2015 IEEE/RSJ International Conference on Intelligent Robots and Systems (IROS), pp. 5087-5092.

Tilo Ochotta et al. Image-Based Surface Compression, The Eurographics Association and Blackwell Publishing 2008. total 15 pages.

ITU-T H.265(Dec. 2016), Series H: Audiovisual and Multimedia Systems, Infrastructure of audiovisual services Coding of moving video, High efficiency video coding, Dec. 2016. total 664 pages.

Khaled Mammou(3DG):"PCC Test Model Category 2 v0", ISO/IEC JTC1/SC29/WG11 N17248, Oct. 2017, Macau, China, total 11 pages.

Khaled Mammou et al, Point Cloud Compression: Test Model Category 2 version 0.0,ISO/IEC JTC1/SC29/WG11 m41920(Oct. 27, 2017.), 7 pages.

* cited by examiner

_US 11,388,446 B2_

ENCODING METHOD, DECODING METHOD, AND APPARATUS

CROSS-REFERENCE TO RELATED APPLICATIONS

This application is a continuation of International Application No. PCT/CN2018/112215, filed on Oct. 26, 2018, which claims priority to Chinese Patent Application No. 201810045808.X, filed on Jan. 17, 2018. The disclosures of the aforementioned applications are hereby incorporated by reference in their entireties.

TECHNICAL FIELD

Embodiments of this application relate to the field of image processing technologies, and in particular, to an encoding method, a decoding method, and an apparatus.

BACKGROUND

With continuous development of computer technologies and three-dimensional (3D) sensor technologies, it is increasingly convenient to collect point cloud data, quality of the collected data is increasingly high, and a scale of the data is increasingly large. A point cloud or point cloud data refers to a set of point data, obtained by using a measuring instrument, of an appearance surface of a product. How to effectively perform high-quality compression, coding, storage, and transmission on massive point cloud data is quite important.

A common processing method for processing point cloud data is: partitioning point cloud data of a current frame into a plurality of patches; projecting the plurality of patches to form a plurality of two-dimensional image blocks; performing a packing operation (or referred to as packing) on all the two-dimensional image blocks to form a depth map and a texture map (if the point cloud data carries color information); and encoding the depth map and the texture map in an image or video coding manner, and encoding auxiliary information of the patches. Such a method fully utilizes advantages of mature coding technologies, so that coding efficiency can be quite high.

However, there is a quite close correlation between point cloud data of consecutive frames. The foregoing method is only used for separately processing point cloud data of each frame. This results in a coding/compression performance loss.

SUMMARY

Embodiments of this application provide an encoding method, a decoding method, and an apparatus, to improve coding/compression performance.

According to a first aspect, an embodiment of this application provides an encoding method. The method includes: determining X first patches from M first patches in a current frame; obtaining auxiliary information of the X first patches and auxiliary information of X second patches; obtaining X groups of auxiliary information differences based on the auxiliary information of the X first patches and the auxiliary information of the X second patches; and encoding the X groups of auxiliary information differences.

According to the encoding method provided in the first aspect, the X groups of auxiliary information differences obtained based on the auxiliary information of the X first patches and the auxiliary information of the X second patches are encoded by using a correlation between point cloud data of two adjacent frames. This reduces a coding loss and improves coding/compression performance.

In one embodiment, if X<M, the method further includes: obtaining auxiliary information of remaining Y first patches in the M first patches, where Y=M−X; obtaining a maximum value A of the auxiliary information of the Y first patches; determining, based on the maximum value A, a first quantity of bits for coding the auxiliary information of the Y first patches; encoding the first quantity of bits for coding; and encoding the auxiliary information of the Y first patches by using the first quantity of bits for coding.

According to the encoding method provided in this possible implementation, a required quantity of bits for coding is determined based on the auxiliary information of the remaining Y first patches. This avoids determining the required quantity of bits for coding based on auxiliary information of all the M first patches. In this way, a data volume of to-be-processed data is reduced, coding efficiency and properness are improved, and coding performance is improved.

In one embodiment, if X<M, there are Z types of auxiliary information, and Z>1, the method further includes: obtaining Z types of auxiliary information of remaining Y first patches in the M first patches, where Y=M−X; obtaining a maximum value Bk of a $k^{th}$ type of auxiliary information of the X first patches and a maximum value Ak of a $k^{th}$ type of auxiliary information of the Y first patches, where k=1, . . . , Z; and if the maximum value Bk is greater than or equal to the maximum value Ak, determining that a bit, corresponding to the $k^{th}$ type of auxiliary information, in first identification information is a first symbol; or if the maximum value Bk is less than the maximum value Ak, determining that a bit, corresponding to the $k^{th}$ type of auxiliary information, in first identification information is a second symbol; and if each bit in the first identification information is the first symbol, determining that second identification information is the first symbol, and encoding the second identification information; determining, based on the maximum value Bk, a second quantity of bits for coding the $k^{th}$ type of auxiliary information of the Y first patches, and encoding the $k^{th}$ type of auxiliary information of the Y first patches by using the second quantity of bits for coding, where k=1, . . . , Z; and if at least one bit in the first identification information is the second symbol, determining that the second identification information is the second symbol, and encoding the first identification information and the second identification information; and if the bit, corresponding to the $k^{th}$ type of auxiliary information, in the first identification information is the first symbol, determining, based on the maximum value Bk, the second quantity of bits for coding the $k^{th}$ type of auxiliary information of the Y first patches, and encoding the $k^{th}$ type of auxiliary information of the Y first patches by using the second quantity of bits for coding, where k=1, . . . , Z; or if the bit, corresponding to the $k^{th}$ type of auxiliary information, in the first identification information is the second symbol, determining, based on the maximum value Ak, a third quantity of bits for coding the $k^{th}$ type of auxiliary information of the Y first patches, encoding the third quantity of bits for coding, and encoding the $k^{th}$ type of auxiliary information of the Y first patches by using the third quantity of bits for coding, where k=1, . . . , Z.

According to the encoding method provided in this possible implementation, the maximum value of the auxiliary information of the X first patches is compared with the maximum value of the auxiliary information of the Y first patches, and then the quantity of bits for coding the auxiliary information of the Y first patches can be determined. When the quantity of bits for coding determined based on the maximum value of the auxiliary information of the X first patches is used to encode the auxiliary information of the Y first patches, a bitstream is further compressed, thereby improving coding efficiency and compression performance.

In one embodiment, a preset matching relationship is determined according to the following operations: obtaining N second patches in a previous frame of the current frame, where N is a positive integer; for an $i^{th}$ second patch in the N second patches, where i=1, ..., N, obtaining association values Qij between j first patches on which matching is unsuccessfully performed and the $i^{th}$ second patch, and determining a maximum association value Qik, where projection directions of the j first patches on which matching is unsuccessfully performed are the same as a projection direction of the $i^{th}$ second patch; and if Qik is greater than a preset threshold, determining that a $k^{th}$ first patch corresponding to Qik matches the $i^{th}$ second patch, where the $k^{th}$ first patch is one of the j first patches on which matching is unsuccessfully performed.

In one embodiment, if it is determined that there is a matching relationship between O first patches and the N second patches, the determining X first patches from M first patches in a current frame includes: determining the X first patches from the O first patches, where the O first patches are first patches matching the N second patches, and O≥X.

In one embodiment, the association value Qij is a quotient obtained by dividing a first reference value by a second reference value; and the first reference value is an area of an intersection region of a first occupancy matrix and a second occupancy matrix, and the second reference value is an area of a union region of the first occupancy matrix and the second occupancy matrix; or the first reference value is a quantity of samples included in an intersection region of an effective region of a first occupancy matrix and an effective region of a second occupancy matrix, and the second reference value is a quantity of samples included in a union region of the effective region of the first occupancy matrix and the effective region of the second occupancy matrix; where the effective region of the first occupancy matrix is an actually occupied region obtained by projecting a $j^{th}$ first patch onto a two-dimensional plane in a projection direction, the effective region of the second occupancy matrix is an actually occupied region obtained by projecting an $i^{th}$ second patch onto the two-dimensional plane in the projection direction, the first occupancy matrix is a matrix region that corresponds to the effective region of the first occupancy matrix, and the second occupancy matrix is a matrix region that corresponds to the effective region of the second occupancy matrix.

In one embodiment, before the preset matching relationship is determined, the method may further include: sorting the M first patches.

According to the encoding method provided in this possible implementation, the M first patches are sorted, so that a speed of matching the first patches and the second patches can be increased, thereby increasing an encoding processing speed.

In one embodiment, the preset matching relationship includes: A $k^{th}$ first patch in the X first patches matches a $k^{th}$ second patch in the X second patches based on a sorting order of the X first patches and a sorting order of the X second patches, where k=1, ..., X.

According to the encoding method provided in this possible implementation, it is specified that a first patch and a second patch with a same sequence number match each other. This simplifies the matching relationship, thereby increasing an encoding speed.

In one embodiment, the obtaining X groups of auxiliary information differences based on the auxiliary information of the X first patches and the auxiliary information of the X second patches includes: determining, as the X groups of auxiliary information differences, differences between the auxiliary information of the X first patches and the auxiliary information of the X second patches that correspondingly match the X first patches. The method further includes: obtaining matching information, where the matching information indicates a matching relationship between the X first patches and the X second patches; and encoding the matching information.

According to the encoding method provided in this possible implementation, subtraction is correspondingly performed on auxiliary information of each first patch and auxiliary information of a second patch having a same sequence number as the first patch, to obtain the X groups of auxiliary information differences. This simplifies complexity of calculating the differences, thereby increasing an encoding speed.

In one embodiment, the obtaining X groups of auxiliary information differences based on the auxiliary information of the X first patches and the auxiliary information of the X second patches includes: determining, based on the sorting order of the X first patches and the sorting order of the X second patches, a difference between auxiliary information of the $k^{th}$ first patch in the X first patches and auxiliary information of the $k^{th}$ second patch in the X second patches as a $k^{th}$ group of auxiliary information difference in the X groups of auxiliary information differences, where k=1, ..., X.

According to the encoding method provided in this possible implementation, the differences between the auxiliary information of the X first patches and the auxiliary information of the X second patches that correspondingly match the X first patches are determined as the X groups of auxiliary information differences. This improves encoding accuracy, thereby improving coding performance.

In one embodiment, the method further includes: determining a fourth quantity of bits for coding based on M; and encoding X by using the fourth quantity of bits for coding.

According to a second aspect, an embodiment of this application provides a decoding method. The method includes: obtaining, based on a bitstream, X groups of auxiliary information differences corresponding to X first patches in a current frame; obtaining auxiliary information of X second patches; and obtaining auxiliary information of the X first patches based on the X groups of auxiliary information differences and the auxiliary information of the X second patches.

In one embodiment, if X<M, the method further includes: obtaining a first quantity of bits for coding based on the bitstream, where the first quantity of bits for coding is determined by an encoding apparatus based on a maximum value A of auxiliary information of remaining Y first patches in M first patches, where Y=M−X; and obtaining the auxiliary information of the Y first patches based on the bitstream by using the first quantity of bits for coding.

In one embodiment, if X<M, there are Z types of auxiliary information, and Z>1, the method further includes: obtaining second identification information based on the bitstream; if the second identification information is a first symbol, determining a second quantity of bits for coding based on a maximum value Bk of a $k^{th}$ type of auxiliary information of the X first patches, and obtaining a $k^{th}$ type of auxiliary information of remaining Y first patches in M first patches based on the bitstream by using the second quantity of bits for coding, where k=1, ..., Z; if the second identification information is a second symbol, obtaining first identification information; and if a bit, corresponding to the $k^{th}$ type of auxiliary information, in the first identification information is the first symbol, determining the second quantity of bits for coding based on the maximum value Bk of the $k^{th}$ type of auxiliary information of the X first patches, and obtaining the $k^{th}$ type of auxiliary information of the remaining Y first patches in the M first patches based on the bitstream by using the second quantity of bits for coding, where k=1, ..., Z; and if the bit, corresponding to the $k^{th}$ type of auxiliary information, in the first identification information is the second symbol, obtaining a third quantity of bits for coding based on the bitstream, and obtaining the $k^{th}$ type of auxiliary information of the Y first patches based on the bitstream by using the third quantity of bits for coding, where the third quantity of bits for coding is determined by an encoding apparatus based on a maximum value Ak of the $k^{th}$ type of auxiliary information of the Y first patches, and k=1, ..., Z.

In one embodiment, the method further includes: determining a fourth quantity of bits for coding based on M; and obtaining X based on the bitstream by using the fourth quantity of bits for coding.

According to a third aspect, an embodiment of this application provides an encoding apparatus, including a determining module, an obtaining module, and an encoding module. The determining module is configured to determine X first patches from M first patches in a current frame. The obtaining module is configured to obtain auxiliary information of the X first patches and auxiliary information of X second patches. The encoding module is configured to: obtain X groups of auxiliary information differences based on the auxiliary information of the X first patches and the auxiliary information of the X second patches, and encode the X groups of auxiliary information differences.

In one embodiment, if X<M, the obtaining module is further configured to: obtain auxiliary information of remaining Y first patches in the M first patches, where Y=M−X; and obtain a maximum value A of the auxiliary information of the Y first patches. The encoding module is further configured to: determine, based on the maximum value A, a first quantity of bits for coding the auxiliary information of the Y first patches; encode the first quantity of bits for coding; and encode the auxiliary information of the Y first patches by using the first quantity of bits for coding.

In one embodiment, if X<M, there are Z types of auxiliary information, and Z>1, the obtaining module is further configured to: obtain Z types of auxiliary information of remaining Y first patches in the M first patches, where Y=M−X; and obtain a maximum value Bk of a $k^{th}$ type of auxiliary information of the X first patches and a maximum value Ak of a $k^{th}$ type of auxiliary information of the Y first patches, where k=1, ..., Z. The encoding module is further configured to: if the maximum value Bk is greater than or equal to the maximum value Ak, determine that a bit, corresponding to the $k^{th}$ type of auxiliary information, in first identification information is a first symbol; or if the maximum value Bk is less than the maximum value Ak, determine that a bit, corresponding to the $k^{th}$ type of auxiliary information, in first identification information is a second symbol; and if each bit in the first identification information is the first symbol, determine that second identification information is the first symbol, and encode the second identification information; determine, based on the maximum value Bk, a second quantity of bits for coding the $k^{th}$ type of auxiliary information of the Y first patches, and encode the $k^{th}$ type of auxiliary information of the Y first patches by using the second quantity of bits for coding, where k=1, ..., Z; and if at least one bit in the first identification information is the second symbol, determine that the second identification information is the second symbol, and encode the first identification information and the second identification information; and if the bit, corresponding to the $k^{th}$ type of auxiliary information, in the first identification information is the first symbol, determine, based on the maximum value Bk, the second quantity of bits for coding the $k^{th}$ type of auxiliary information of the Y first patches, and encode the $k^{th}$ type of auxiliary information of the Y first patches by using the second quantity of bits for coding, where k=1, ..., Z; or if the bit, corresponding to the $k^{th}$ type of auxiliary information, in the first identification information is the second symbol, determine, based on the maximum value Ak, a third quantity of bits for coding the $k^{th}$ type of auxiliary information of the Y first patches, encode the third quantity of bits for coding, and encode the $k^{th}$ type of auxiliary information of the Y first patches by using the third quantity of bits for coding, where k=1, ..., Z.

In one embodiment, the determining module is specifically configured to determine a preset matching relationship according to the following operations: obtaining N second patches in a previous frame of the current frame, where N is a positive integer; for an $i^{th}$ second patch in the N second patches, where i=1, ..., N, obtaining association values Qij between j first patches on which matching is unsuccessfully performed and the $i^{th}$ second patch, and determining a maximum association value Qik, where projection directions of the j first patches on which matching is unsuccessfully performed are the same as a projection direction of the $i^{th}$ second patch; and if Qik is greater than a preset threshold, determining that a $k^{th}$ first patch corresponding to Qik matches the $i^{th}$ second patch, where the $k^{th}$ first patch is one of the j first patches on which matching is unsuccessfully performed.

In one embodiment, if it is determined that there is a matching relationship between O first patches and the N second patches, the determining module is specifically configured to: determine the X first patches from the O first patches, where the O first patches are first patches matching the N second patches, and O≥X.

In one embodiment, the association value Qij is a quotient obtained by dividing a first reference value by a second reference value; and the first reference value is an area of an intersection region of a first occupancy matrix and a second occupancy matrix, and the second reference value is an area of a union region of the first occupancy matrix and the second occupancy matrix; or the first reference value is a quantity of samples included in an intersection region of an effective region of a first occupancy matrix and an effective region of a second occupancy matrix, and the second reference value is a quantity of samples included in a union region of the effective region of the first occupancy matrix and the effective region of the second occupancy matrix; where the effective region of the first occupancy matrix is an actually occupied region obtained by projecting a $j^{th}$ first patch onto a two-dimensional plane in a projection direction, the effective region of the second occupancy matrix is an actually occupied region obtained by projecting an $i^{th}$ second patch onto the two-dimensional plane in the projection direction, the first occupancy matrix is a matrix region that corresponds to the effective region of the first occupancy matrix, and the second occupancy matrix is a matrix region that corresponds to the effective region of the second occupancy matrix.

In one embodiment, the preset matching relationship includes: A $k^{th}$ first patch in the X first patches matches a $k^{th}$ second patch in the X second patches based on a sorting order of the X first patches and a sorting order of the X second patches, where k=1, . . . , X.

In one embodiment, the encoding module is specifically configured to determine, as the X groups of auxiliary information differences, differences between the auxiliary information of the X first patches and the auxiliary information of the X second patches that correspondingly match the X first patches. The obtaining module is further configured to obtain matching information, where the matching information indicates a matching relationship between the X first patches and the X second patches. The encoding module is further configured to encode the matching information.

In one embodiment, the encoding module is specifically configured to determine, based on the sorting order of the X first patches and the sorting order of the X second patches, a difference between auxiliary information of the $k^{th}$ first patch in the X first patches and auxiliary information of the $k^{th}$ second patch in the X second patches as a $k^{th}$ group of auxiliary information difference in the X groups of auxiliary information differences, where k=1, . . . , X.

In one embodiment, the encoding module is further configured to: determine a fourth quantity of bits for coding based on M; and encode X by using the fourth quantity of bits for coding.

According to a fourth aspect, an embodiment of this application provides a decoding apparatus, including a decoding module and an obtaining module. The decoding module is configured to obtain, based on a bitstream, X groups of auxiliary information differences corresponding to X first patches in a current frame. The obtaining module is configured to obtain auxiliary information of X second patches. The decoding module is further configured to obtain auxiliary information of the X first patches based on the X groups of auxiliary information differences and the auxiliary information of the X second patches.

In one embodiment, if X<M, the decoding module is further configured to: obtain a first quantity of bits for coding based on the bitstream, where the first quantity of bits for coding is determined by an encoding apparatus based on a maximum value A of auxiliary information of remaining Y first patches in M first patches, where Y=M−X; and obtain the auxiliary information of the Y first patches based on the bitstream by using the first quantity of bits for coding.

In one embodiment, if X<M, there are Z types of auxiliary information, and Z>1, the decoding module is further configured to: obtain second identification information based on the bitstream; if the second identification information is a first symbol, determine a second quantity of bits for coding based on a maximum value Bk of a $k^{th}$ type of auxiliary information of the X first patches, and obtain a $k^{th}$ type of auxiliary information of remaining Y first patches in M first patches based on the bitstream by using the second quantity of bits for coding, where k=1, . . . , Z; if the second identification information is a second symbol, obtain first identification information; if a bit, corresponding to the $k^{th}$ type of auxiliary information, in the first identification information is the first symbol, determine the second quantity of bits for coding based on the maximum value Bk of the $k^{th}$ type of auxiliary information of the X first patches, and obtain the $k^{th}$ type of auxiliary information of the remaining Y first patches in the M first patches based on the bitstream by using the second quantity of bits for coding, where k=1, . . . , Z; and if the bit, corresponding to the $k^{th}$ type of auxiliary information, in the first identification information is the second symbol, obtain a third quantity of bits for coding based on the bitstream, and obtain the $k^{th}$ type of auxiliary information of the Y first patches based on the bitstream by using the third quantity of bits for coding, where the third quantity of bits for coding is determined by an encoding apparatus based on a maximum value Ak of the $k^{th}$ type of auxiliary information of the Y first patches, and k=1, . . . , Z.

In one embodiment, the decoding module is further configured to: determine a fourth quantity of bits for coding based on M; and obtain X based on the bitstream by using the fourth quantity of bits for coding.

According to some embodiments, there is a preset matching relationship between the X first patches and the X second patches, the X second patches are included in the previous frame of the current frame, X is less than or equal to M, and both X and M are positive integers. The auxiliary information includes at least one of the following: a minimum X-coordinate value of a patch in a three-dimensional coordinate system, a minimum Y-coordinate value of the patch in the three-dimensional coordinate system, a minimum Z-coordinate value of the patch in the three-dimensional coordinate system, a minimum X-coordinate value of the patch in an occupancy map in a projection direction, and a minimum Y-coordinate value of the patch in the occupancy map in the projection direction.

According to a fifth aspect, an embodiment of this application provides an encoder. The encoder includes a processor and a memory. The memory is configured to store an instruction, and the processor is configured to execute the instruction stored in the memory, so that the encoder performs the method in the first aspect.

The encoder in the fifth aspect may further include a transceiver, where the transceiver is configured to communicate with another device.

According to a sixth aspect, an embodiment of this application provides a decoder. The decoder includes a processor and a memory. The memory is configured to store an instruction, and the processor is configured to execute the instruction stored in the memory, so that the decoder performs the method in the second aspect.

The decoder in the sixth aspect may further include a transceiver, where the transceiver is configured to communicate with another device.

According to a seventh aspect, an embodiment of this application provides a storage medium, including a readable storage medium and a computer program. The computer program is used to implement the method in the first aspect or the second aspect.

According to an eighth aspect, an embodiment of this application provides a program product. The program product includes a computer program (that is, an executable instruction), where the computer program is stored in a readable storage medium. At least one processor of an encoder or at least one processor of a decoder may read the computer program from the readable storage medium, and the at least one processor executes the computer program, so that the encoder or the decoder implements the method provided in the first aspect and the implementations of the first aspect or the second aspect and the implementations of the second aspect.

A ninth aspect of this application provides a chip. The chip may be applied to an encoder, and the chip includes at least one communications interface, at least one processor, and at least one memory. The communications interface, the memory, and the processor are connected to each other through a bus. The processor invokes a computer program stored in the memory, to perform the encoding method provided in the first aspect of this application.

A tenth aspect of this application provides a chip. The chip may be applied to a decoder, and the chip includes at least one communications interface, at least one processor, and at least one memory. The communications interface, the memory, and the processor are connected to each other through a bus. The processor invokes a computer program stored in the memory, to perform the decoding method provided in the second aspect of this application.

In one embodiment, if X<M, there are Z types of auxiliary information, and Z≥1, the method further includes:

obtaining Z types of auxiliary information of remaining Y first patches in the M first patches, where Y=M−X, and Y is a positive integer;

obtaining a maximum value Bk of a $k^{th}$ type of auxiliary information of the X first patches and a maximum value Ak of a $k^{th}$ type of auxiliary information of the Y first patches, where k=1, . . . , Z; and if the maximum value Bk is greater than or equal to the maximum value Ak or a quantity of bits required for coding the maximum value Bk is greater than or equal to a quantity of bits required for coding the maximum value Ak, determining that identification information corresponding to the $k^{th}$ type of auxiliary information is a first symbol; or if the maximum value Bk is less than the maximum value Ak or a quantity of bits required for coding the maximum value Bk is less than a quantity of bits required for coding the maximum value Ak, determining that identification information corresponding to the $k^{th}$ type of auxiliary information is a second symbol.

In one embodiment, the method further includes:

if each of Z pieces of identification information corresponding to the Z types of auxiliary information is the first symbol, determining that second identification information is a third symbol, and encoding the second identification information into the bitstream; and determining, based on the maximum value Bk, a second quantity of bits for coding the $k^{th}$ type of auxiliary information of the Y first patches, and encoding the $k^{th}$ type of auxiliary information of the Y first patches into the bitstream by using the second quantity of bits for coding, where k=1, . . . , Z.

In one embodiment, the method further includes:

if at least one piece of the Z pieces of identification information corresponding to the Z types of auxiliary information is the second symbol, determining that the second identification information is a fourth symbol, and encoding the Z pieces of identification information corresponding to the Z types of auxiliary information and the second identification information into the bitstream; and if the identification information corresponding to the $k^{th}$ type of auxiliary information is the first symbol, determining, based on the maximum value Bk, the second quantity of bits for coding the $k^{th}$ type of auxiliary information of the Y first patches, and encoding the $k^{th}$ type of auxiliary information of the Y first patches into the bitstream by using the second quantity of bits for coding, where k=1, . . . , Z; or if the identification information corresponding to the $k^{th}$ type of auxiliary information is the second symbol, determining, based on the maximum value Ak, a third quantity of bits for coding the $k^{th}$ type of auxiliary information of the Y first patches, encoding the third quantity of bits for coding into the bitstream, and encoding the $k^{th}$ type of auxiliary information of the Y first patches into the bitstream by using the third quantity of bits for coding, where k=1, . . . , Z.

In one embodiment, the encoding the third quantity of bits for coding into the bitstream includes:

encoding a difference between the third quantity of bits for coding and the quantity of bits required for coding the maximum value Bk into the bitstream.

In one embodiment, the matching information includes either of the following:

index values of the X reference patches that correspondingly match the X first patches; or X index differences, where the X index differences are differences between index values of the X first patches and index values of the X reference patches that correspondingly match the X first patches.

In one embodiment, the matching information includes either of the following:

index values of the X first patches and index values of the X reference patches that correspondingly match the X first patches; or index values of the X first patches and X index differences respectively corresponding to the X first patches, where the X index differences are differences between the index values of the X first patches and index values of the X reference patches that correspondingly match the X first patches.

In one embodiment, the auxiliary information difference includes at least one of the following:

a difference between a minimum X-coordinate value of the first patch in a three-dimensional coordinate system and a minimum X-coordinate value of the reference patch in the three-dimensional coordinate system;

a difference between a minimum Y-coordinate value of the first patch in the three-dimensional coordinate system and a minimum Y-coordinate value of the reference patch in the three-dimensional coordinate system;

a difference between a minimum Z-coordinate value of the first patch in the three-dimensional coordinate system and a minimum Z-coordinate value of the reference patch in the three-dimensional coordinate system;

a difference between a minimum X-coordinate value of the first patch in an occupancy map in a projection direction and a minimum X-coordinate value of the reference patch in the occupancy map in the projection direction; and a difference between a minimum Y-coordinate value of the first patch in the occupancy map in the projection direction and a minimum Y-coordinate value of the reference patch in the occupancy map in the projection direction.

In one embodiment, the auxiliary information includes at least one of the following:

a difference between a minimum X-coordinate value of the first patch in a three-dimensional coordinate system and a minimum X-coordinate value of the reference patch in the three-dimensional coordinate system;

a difference between a minimum Y-coordinate value of the first patch in the three-dimensional coordinate system and a minimum Y-coordinate value of the reference patch in the three-dimensional coordinate system;

a difference between a minimum Z-coordinate value of the first patch in the three-dimensional coordinate system and a minimum Z-coordinate value of the reference patch in the three-dimensional coordinate system;

a difference between a minimum X-coordinate value of the first patch in an occupancy map in a projection direction and a minimum X-coordinate value of the reference patch in the occupancy map in the projection direction;

a difference between a minimum Y-coordinate value of the first patch in the occupancy map in the projection direction and a minimum Y-coordinate value of the reference patch in the occupancy map in the projection direction;

a difference between a height of the first patch in the occupancy map and a height of the reference patch in the occupancy map; and a difference between a width of the first patch in the occupancy map and a width of the reference patch in the occupancy map.

In one embodiment, the reference frame of the current frame includes a previous frame of the current frame or a next frame of the current frame.

In one embodiment, the method further includes:

if the second identification information is a fourth symbol, obtaining, from the bitstream, Z pieces of identification information corresponding to Z types of auxiliary information; and if identification information corresponding to a $k^{th}$ type of auxiliary information is a first symbol, determining a second quantity of bits for coding based on a maximum value Bk of a $k^{th}$ type of auxiliary information of the X first patches, and obtaining a $k^{th}$ type of auxiliary information of Y first patches from the bitstream by using the second quantity of bits for coding, where k=1, . . . , Z.

In one embodiment, the method further includes:

if the identification information corresponding to the $k^{th}$ type of auxiliary information is a second symbol, obtaining a third quantity of bits for coding from the bitstream, and obtaining the $k^{th}$ type of auxiliary information of the Y first patches from the bitstream by using the third quantity of bits for coding, where the third quantity of bits for coding is a quantity of bits required for coding a maximum value Ak of the $k^{th}$ type of auxiliary information of the Y first patches, and k=1, . . . , Z.

In one embodiment, the method further includes:

if the identification information corresponding to the $k^{th}$ type of auxiliary information is a second symbol, obtaining a difference from the bitstream, where the difference is a difference between a quantity of bits required for coding a maximum value Ak of the $k^{th}$ type of auxiliary information of the Y first patches and a quantity of bits required for coding the maximum value Bk, and k=1, . . . , Z;

obtaining a third quantity of bits for coding based on the difference and the quantity of bits required for coding the maximum value Bk, where the third quantity of bits for coding is a quantity of bits required for coding the maximum value Ak of the $k^{th}$ type of auxiliary information of the Y first patches, and k=1, . . . , Z; and obtaining the $k^{th}$ type of auxiliary information of the Y first patches from the bitstream by using the third quantity of bits for coding.

In one embodiment, the method further includes:

if a bit, corresponding to the $k^{th}$ type of auxiliary information, in the first identification information is a second symbol, obtaining a difference from the bitstream, where the difference is a difference between a quantity of bits required for coding a maximum value Ak of the $k^{th}$ type of auxiliary information of the Y first patches and a quantity of bits required for coding the maximum value Bk, and k=1, . . . , Z; obtaining a third quantity of bits for coding based on the difference and the quantity of bits required for coding the maximum value Bk, where the third quantity of bits for coding is a quantity of bits required for coding the maximum value Ak of the $k^{th}$ type of auxiliary information of the Y first patches, and k=1, . . . , Z; and obtaining the $k^{th}$ type of auxiliary information of the Y first patches from the bitstream by using the third quantity of bits for coding.

In one embodiment, the method further includes:

parsing the bitstream to obtain matching information, where the matching information is used to indicate a matching relationship between the X first patches and the X reference patches; and the obtaining auxiliary information of X reference patches includes:

determining, based on the matching information, the X reference patches that correspondingly match the X first patches; and obtaining the auxiliary information of the X reference patches.

In one embodiment, the matching information includes either of the following:

index values of the X reference patches that correspondingly match the X first patches; or X index differences, where the X index differences are differences between index values of the X first patches and index values of the X reference patches that correspondingly match the X first patches.

In one embodiment, the matching information includes either of the following:

index values of the X first patches and index values of the X reference patches that correspondingly match the X first patches; or index values of the X first patches and X index differences respectively corresponding to the X first patches, where the X index differences are differences between the index values of the X first patches and index values of the X reference patches that correspondingly match the X first patches.

In one embodiment, the auxiliary information difference includes at least one of the following:

a difference between a minimum X-coordinate value of the first patch in a three-dimensional coordinate system and a minimum X-coordinate value of the reference patch in the three-dimensional coordinate system;

a difference between a minimum Y-coordinate value of the first patch in the three-dimensional coordinate system and a minimum Y-coordinate value of the reference patch in the three-dimensional coordinate system;

a difference between a minimum Z-coordinate value of the first patch in the three-dimensional coordinate system and a minimum Z-coordinate value of the reference patch in the three-dimensional coordinate system;

a difference between a minimum X-coordinate value of the first patch in an occupancy map in a projection direction and a minimum X-coordinate value of the reference patch in the occupancy map in the projection direction; and a difference between a minimum Y-coordinate value of the first patch in the occupancy map in the projection direction and a minimum Y-coordinate value of the reference patch in the occupancy map in the projection direction.

In one embodiment, the auxiliary information includes at least one of the following:

a difference between a minimum X-coordinate value of the first patch in a three-dimensional coordinate system and a minimum X-coordinate value of the reference patch in the three-dimensional coordinate system;

a difference between a minimum Y-coordinate value of the first patch in the three-dimensional coordinate system and a minimum Y-coordinate value of the reference patch in the three-dimensional coordinate system;

a difference between a minimum Z-coordinate value of the first patch in the three-dimensional coordinate system and a minimum Z-coordinate value of the reference patch in the three-dimensional coordinate system;

a difference between a minimum X-coordinate value of the first patch in an occupancy map in a projection direction and a minimum X-coordinate value of the reference patch in the occupancy map in the projection direction;

a difference between a minimum Y-coordinate value of the first patch in the occupancy map in the projection direction and a minimum Y-coordinate value of the reference patch in the occupancy map in the projection direction;

a difference between a height of the first patch in the occupancy map and a height of the reference patch in the occupancy map; and a difference between a width of the first patch in the occupancy map and a width of the reference patch in the occupancy map.

In one embodiment, if X<M, there are Z types of auxiliary information, and Z≥1, the obtaining module is further configured to:

obtain Z types of auxiliary information of remaining Y first patches in the M first patches, where Y=M−X, and Y is a positive integer;

obtain a maximum value Bk of a $k^{th}$ type of auxiliary information of the X first patches and a maximum value Ak of a $k^{th}$ type of auxiliary information of the Y first patches, where k=1, . . . , Z; and if the maximum value Bk is greater than or equal to the maximum value Ak or a quantity of bits required for coding the maximum value Bk is greater than or equal to a quantity of bits required for coding the maximum value Ak, determine that identification information corresponding to the $k^{th}$ type of auxiliary information is a first symbol; or if the maximum value Bk is less than the maximum value Ak or a quantity of bits required for coding the maximum value Bk is less than a quantity of bits required for coding the maximum value Ak, determine that identification information corresponding to the $k^{th}$ type of auxiliary information is a second symbol.

In one embodiment, the encoding module is further configured to:

if each of Z pieces of identification information corresponding to the Z types of auxiliary information is the first symbol, determine that second identification information is a third symbol, and encode the second identification information into the bitstream; and determine, based on the maximum value Bk, a second quantity of bits for coding the $k^{th}$ type of auxiliary information of the Y first patches, and encode the $k^{th}$ type of auxiliary information of the Y first patches into the bitstream by using the second quantity of bits for coding, where k=1, . . . , Z.

In one embodiment, the encoding module is further configured to:

if at least one piece of the Z pieces of identification information corresponding to the Z types of auxiliary information is the second symbol, determine that the second identification information is a fourth symbol, and encode the Z pieces of identification information corresponding to the Z types of auxiliary information and the second identification information into the bitstream; and if the identification information corresponding to the $k^{th}$ type of auxiliary information is the first symbol, determine, based on the maximum value Bk, the second quantity of bits for coding the $k^{th}$ type of auxiliary information of the Y first patches, and encode the $k^{th}$ type of auxiliary information of the Y first patches into the bitstream by using the second quantity of bits for coding, where k=1, . . . , Z; or if the identification information corresponding to the $k^{th}$ type of auxiliary information is the second symbol, determine, based on the maximum value Ak, a third quantity of bits for coding the $k^{th}$ type of auxiliary information of the Y first patches, encode the third quantity of bits for coding into the bitstream, and encode the $k^{th}$ type of auxiliary information of the Y first patches into the bitstream by using the third quantity of bits for coding, where k=1, . . . , Z.

In one embodiment, the encoding module is specifically configured to:

encode a difference between the third quantity of bits for coding and the quantity of bits required for coding the maximum value Bk into the bitstream.

In one embodiment, the matching information includes either of the following:

index values of the X reference patches that correspondingly match the X first patches; or X index differences, where the X index differences are differences between index values of the X first patches and index values of the X reference patches that correspondingly match the X first patches.

In one embodiment, the matching information includes either of the following:

index values of the X first patches and index values of the X reference patches that correspondingly match the X first patches; or index values of the X first patches and X index differences respectively corresponding to the X first patches, where the X index differences are differences between the index values of the X first patches and index values of the X reference patches that correspondingly match the X first patches.

In one embodiment, the auxiliary information difference includes at least one of the following:

a difference between a minimum X-coordinate value of the first patch in a three-dimensional coordinate system and a minimum X-coordinate value of the reference patch in the three-dimensional coordinate system;

a difference between a minimum Y-coordinate value of the first patch in the three-dimensional coordinate system and a minimum Y-coordinate value of the reference patch in the three-dimensional coordinate system;

a difference between a minimum Z-coordinate value of the first patch in the three-dimensional coordinate system and a minimum Z-coordinate value of the reference patch in the three-dimensional coordinate system;

a difference between a minimum X-coordinate value of the first patch in an occupancy map in a projection direction and a minimum X-coordinate value of the reference patch in the occupancy map in the projection direction; and a difference between a minimum Y-coordinate value of the first patch in the occupancy map in the projection direction and a minimum Y-coordinate value of the reference patch in the occupancy map in the projection direction.

In one embodiment, the auxiliary information includes at least one of the following:

a difference between a minimum X-coordinate value of the first patch in a three-dimensional coordinate system and a minimum X-coordinate value of the reference patch in the three-dimensional coordinate system;

a difference between a minimum Y-coordinate value of the first patch in the three-dimensional coordinate system and a minimum Y-coordinate value of the reference patch in the three-dimensional coordinate system;

a difference between a minimum Z-coordinate value of the first patch in the three-dimensional coordinate system and a minimum Z-coordinate value of the reference patch in the three-dimensional coordinate system;

a difference between a minimum X-coordinate value of the first patch in an occupancy map in a projection direction and a minimum X-coordinate value of the reference patch in the occupancy map in the projection direction;

a difference between a minimum Y-coordinate value of the first patch in the occupancy map in the projection direction and a minimum Y-coordinate value of the reference patch in the occupancy map in the projection direction;

a difference between a height of the first patch in the occupancy map and a height of the reference patch in the occupancy map; and a difference between a width of the first patch in the occupancy map and a width of the reference patch in the occupancy map.

In one embodiment, the reference frame of the current frame includes a previous frame of the current frame or a next frame of the current frame.

In one embodiment, the decoding module is further configured to:

if the second identification information is a fourth symbol, obtain, from the bitstream, Z pieces of identification information corresponding to Z types of auxiliary information; and if identification information corresponding to a $k^{th}$ type of auxiliary information is a first symbol, determine a second quantity of bits for coding based on a maximum value Bk of a $k^{th}$ type of auxiliary information of the X first patches, and obtain a $k^{th}$ type of auxiliary information of Y first patches from the bitstream by using the second quantity of bits for coding, where k=1, ..., Z.

In one embodiment, the decoding module is further configured to:

if the identification information corresponding to the $k^{th}$ type of auxiliary information is a second symbol, obtain a third quantity of bits for coding from the bitstream, and obtain the $k^{th}$ type of auxiliary information of the Y first patches from the bitstream by using the third quantity of bits for coding, where the third quantity of bits for coding is a quantity of bits required for coding a maximum value Ak of the $k^{th}$ type of auxiliary information of the Y first patches, and k=1, ..., Z.

In one embodiment, the decoding module is further configured to:

if the identification information corresponding to the $k^{th}$ type of auxiliary information is a second symbol, obtain a difference from the bitstream, where the difference is a difference between a quantity of bits required for coding a maximum value Ak of the $k^{th}$ type of auxiliary information of the Y first patches and a quantity of bits required for coding the maximum value Bk, and k=1, ..., Z;

obtain a third quantity of bits for coding based on the difference and the quantity of bits required for coding the maximum value Bk, where the third quantity of bits for coding is a quantity of bits required for coding the maximum value Ak of the $k^{th}$ (type of auxiliary information of the Y first patches, and k=1, ..., Z; and obtain the $k^{th}$ type of auxiliary information of the Y first patches from the bitstream by using the third quantity of bits for coding.

In one embodiment, the decoding module is further configured to:

if a bit, corresponding to the $k^{th}$ type of auxiliary information, in the first identification information is a second symbol, obtain a difference from the bitstream, where the difference is a difference between a quantity of bits required for coding a maximum value Ak of the $k^{th}$ type of auxiliary information of the Y first patches and a quantity of bits required for coding the maximum value Bk, and k=1, ..., Z;

obtain a third quantity of bits for coding based on the difference and the quantity of bits required for coding the maximum value Bk, where the third quantity of bits for coding is a quantity of bits required for coding the maximum value Ak of the $k^{th}$ type of auxiliary information of the Y first patches, and k=1, ..., Z; and obtain the $k^{th}$ type of auxiliary information of the Y first patches from the bitstream by using the third quantity of bits for coding.

In one embodiment, the decoding module is further configured to:

parse the bitstream to obtain matching information, where the matching information is used to indicate a matching relationship between the X first patches and the X reference patches; and the obtaining module is specifically configured to:

determine, based on the matching information, the X reference patches that correspondingly match the X first patches; and obtain the auxiliary information of the X reference patches.

In one embodiment, the matching information includes either of the following:

index values of the X reference patches that correspondingly match the X first patches; or X index differences, where the X index differences are differences between index values of the X first patches and index values of the X reference patches that correspondingly match the X first patches.

In one embodiment, the matching information includes either of the following:

index values of the X first patches and index values of the X reference patches that correspondingly match the X first patches; or index values of the X first patches and X index differences respectively corresponding to the X first patches, where the X index differences are differences between the index values of the X first patches and index values of the X reference patches that correspondingly match the X first patches.

In one embodiment, the auxiliary information difference includes at least one of the following:

a difference between a minimum X-coordinate value of the first patch in a three-dimensional coordinate system and a minimum X-coordinate value of the reference patch in the three-dimensional coordinate system;

a difference between a minimum Y-coordinate value of the first patch in the three-dimensional coordinate system and a minimum Y-coordinate value of the reference patch in the three-dimensional coordinate system;

a difference between a minimum Z-coordinate value of the first patch in the three-dimensional coordinate system and a minimum Z-coordinate value of the reference patch in the three-dimensional coordinate system;

a difference between a minimum X-coordinate value of the first patch in an occupancy map in a projection direction and a minimum X-coordinate value of the reference patch in the occupancy map in the projection direction; and a difference between a minimum Y-coordinate value of the first patch in the occupancy map in the projection direction and a minimum Y-coordinate value of the reference patch in the occupancy map in the projection direction.

In one embodiment, the auxiliary information includes at least one of the following:

a difference between a minimum X-coordinate value of the first patch in a three-dimensional coordinate system and a minimum X-coordinate value of the reference patch in the three-dimensional coordinate system;

a difference between a minimum Y-coordinate value of the first patch in the three-dimensional coordinate system and a minimum Y-coordinate value of the reference patch in the three-dimensional coordinate system;

a difference between a minimum Z-coordinate value of the first patch in the three-dimensional coordinate system and a minimum Z-coordinate value of the reference patch in the three-dimensional coordinate system;

a difference between a minimum X-coordinate value of the first patch in an occupancy map in a projection direction and a minimum X-coordinate value of the reference patch in the occupancy map in the projection direction;

a difference between a minimum Y-coordinate value of the first patch in the occupancy map in the projection direction and a minimum Y-coordinate value of the reference patch in the occupancy map in the projection direction;

a difference between a height of the first patch in the occupancy map and a height of the reference patch in the occupancy map; and a difference between a width of the first patch in the occupancy map and a width of the reference patch in the occupancy map.

According to an eleventh aspect, an embodiment of this application provides a method for determining a matching relationship between patches, including:

obtaining M first patches in a current frame and N reference patches in a reference frame of the current frame, where both M and N are positive integers; and determining a matching relationship between X first patches and X reference patches based on the M first patches and the N reference patches, where X is less than or equal to M, and X is less than or equal to N.

In one embodiment, the determining a matching relationship between X first patches and X reference patches based on the M first patches and the N reference patches includes:

obtaining association values between the M first patches and the N reference patches based on the M first patches and the N reference patches; and determining the matching relationship between the X first patches and the X reference patches based on the association values between the M first patches and the N reference patches.

In one embodiment, the determining the matching relationship between the X first patches and the X reference patches based on the association values between the M first patches and the N reference patches includes:

for an $i^{th}$ reference patch in the N reference patches, where i=1, ..., N, obtaining association values between j first patches on which matching is unsuccessfully performed and the $i^{th}$ reference patch, and determining a maximum association value $Q_{ik}$ in the j association values, where the j first patches on which matching is unsuccessfully performed include: a first patch, in the M first patches in the current frame, that does not match (i−1) reference patches prior to the $i^{th}$ reference patch and whose projection direction is the same as a projection direction of the $i^{th}$ reference patch, where j is less than or equal to M, k is less than or equal to j, and j, k, and M are all positive integers; and if $Q_{ik}$ is greater than a preset threshold, determining that a $k^{th}$ first patch corresponding to $Q_{ik}$ matches the $i^{th}$ reference patch, where the $k^{th}$ first patch is one of the j first patches on which matching is unsuccessfully performed.

In one embodiment, the association value is a quotient obtained by dividing a first reference value by a second reference value; and the first reference value is an area of an intersection region of a first occupancy matrix and a second occupancy matrix, and the second reference value is an area of a union region of the first occupancy matrix and the second occupancy matrix; or the first reference value is a quantity of samples included in an intersection region of an effective region of a first occupancy matrix and an effective region of a second occupancy matrix, and the second reference value is a quantity of samples included in a union region of the effective region of the first occupancy matrix and the effective region of the second occupancy matrix; where the effective region of the first occupancy matrix is an actually occupied region obtained by projecting a $j^{th}$ first patch onto a two-dimensional plane in a projection direction, the effective region of the second occupancy matrix is an actually occupied region obtained by projecting an $i^{th}$ second patch onto the two-dimensional plane in the projection direction, the first occupancy matrix is a matrix region that corresponds to the actually occupied region obtained by projecting the $j^{th}$ first patch onto the two-dimensional plane in the projection direction, and the second occupancy matrix is a matrix region that corresponds to the actually occupied region obtained by projecting the $i^{th}$ second patch onto the two-dimensional plane in the projection direction.

In one embodiment, the determining a matching relationship between X first patches and X reference patches based on the M first patches and the N reference patches includes:

determining, based on a sorting order of the N reference patches in the reference frame and a sorting order of the M first patches in the current frame, that the X first patches respectively match the X reference patches.

Optionally, in a possible implementation of the eleventh aspect, the method further includes:

sorting the X first patches in the current frame based on a sequence of matching between the X first patches and the X reference patches; and arranging, after the X first patches, at least one first patch other than the X first patches in the current frame.

According to a twelfth aspect, an embodiment of this application provides an encoding method, including:

obtaining matching information, where the matching information is used to indicate a matching relationship between X first patches and X reference patches, the X reference patches are included in a reference frame of a current frame, X is less than or equal to M, both X and M are positive integers, and M represents a quantity of first patches in the current frame; and encoding the matching information into a bitstream.

In one embodiment, the matching information includes either of the following:

index values of the X reference patches that correspondingly match the X first patches; or X index differences, where the X index differences are differences between index values of the X first patches and index values of the X reference patches that correspondingly match the X first patches.

In one embodiment, the matching information includes either of the following:

index values of the X first patches and index values of the X reference patches that correspondingly match the X first patches; or index values of the X first patches and X index differences respectively corresponding to the X first patches, where the X index differences are differences between the index values of the X first patches and index values of the X reference patches that correspondingly match the X first patches.

In one embodiment, the method further includes:

encoding X groups of auxiliary information differences into the bitstream, where the X groups of auxiliary information differences respectively indicate differences between auxiliary information of the X first patches and auxiliary information of the X reference patches.

In one embodiment, the method further includes: encoding X into the bitstream; or the method further includes: determining a fourth quantity of bits for coding based on M, and encoding X into the bitstream by using the fourth quantity of bits for coding.

According to a thirteenth aspect, an embodiment of this application provides a decoding method, including:

parsing a bitstream to obtain matching information, where the matching information is used to indicate a matching relationship between X first patches and X reference patches, X represents a quantity of first patches that match a reference patch in a current frame, the reference patch is included in a reference frame of the current frame, X is less than or equal to M, both X and M are positive integers, and M represents a quantity of first patches in the current frame; and obtaining auxiliary information of the X first patches based on the matching information.

In one embodiment, the obtaining auxiliary information of the X first patches based on the matching information includes:

determining the X reference patches based on the matching information; and obtaining the auxiliary information of the X first patches based on auxiliary information of the X reference patches.

In one embodiment, the matching information includes either of the following:

index values of the X reference patches that correspondingly match the X first patches; or X index differences, where the X index differences are differences between index values of the X first patches and index values of the X reference patches that correspondingly match the X first patches.

In one embodiment, the matching information includes either of the following:

index values of the X first patches and index values of the X reference patches that correspondingly match the X first patches; or index values of the X first patches and X index differences respectively corresponding to the X first patches, where the X index differences are differences between the index values of the X first patches and index values of the X reference patches that correspondingly match the X first patches.

In one embodiment, the method further includes:

parsing the bitstream to obtain X groups of auxiliary information differences, where the X groups of auxiliary information differences respectively indicate differences between the auxiliary information of the X first patches and the auxiliary information of the X reference patches; and the obtaining auxiliary information of the X first patches based on the matching information includes:

determining the X reference patches based on the matching information; and obtaining the auxiliary information of the X first patches based on the X groups of auxiliary information differences and the auxiliary information of the X reference patches.

In one embodiment, the method further includes: parsing the bitstream to obtain X; or the method further includes: determining a fourth quantity of bits for coding based on M, and parsing the bitstream by using the fourth quantity of bits for coding, to obtain X.

According to a fourteenth aspect, an embodiment of this application provides a decoding method, including:

parsing a bitstream to obtain second identification information;

if the second identification information is a fourth symbol, obtaining, from the bitstream, Z pieces of identification information corresponding to Z types of auxiliary information; and if identification information corresponding to a $k^{th}$ type of auxiliary information is a second symbol, obtaining a third quantity of bits for coding from the bitstream, and obtaining a $k^{th}$ type of auxiliary information of Y first patches from the bitstream by using the third quantity of bits for coding, where the third quantity of bits for coding is a quantity of bits required for coding a maximum value Ak of the $k^{th}$ type of auxiliary information of the Y first patches, $k=1, \ldots, Z$, $Z \geq 1$, and both Y and Z are positive integers.

In one embodiment, the method further includes:

if the second identification information is a third symbol, determining a second quantity of bits for coding based on a maximum value Bk of a $k^{th}$ type of auxiliary information of X first patches in a current frame, and obtaining the $k^{th}$ type of auxiliary information of the Y first patches other than the X first patches in the current frame from the bitstream by using the second quantity of bits for coding, where Y=M−X, X, Y, and M are all positive integers, and M represents a quantity of first patches in the current frame.

In one embodiment, the method further includes:

if the identification information corresponding to the $k^{th}$ type of auxiliary information is a first symbol, determining the second quantity of bits for coding based on the maximum value Bk of the $k^{th}$ type of auxiliary information of the X first patches, and obtaining the $k^{th}$ type of auxiliary information of the Y first patches from the bitstream by using the second quantity of bits for coding.

According to a fifteenth aspect, an embodiment of this application provides a decoding method, including:

parsing a bitstream to obtain second identification information;

if the second identification information is a fourth symbol, obtaining first identification information from the bitstream; and if a bit, corresponding to a $k^{th}$ type of auxiliary information, in the first identification information is a second symbol, obtaining a third quantity of bits for coding from the bitstream, and obtaining a $k^{th}$ type of auxiliary information of Y first patches from the bitstream by using the third quantity of bits for coding, where the third quantity of bits for coding is a quantity of bits required for coding a maximum value Ak of the $k^{th}$ type of auxiliary information of the Y first patches, $k=1, \ldots, Z$, $Z \geq 1$, and both Y and Z are positive integers.

In one embodiment, the method further includes:

if the second identification information is a third symbol, determining a second quantity of bits for coding based on a maximum value Bk of a $k^{th}$ type of auxiliary information of X first patches in a current frame, and obtaining the $k^{th}$ type of auxiliary information of the Y first patches other than the X first patches in the current frame from the bitstream by using the second quantity of bits for coding, where Y=M−X, X, Y, and M are all positive integers, and M represents a quantity of first patches in the current frame.

In one embodiment, the method further includes:

if the bit, corresponding to the $k^{th}$ type of auxiliary information, in the first identification information is a first symbol, determining the second quantity of bits for coding based on the maximum value Bk of the $k^{th}$ type of auxiliary information of the X first patches, and obtaining the $k^{th}$ type of auxiliary information of the Y first patches from the bitstream by using the second quantity of bits for coding.

According to a sixteenth aspect, an embodiment of this application provides a decoding method, including:

parsing a bitstream to obtain second identification information;

if the second identification information is a fourth symbol, obtaining, from the bitstream, Z pieces of identification information corresponding to Z types of auxiliary information;

if identification information corresponding to a $k^{th}$ type of auxiliary information is a second symbol, obtaining a difference from the bitstream, where the difference is a difference between a quantity of bits required for coding a maximum value Ak of a $k^{th}$ type of auxiliary information of Y first patches other than X first patches in a current frame and a quantity of bits required for coding a maximum value Bk of a $k^{th}$ type of auxiliary information of the X first patches in the current frame;

obtaining a third quantity of bits for coding based on the difference and the quantity of bits required for coding the maximum value Bk, where the third quantity of bits for coding is a quantity of bits required for coding the maximum value Ak of the $k^{th}$ type of auxiliary information of the Y first patches; and obtaining the $k^{th}$ type of auxiliary information of the Y first patches from the bitstream by using the third quantity of bits for coding, where k=1, ..., Z, Z≥1, Y=M−X, X, Y, and M are all positive integers, and M represents a quantity of first patches in the current frame.

In one embodiment, the method further includes:

if the second identification information is a third symbol, determining a second quantity of bits for coding based on the maximum value Bk of the $k^{th}$ type of auxiliary information of the X first patches in the current frame, and obtaining the $k^{th}$ type of auxiliary information of the Y first patches other than the X first patches in the current frame from the bitstream by using the second quantity of bits for coding, where Y=M−X, X, Y, and M are all positive integers, and M represents the quantity of first patches in the current frame.

In one embodiment, the method further includes:

if the identification information corresponding to the $k^{th}$ type of auxiliary information is a first symbol, determining the second quantity of bits for coding based on the maximum value Bk of the $k^{th}$ type of auxiliary information of the X first patches in the current frame, and obtaining the $k^{th}$ type of auxiliary information of the Y first patches from the bitstream by using the second quantity of bits for coding, where Y=M−X, X, Y, and M are all positive integers, and M represents the quantity of first patches in the current frame.

According to a seventeenth aspect, an embodiment of this application provides a decoding method, including:

parsing a bitstream to obtain second identification information;

if the second identification information is a fourth symbol, obtaining first identification information from the bitstream;

if a bit, corresponding to a $k^{th}$ type of auxiliary information, in the first identification information is a second symbol, obtaining a difference from the bitstream, where the difference is a difference between a quantity of bits required for coding a maximum value Ak of a $k^{th}$ type of auxiliary information of Y first patches other than X first patches in a current frame and a quantity of bits required for coding a maximum value Bk of a $k^{th}$ type of auxiliary information of the X first patches in the current frame;

obtaining a third quantity of bits for coding based on the difference and the quantity of bits required for coding the maximum value Bk, where the third quantity of bits for coding is a quantity of bits required for coding the maximum value Ak of the $k^{th}$ type of auxiliary information of the Y first patches; and obtaining the $k^{th}$ type of auxiliary information of the Y first patches from the bitstream by using the third quantity of bits for coding, where k=1, ..., Z, Z≥1, Y=M−X, X, Y, and M are all positive integers, and M represents a quantity of first patches in the current frame.

In one embodiment, the method further includes:

if the second identification information is a third symbol, determining a second quantity of bits for coding based on the maximum value Bk of the $k^{th}$ type of auxiliary information of the X first patches in the current frame, and obtaining the $k^{th}$ type of auxiliary information of the Y first patches other than the X first patches in the current frame from the bitstream by using the second quantity of bits for coding, where Y=M−X, X, Y, and M are all positive integers, and M represents the quantity of first patches in the current frame.

In one embodiment, the method further includes:

if the bit, corresponding to the $k^{th}$ type of auxiliary information, in the first identification information is a first symbol, determining the second quantity of bits for coding based on the maximum value Bk of the $k^{th}$ type of auxiliary information of the X first patches, and obtaining the $k^{th}$ type of auxiliary information of the Y first patches from the bitstream by using the second quantity of bits for coding.

According to an eighteenth aspect, an embodiment of this application provides an apparatus for determining a matching relationship between patches, including a memory and a processor, where the memory is configured to store a program instruction; and the processor is configured to:

obtain M first patches in a current frame and N reference patches in a reference frame of the current frame, where both M and N are positive integers; and determine a matching relationship between X first patches and X reference patches based on the M first patches and the N reference patches, where X is less than or equal to M.

In one embodiment, the processor is specifically configured to:

obtain association values between the M first patches and the N reference patches based on the M first patches and the N reference patches; and determine the matching relationship between the X first patches and the X reference patches based on the association values between the M first patches and the N reference patches.

In one embodiment, the processor is specifically configured to:

for an $i^{th}$ reference patch in the N reference patches, where i=1, ..., N, obtain association values between j first patches on which matching is unsuccessfully performed and the $i^{th}$ reference patch, and determine a maximum association value Qik in the j association values, where the j first patches on which matching is unsuccessfully performed include: a first patch, in the M first patches in the current frame, that does not match (i−1) reference patches prior to the $i^{th}$ reference patch and whose projection direction is the same as a projection direction of the $i^{th}$ reference patch, where j is less than or equal to M, k is less than or equal to j, and j, k, and M are all positive integers; and if Qik is greater than a preset threshold, determine that a $k^{th}$ first patch corresponding to Qik matches the $i^{th}$ reference patch, where the $k^{th}$ first patch is one of the j first patches on which matching is unsuccessfully performed.

In one embodiment, the association value is a quotient obtained by dividing a first reference value by a second reference value; and the first reference value is an area of an intersection region of a first occupancy matrix and a second occupancy matrix, and the second reference value is an area of a union region of the first occupancy matrix and the second occupancy matrix; or the first reference value is a quantity of samples included in an intersection region of an effective region of a first occupancy matrix and an effective region of a second occupancy matrix, and the second reference value is a quantity of samples included in a union region of the effective region of the first occupancy matrix and the effective region of the second occupancy matrix; where the effective region of the first occupancy matrix is an actually occupied region obtained by projecting a $j^{th}$ first patch onto a two-dimensional plane in a projection direction, the effective region of the second occupancy matrix is an actually occupied region obtained by projecting an $i^{th}$ second patch onto the two-dimensional plane in the projection direction, the first occupancy matrix is a matrix region that corresponds to the actually occupied region obtained by projecting the $j^{th}$ first patch onto the two-dimensional plane in the projection direction, and the second occupancy matrix is a matrix region that corresponds to the actually occupied region obtained by projecting the $i^{th}$ second patch onto the two-dimensional plane in the projection direction.

In one embodiment, the processor is specifically configured to:

determine, based on a sorting order of the N reference patches in the reference frame and a sorting order of the M first patches in the current frame, that the X first patches respectively match the X reference patches.

In one embodiment, the processor is further configured to:

sort the X first patches in the current frame based on a sequence of matching between the X first patches and the X reference patches; and arrange, after the X first patches, at least one first patch other than the X first patches in the current frame.

According to a nineteenth aspect, an embodiment of this application provides an encoding apparatus, including:

an obtaining module, configured to obtain matching information, where the matching information is used to indicate a matching relationship between X first patches and X reference patches, the X reference patches are included in a reference frame of a current frame, X is less than or equal to M, both X and M are positive integers, and M represents a quantity of first patches in the current frame; and an encoding module, configured to encode the matching information into a bitstream.

In one embodiment, the matching information includes either of the following:

index values of the X reference patches that correspondingly match the X first patches; or X index differences, where the X index differences are differences between index values of the X first patches and index values of the X reference patches that correspondingly match the X first patches.

In one embodiment, the matching information includes either of the following:

index values of the X first patches and index values of the X reference patches that correspondingly match the X first patches; or index values of the X first patches and X index differences respectively corresponding to the X first patches, where the X index differences are differences between the index values of the X first patches and index values of the X reference patches that correspondingly match the X first patches.

Optionally, in a possible implementation of the nineteenth aspect, the encoding module is further configured to:

encode X groups of auxiliary information differences into the bitstream, where the X groups of auxiliary information differences respectively indicate differences between auxiliary information of the X first patches and auxiliary information of the X reference patches.

In one embodiment, the encoding module is further configured to encode X into the bitstream; or the encoding module is further configured to: determine a fourth quantity of bits for coding based on M, and encode X into the bitstream by using the fourth quantity of bits for coding.

According to a twentieth aspect, an embodiment of this application provides a decoding apparatus, including a memory and a processor, where the memory is configured to store a program instruction; and the processor is configured to:

parse a bitstream to obtain matching information, where the matching information is used to indicate a matching relationship between X first patches and X reference patches, X represents a quantity of first patches that match a reference patch in a current frame, the reference patch is included in a reference frame of the current frame, X is less than or equal to M, both X and M are positive integers, and M represents a quantity of first patches in the current frame; and obtain auxiliary information of the X first patches based on the matching information.

In one embodiment, the processor is specifically configured to:

determine the X reference patches based on the matching information; and obtain the auxiliary information of the X first patches based on auxiliary information of the X reference patches.

In one embodiment, the matching information includes either of the following:

index values of the X reference patches that correspondingly match the X first patches; or X index differences, where the X index differences are differences between index values of the X first patches and index values of the X reference patches that correspondingly match the X first patches.

In one embodiment, the matching information includes either of the following:

index values of the X first patches and index values of the X reference patches that correspondingly match the X first patches; or index values of the X first patches and X index differences respectively corresponding to the X first patches, where the X index differences are differences between the index values of the X first patches and index values of the X reference patches that correspondingly match the X first patches.

In one embodiment, the processor is further configured to:

parse the bitstream to obtain X groups of auxiliary information differences, where the X groups of auxiliary information differences respectively indicate differences between the auxiliary information of the X first patches and the auxiliary information of the X reference patches; and the processor is specifically configured to:
determine the X reference patches based on the matching information; and
obtain the auxiliary information of the X first patches based on the X groups of auxiliary information differences and the auxiliary information of the X reference patches.

In one embodiment, the processor is further configured to parse the bitstream to obtain X; or the processor is further configured to: determine a fourth quantity of bits for coding based on M, and parse the bitstream by using the fourth quantity of bits for coding, to obtain X.

According to a twenty-first aspect, an embodiment of this application provides a decoding apparatus, including a memory and a processor, where the memory is configured to store a program instruction; and the processor is configured to:

parse a bitstream to obtain second identification information;

if the second identification information is a fourth symbol, obtain, from the bitstream, Z pieces of identification information corresponding to Z types of auxiliary information; and if identification information corresponding to a $k^{th}$ type of auxiliary information is a second symbol, obtain a third quantity of bits for coding from the bitstream, and obtain a $k^{th}$ type of auxiliary information of Y first patches from the bitstream by using the third quantity of bits for coding, where the third quantity of bits for coding is a quantity of bits required for coding a maximum value Ak of the $k^{th}$ type of auxiliary information of the Y first patches, $k=1, \ldots, Z$, $Z \geq 1$, and both Y and Z are positive integers.

In one embodiment, the processor is further configured to:

if the second identification information is a third symbol, determine a second quantity of bits for coding based on a maximum value Bk of a $k^{th}$ type of auxiliary information of X first patches in a current frame, and obtain the $k^{th}$ type of auxiliary information of the Y first patches other than the X first patches in the current frame from the bitstream by using the second quantity of bits for coding, where Y=M−X, X, Y, and M are all positive integers, and M represents a quantity of first patches in the current frame.

In one embodiment, the processor is further configured to:

if the identification information corresponding to the $k^{th}$ type of auxiliary information is a first symbol, determine the second quantity of bits for coding based on the maximum value Bk of the $k^{th}$ type of auxiliary information of the X first patches in the current frame, and obtain the $k^{th}$ type of auxiliary information of the Y first patches from the bitstream by using the second quantity of bits for coding, where Y=M−X, X, Y, and M are all positive integers, and M represents the quantity of first patches in the current frame.

According to a twenty-second aspect, an embodiment of this application provides a decoding apparatus, including a memory and a processor, where the memory is configured to store a program instruction; and the processor is configured to:

parse a bitstream to obtain second identification information;

if the second identification information is a fourth symbol, obtain first identification information from the bitstream; and if a bit, corresponding to a $k^{th}$ type of auxiliary information, in the first identification information is a second symbol, obtain a third quantity of bits for coding from the bitstream, and obtain a $k^{th}$ type of auxiliary information of Y first patches from the bitstream by using the third quantity of bits for coding, where the third quantity of bits for coding is a quantity of bits required for coding a maximum value Ak of the $k^{th}$ type of auxiliary information of the Y first patches, $k=1, \ldots, Z$, $Z \geq 1$, and both Y and Z are positive integers.

In one embodiment, the processor is further configured to:

if the second identification information is a third symbol, determine a second quantity of bits for coding based on a maximum value Bk of a $k^{th}$ type of auxiliary information of X first patches in a current frame, and obtain the $k^{th}$ type of auxiliary information of the Y first patches other than the X first patches in the current frame from the bitstream by using the second quantity of bits for coding, where Y=M−X, X, Y, and M are all positive integers, and M represents a quantity of first patches in the current frame.

In one embodiment, the processor is further configured to:

if the bit, corresponding to the $k^{th}$ type of auxiliary information, in the first identification information is a first symbol, determine the second quantity of bits for coding based on the maximum value Bk of the $k^{th}$ type of auxiliary information of the X first patches in the current frame, and obtain the $k^{th}$ type of auxiliary information of the Y first patches from the bitstream by using the second quantity of bits for coding, where Y=M−X, X, Y, and M are all positive integers, and M represents the quantity of first patches in the current frame.

According to a twenty-third aspect, an embodiment of this application provides a decoding apparatus, including a memory and a processor, where the memory is configured to store a program instruction; and the processor is configured to:

parse a bitstream to obtain second identification information;

if the second identification information is a fourth symbol, obtain, from the bitstream, Z pieces of identification information corresponding to Z types of auxiliary information;

if identification information corresponding to a $k^{th}$ type of auxiliary information is a second symbol, obtain a difference from the bitstream, where the difference is a difference between a quantity of bits required for coding a maximum value Ak of a $k^{th}$ type of auxiliary information of Y first patches other than X first patches in a current frame and a quantity of bits required for coding a maximum value Bk of a $k^{th}$ type of auxiliary information of the X first patches in the current frame;

obtain a third quantity of bits for coding based on the difference and the quantity of bits required for coding the maximum value Bk, where the third quantity of bits for coding is a quantity of bits required for coding the maximum value Ak of the $k^{th}$ type of auxiliary information of the Y first patches; and obtain the $k^{th}$ type of auxiliary information of the Y first patches from the bitstream by using the third quantity of bits for coding, where $k=1, \ldots, Z$, $Z \geq 1$, Y=M−X, X, Y, and M are all positive integers, and M represents a quantity of first patches in the current frame.

In one embodiment, the processor is further configured to:

if the second identification information is a third symbol, determine a second quantity of bits for coding based on the maximum value Bk of the $k^{th}$ type of auxiliary information of the X first patches in the current frame, and obtain the $k^{th}$ type of auxiliary information of the Y first patches other than the X first patches in the current frame from the bitstream by using the second quantity of bits for coding, where Y=M−X, X, Y, and M are all positive integers, and M represents the quantity of first patches in the current frame.

In one embodiment, the processor is further configured to:

if the identification information corresponding to the $k^{th}$ type of auxiliary information is a first symbol, determine the second quantity of bits for coding based on the maximum value Bk of the $k^{th}$ type of auxiliary information of the X first patches, and obtain the $k^{th}$ type of auxiliary information of the Y first patches from the bitstream by using the second quantity of bits for coding.

According to a twenty-fourth aspect, an embodiment of this application provides a decoding apparatus, including a memory and a processor, where the memory is configured to store a program instruction; and the processor is configured to:

parse a bitstream to obtain second identification information;

if the second identification information is a fourth symbol, obtain first identification information from the bitstream; and if a bit, corresponding to a $k^{th}$ type of auxiliary information, in the first identification information is a second symbol, obtain a difference from the bitstream, where the difference is a difference between a quantity of bits required for coding a maximum value Ak of a $k^{th}$ type of auxiliary information of Y first patches other than X first patches in a current frame and a quantity of bits required for coding a maximum value Bk of a $k^{th}$ type of auxiliary information of the X first patches in the current frame;

obtain a third quantity of bits for coding based on the difference and the quantity of bits required for coding the maximum value Bk, where the third quantity of bits for coding is a quantity of bits required for coding the maximum value Ak of the $k^{th}$ type of auxiliary information of the Y first patches; and obtain the $k^{th}$ type of auxiliary information of the Y first patches from the bitstream by using the third quantity of bits for coding, where k=1, ..., Z, Z≥1, Y=M−X, X, Y, and M are all positive integers, and M represents a quantity of first patches in the current frame.

In one embodiment, the processor is further configured to:

if the second identification information is a third symbol, determine a second quantity of bits for coding based on the maximum value Bk of the $k^{th}$ type of auxiliary information of the X first patches in the current frame, and obtain the $k^{th}$ type of auxiliary information of the Y first patches other than the X first patches in the current frame from the bitstream by using the second quantity of bits for coding, where Y=M−X, X, Y, and M are all positive integers, and M represents the quantity of first patches in the current frame.

In one embodiment, the processor is further configured to:

if the bit, corresponding to the $k^{th}$ type of auxiliary information, in the first identification information is a first symbol, determine the second quantity of bits for coding based on the maximum value Bk of the $k^{th}$ type of auxiliary information of the X first patches, and obtain the $k^{th}$ type of auxiliary information of the Y first patches from the bitstream by using the second quantity of bits for coding.

The embodiments of this application provide the encoding method, the decoding method, and the apparatus. The X first patches are determined from the M first patches in the current frame by using a correlation between point cloud data of two adjacent frames, where there is a preset matching relationship between the X first patches and the X second patches in the previous frame of the current frame; the X groups of auxiliary information differences are obtained based on the auxiliary information of the X first patches and the auxiliary information of the X second patches; and the X groups of auxiliary information differences are encoded. This reduces a coding loss and improves coding performance.

DESCRIPTION OF EMBODIMENTS

Embodiments of this application provide an encoding method, a decoding method, and an apparatus, to resolve an existing technical problem of a coding/compression performance loss resulting from separately processing of point cloud data of each frame.

The following briefly describes an existing point cloud data processing method. Four stages are included: a point cloud data partitioning stage, a point cloud data packing (or referred to as packing) stage, an auxiliary information encoding stage, and an auxiliary information decoding stage.

(1) Point Cloud Data Partitioning Stage

Point cloud data is partitioned according to a preset rule to obtain a plurality of patches. Each patch is a connected component region, and there is no overlapping region between any two patches.

Figure 1:
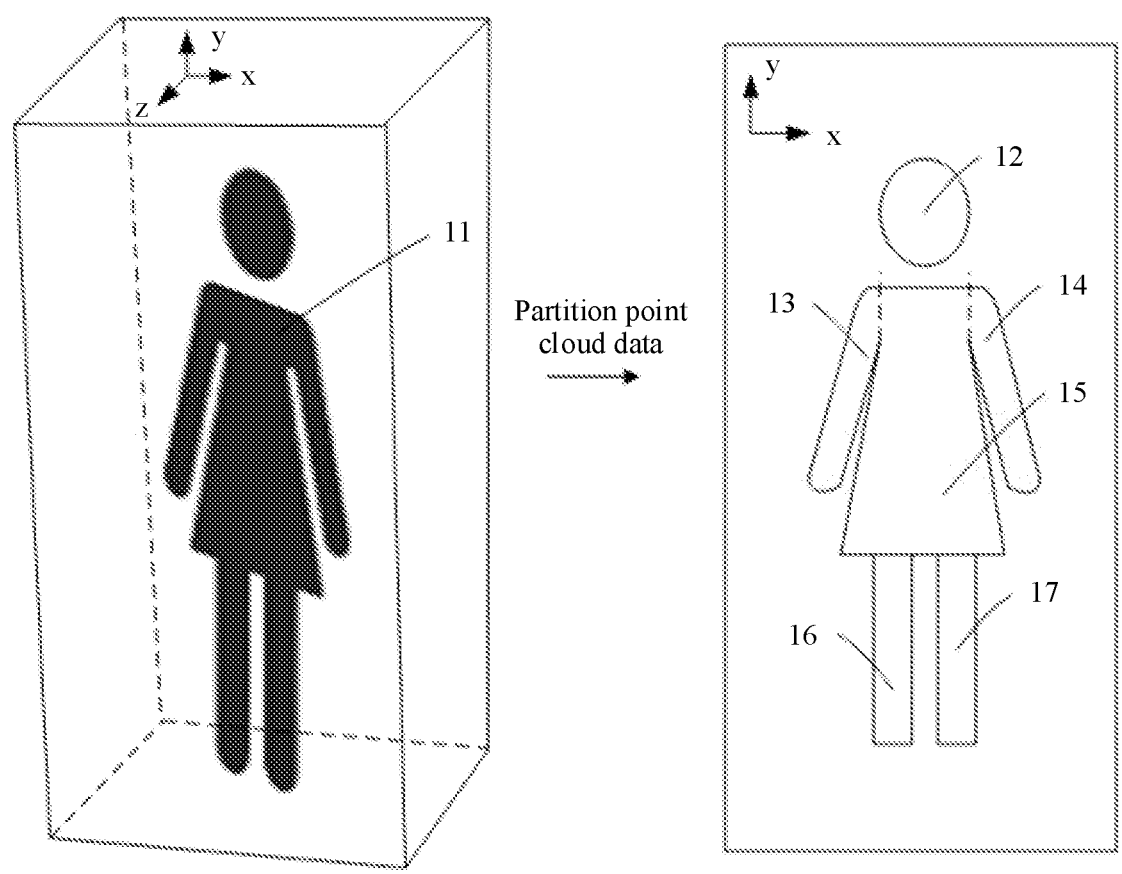
FIG. 1 is a schematic diagram of existing point cloud data partitioning.

For example, FIG. 1 is a schematic diagram of existing point cloud data partitioning. The left side of FIG. 1 shows point cloud data in a three-dimensional coordinate system, where the point cloud data includes a set of point data, obtained by using a measuring instrument, of an appearance surface of a human portrait 11. The three-dimensional coordinate system includes an x-axis, a y-axis, and a z-axis. Using a negative direction of the z-axis as a projection direction, the right side of FIG. 1 shows a partitioning result of the point cloud data. For ease of description, a patch is described by using a two-dimensional plane determined based on the x-axis and the y-axis. As shown in the right side of FIG. 1, the point cloud data may be partitioned into six patches: a patch 2 to a patch 17.

It should be noted that there are a total of six projection directions in the three-dimensional coordinate system based on the three coordinate axes: a positive direction of the x-axis, a negative direction of the x-axis, a positive direction of the y-axis, a negative direction of the y-axis, a positive direction of the z-axis, and a negative direction of the z-axis. Point cloud data may be partitioned in at least one projection direction to form a plurality of patches.

(2) Point Cloud Data Packing Stage

A packing is an optimization issue in mathematics, and the packing means how to place boxes of different sizes into one container, to make the container denser or using fewer containers. A point cloud data packing means projecting a plurality of patches in various shapes from three dimensions to two dimensions in a projection direction, so that all the patches can be densely arranged in one two-dimensional image according to a specific rule, to make the two-dimensional image include fewer gaps or make a target image smaller. Such a process of arranging all the patches is referred to as point cloud data packing (packing). At the stage, the patches can be projected from three dimensions to two dimensions, and auxiliary information corresponding to the patches can be obtained. Related concepts are first described.

1. Projection Image

Patches are projected from three dimensions to two dimensions and then form a two-dimensional projection image based on a packing sequence.

The projection image may include a depth projection map and a texture projection map. The depth projection map is a two-dimensional image that is generated based on the packing sequence by using depth maps obtained by projecting various patches. The texture projection map is a two-dimensional image that is generated based on the packing sequence by using texture maps obtained by projecting various patches. The width and the height of the depth projection map may be the same as those of the texture projection map.

2. Occupancy Map

The occupancy map is a two-dimensional binary image, and is used to indicate whether a pixel location in the projection image is occupied by a point in point cloud data. Generally, to reduce a quantity of used coding bits, resolution of the occupancy map is lower than that of the projection image.

Figure 2:
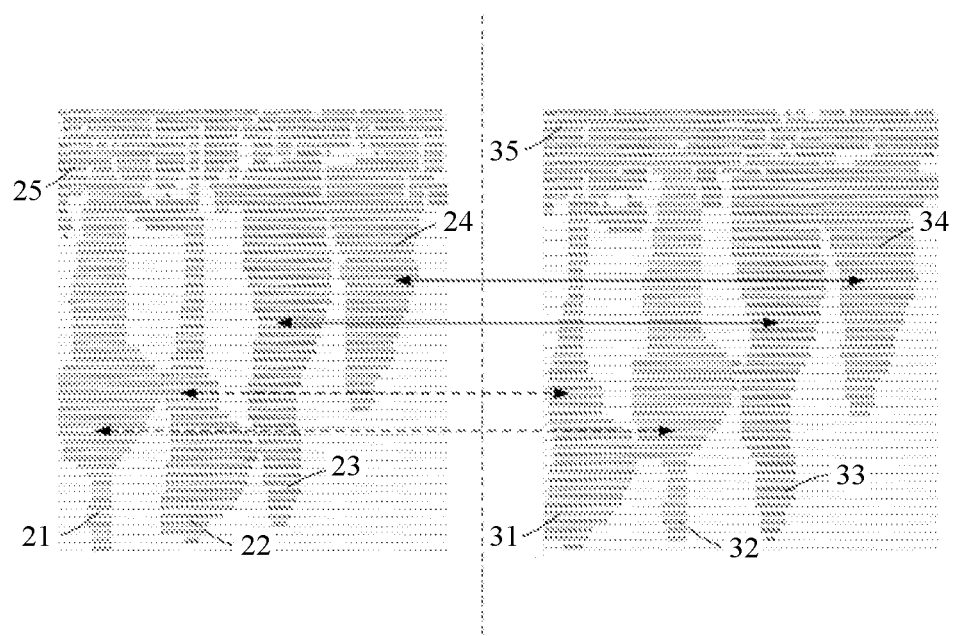
FIG. 2 is a schematic diagram of an existing occupancy map.

For example, FIG. 2 is a schematic diagram of an existing occupancy map. The left side and the right side of FIG. 2 respectively show occupancy maps corresponding to patches in two adjacent frames. Different letters represent different projection directions or normal axes of the patches. Letters A to F may respectively represent projection directions or normal axes: a positive direction of an x-axis, a negative direction of the x-axis, a positive direction of a y-axis, a negative direction of the y-axis, a positive direction of a z-axis, and a negative direction of the z-axis. For example, patches 21 to 25 are included on the left side of FIG. 2, and patches 31 to 35 are included on the right side of FIG. 2. It indicates that points (samples) displayed by using consecutively distributed same letters are occupied by one patch, and a region actually occupied by the patch may be referred to as an effective region. It indicates that points that are not displayed by a letter are not occupied by point cloud data, and a region formed by these points may be referred to as an ineffective region.

3. Auxiliary Information

The auxiliary information may indicate location information of a patch. The following provides a description based on Table 1.

In Table 1, u1, v1, and d1 indicate a location of a patch in a three-dimensional coordinate system. After partitioning of point cloud data is completed, u1, v1, and d1 of the patch may be obtained. In Table 1, sizeU and sizeV indicate the width and the height of a patch in a projection image. After the patch is projected from three dimensions to two dimensions in a projection direction, sizeU and sizeV may be obtained. There may be a specific correspondence between sizeU and sizeU0 and a specific correspondence between sizeV and sizeV0. Specifically, the correspondence may be related to resolution of an occupancy map. u0, v0, sizeU0, and sizeV0 indicate a location of a patch in the occupancy map. sizeU0 and sizeV0 may be obtained based on sizeU and sizeV. u0 and v0 may be obtained by densely arranging all patches in the occupancy map according to a specific rule.

TABLE 1

Auxiliary information of a patch

| | Name | Description |
|---|---|---|
| Auxiliary information | u1 | Minimum x-coordinate value of the patch in a three-dimensional coordinate system |
| | v1 | Minimum y-coordinate value of the patch in the three-dimensional coordinate system |
| | d1 | Minimum z-coordinate value of a patch in the three-dimensional coordinate system |
| | u0 | Minimum x-coordinate value of the patch in an occupancy map |
| | v0 | Minimum y-coordinate value of the patch in the occupancy map |
| | sizeU | Width of the patch in a projection image |
| | sizeV | Height of the patch in the projection image |
| | sizeU0 | Width of the patch in the occupancy map |
| | sizeV0 | Height of the patch in the occupancy map |
| | normalAxis | Index of a normal axis or a projection direction of the patch whose value ranges, for example, from 0 to 2 and that corresponds to an x-axis, ay-axis, and a z-axis |
| | Occupancy | Occupancy map (occupancy map) of the patch |
| | Occupancy Resolution | Resolution of the occupancy map whose value is for example, 16 |
| | Depth | Depth map formed after projection is performed on the patch |

Figure 3:
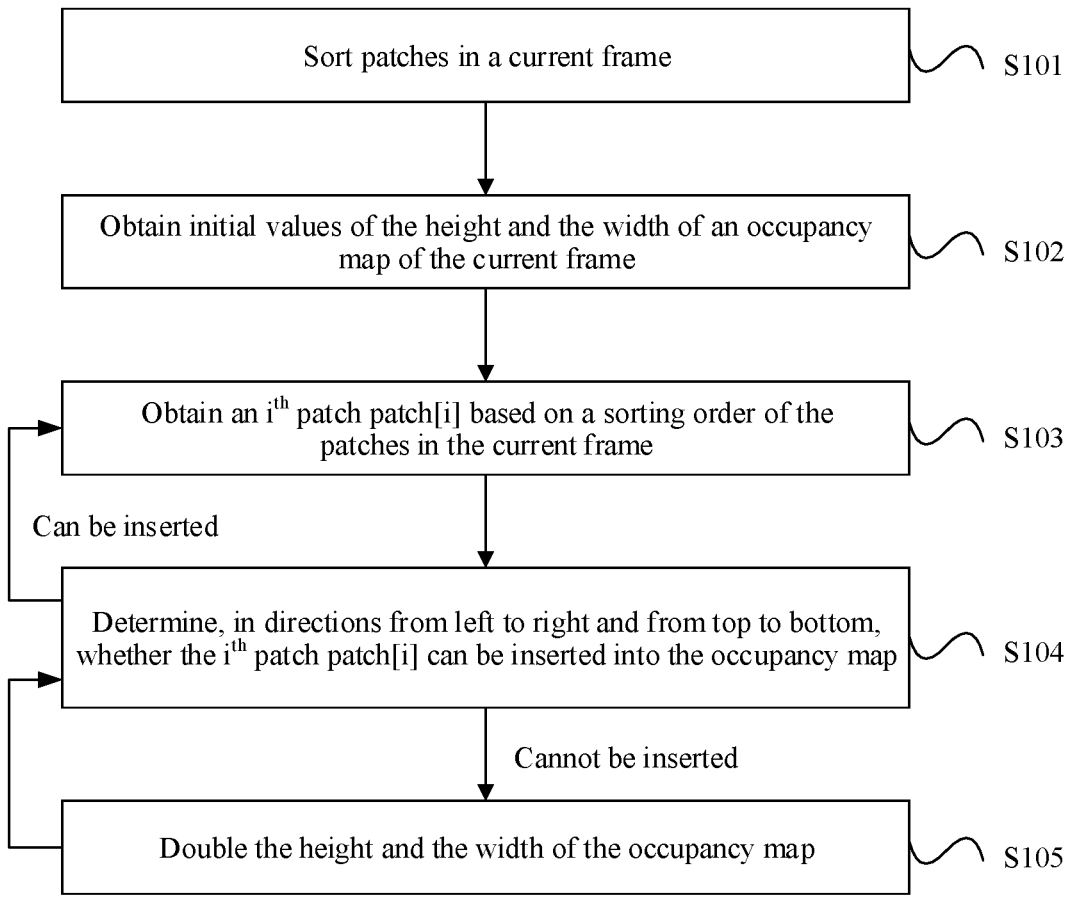
FIG. 3 is a flowchart of an existing point cloud data packing method.

FIG. 3 is a flowchart of an existing point cloud data packing method. As shown in FIG. 3, the existing point cloud data packing method is used for separately processing point cloud data of each frame, and may include the following operations.

S101. Sort patches in a current frame.

Specifically, patches may be sorted in descending order of heights of the patches after the patches are projected onto a two-dimensional plane. For a plurality of patches with a same height, the plurality of patches may be sorted in descending order of widths of the patches after the plurality of patches are projected onto the two-dimensional plane, so that sorting all patches can be completed. According to the foregoing method, a sorting order of the patches in the current frame may be obtained as follows: patch[1], . . . , patch[i], . . . , patch[M], where $0<i \leq M$, and M represents a quantity of patches in the current frame.

S102. Obtain initial values of the height and the width of an occupancy map of the current frame.

Calculation formulas are as follows:

minimum value of the width of an occupancy map=minimum value of the width of a projection image/resolution of the occupancy map;

initial value of the width of the occupancy map=max (minimum value of the width of the occupancy map, width of an $i^{th}$ patch in the occupancy map+1), where $0<i \le M$;

minimum value of the height of the occupancy map=minimum value of the height of the projection image/resolution of the occupancy map;

initial value of the height of the occupancy map=max (minimum value of the height of the occupancy map, height of the $i^{th}$ patch in the occupancy map), where $0<i \le M$; and initial size of the occupancy map=initial value of the height of the occupancy map x initial value of the width of the occupancy map.

S103. Obtain the $i^{th}$ patch patch[i] based on the sorting order of the patches in the current frame, where $0<i \le M$.

S104. Determine, in directions from left to right and from top to bottom, whether the $i^{th}$ patch patch[i] can be inserted into the occupancy map.

If the $i^{th}$ patch patch[i] can be inserted, a location (u0, v0) of the $i^{th}$ patch patch[i] in the occupancy map is obtained. Then, S103 is performed again, until an $M^{th}$ patch patch[M] is obtained.

If a location at which the $i^{th}$ patch patch[i] can be inserted into the occupancy map does not exist, S105 is performed.

A new patch cannot be inserted at locations that have been occupied by the patches in the occupancy map.

S105. Double the height and the width of the occupancy map.

In addition, S104 is performed again, until the $i^{th}$ patch patch[i] can be inserted.

The following provides a description with reference to FIG. 2 by using a specific example.

Referring to the left side of FIG. 2, it is assumed that the first five patches are successively sorted as the patches 21 to 25, and projection directions are respectively identified by letters C, F, A, D, A. Assuming that the occupancy map is large enough, S105 is not performed. The point cloud data packing method is as follows: obtaining the patch 21 based on a sorting order of the patches, and inserting the patch 21 into the occupancy map in directions from left to right and from top to bottom; obtaining the patch 22, and inserting the patch 22 into the occupancy map in the directions from left to right and from top to bottom; obtaining the patch 23, and inserting the patch 23 into the occupancy map in the directions from left to right and from top to bottom; obtaining the patch 24, and inserting the patch 24 into the occupancy map in the directions from left to right and from top to bottom; and obtaining the patch 25, and inserting the patch 25 into the occupancy map in the directions from left to right and from top to bottom.

After point cloud data packing is completed, locations, in the occupancy map, of all the patches in the current frame may be determined. Then, auxiliary information of the patches may be encoded.

(3) Auxiliary Information Encoding Stage

Encoding the following several types of auxiliary information of a patch is mainly included. The auxiliary information may include at least one of u0, v0, u1, v1, d1, sizeU0, and sizeV0. Fixed-length coding with a fixed quantity of bits may be used for u0, v0, u1, v1, and d1. Index Golomb-Rice coding may be used for sizeU0 and sizeV0. It should be noted that the foregoing encoding method may also be used for encoding other auxiliary information.

Input information in the encoding method is the quantity M of patches in the current frame and auxiliary information of each patch. The input information may be encoded to obtain a bitstream, and the bitstream is used as input information of a decoding apparatus.

Figure 4:
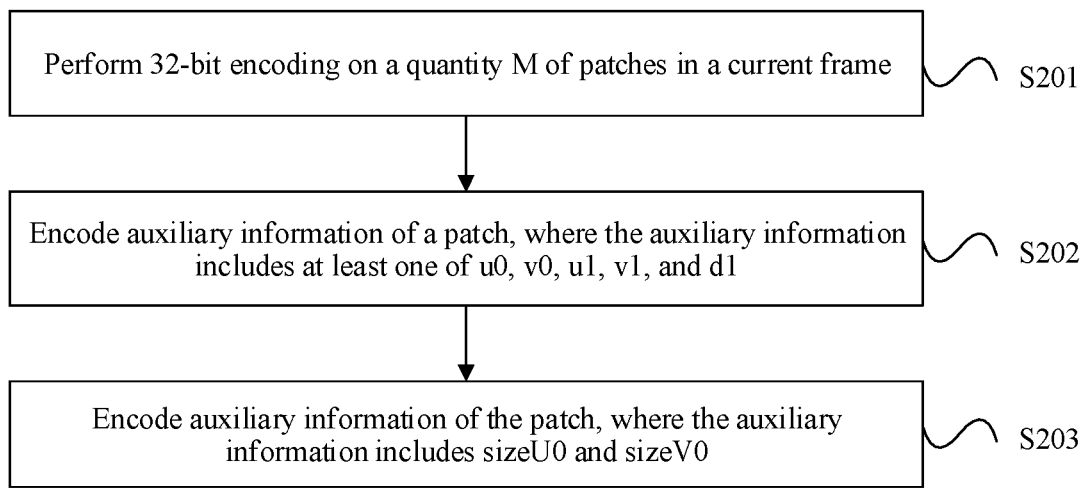
FIG. 4 is a flowchart of an existing encoding method.

FIG. 4 is a flowchart of an existing encoding method. As shown in FIG. 4, the existing encoding method is used for separately processing auxiliary information of a patch in each frame, and may include the following operations.

S201. Perform 32-bit encoding on a quantity M of patches in a current frame.

For example, M is equal to 200. A bitstream obtained after encoding may include 0×C8.

S202. Encode auxiliary information of a patch, where the auxiliary information includes at least one of u0, v0, u1, v1, and d1.

For each type of auxiliary information, a maximum value of the type of auxiliary information of all patches in the current frame is obtained. A quantity of bits required for coding is determined based on the maximum value, and 8-bit encoding is performed on the quantity of bits for coding. The type of auxiliary information of all the patches in the current frame is encoded by using the quantity of bits for coding.

The following provides a description by using specific examples.

It is assumed that the auxiliary information includes u0 and v0, there are three patches in the current frame, decimal values of auxiliary information u0 of the three patches are 2, 5, and 9, respectively, and decimal values of auxiliary information v0 of the three patches are 3, 4, and 7, respectively.

The encoding method is as follows.

For auxiliary information u0, the auxiliary information u0 of the three patches in the current frame is {2, 5, 9} in which a maximum value is 9. Fixed-length coding with a fixed quantity of bits is used for 9, and a quantity of bits required for coding is 4. 8-bit encoding is first performed on the quantity 4 of bits for coding, and a bitstream obtained after encoding includes 0×4. Then, the auxiliary information u0 of the three patches in the current frame is successively encoded by using the quantity 4 of bits for coding, and a bitstream obtained after encoding includes 0×2, 0×5, and 0×9.

For auxiliary information v0, the auxiliary information v0 of the three patches in the current frame is {3, 4, 7} in which a maximum value is 7. Fixed-length coding with a fixed quantity of bits is used for 7, and a quantity of bits required for coding is 3. 8-bit encoding is first performed on the quantity 3 of bits for coding, and a bitstream obtained after encoding includes 0×3. Then, the auxiliary information v0 of the three patches in the current frame is successively encoded by using the quantity 3 of bits for coding, and a bitstream obtained after encoding includes 0×3, 0×4, and 0×7.

S203. Encode auxiliary information of the patch, where the auxiliary information includes sizeU0 and sizeV0.

For auxiliary information sizeU0, an auxiliary information difference delta_sizeU0=sizeU0−pre_sizeU0 of an $i^{th}$ patch in the current frame is obtained, and index Glomb Rice coding is performed on delta_sizeU0, where sizeU0 represents auxiliary information sizeU0 of the $i^{th}$ patch, pre_sizeU0 represents auxiliary information sizeU0 of an $(i-1)^{th}$ patch, and $0<i \le M$.

For auxiliary information sizeV0, an auxiliary information difference delta_sizeV0=pre_sizeV0−sizeV0 of the $i^{th}$ patch in the current frame is obtained, and the index Glomb Rice coding is performed on delta_sizeV0, where sizeV0 represents auxiliary information sizeV0 of the $i^{th}$ patch, and pre_sizeV0 represents auxiliary information sizeV0 of the $(i-1)^{th}$ patch.

When an auxiliary information difference of the $1^{st}$ patch in the current frame is to be obtained, pre_sizeU0 may be a first preset value, for example, 0; and pre_sizeV0 may be a second preset value.

It should be noted that in an encoding process, an execution sequence of S202 and S203 is not limited. In S202, if there are a plurality of types of auxiliary information, an encoding sequence of various types of auxiliary information is not limited. For example, if there are three types of auxiliary information: u1, v1, and d1, the encoding sequence may be: encoding u1, v1, and d1 of a previous patch in the current frame, encoding u1, v1, and d1 of a current patch in the current frame, encoding u1, v1, and d1 of a next patch in the current frame, and so on. Alternatively, the encoding sequence may be: encoding u1 of all the patches in the current frame, encoding v1 of all the patches in the current frame, and encoding d1 of all the patches in the current frame. Similarly, in S203, an encoding sequence of sizeU0 and sizeV0 is not limited. It should be noted that an encoding apparatus and a decoding apparatus may predefine encoding and decoding sequences.

(4) Auxiliary Information Decoding Stage

Input information in a decoding method is a bitstream output by an encoding apparatus. The decoding method corresponds to the encoding method.

The following describes an existing decoding method by using an example in which auxiliary information includes u0, v0, u1, v1, d1, sizeU0, and sizeV0, and u0, v0, u1, v1, and d1 are encoded before sizeU0 and sizeV0. The existing decoding method is used for separately processing auxiliary information of a patch in each frame, and may include the following operations.

S301. Decode 32 bits from a bitstream to obtain a quantity M of patches in a current frame.

S302. Decode consecutive five 8 bits from the bitstream, to successively obtain quantities of bits required for encoding maximum values of u0, v0, u1, v1, and d1.

S303. Successively perform decoding from the bitstream based on the quantity M of patches in the current frame and the quantities of bits for coding respectively corresponding to u0, v0, u1, v1, and d1, to obtain values of u0, v0, u1, v1, and d1 of the patches in the current frame.

S304. Perform decoding based on the quantity M of patches in the current frame by using the index Glomb Rice method, to obtain a difference delta_sizeU0 for sizeU0 of each patch in the current frame and a difference delta_sizeV0 for sizeV0 of each patch in the current frame; and obtain values of sizeU0 and sizeV0 of each patch in the current frame according to sizeU0=pre_sizeU0+delta_sizeU0 and sizeV0=pre_sizeV0-delta_sizeV0.

It can be learnt that the existing auxiliary information encoding and decoding methods are used only for separately performing encoding processing and decoding processing on the auxiliary information of the patch in each frame, but there is a quite close correlation between point cloud data of consecutive frames, resulting in a compression performance loss of auxiliary information coding.

The following describes, by using specific embodiments, technical solutions in detail in this application and a manner of resolving the foregoing technical problem through the technical solutions in this application. The following several specific embodiments may be combined with each other, and a same or similar concept or process may not be described repeatedly in some embodiments.

In the specification, claims, and accompanying drawings of this application, the terms "first", "second", "third", "fourth", and so on (if existent) are intended to distinguish between similar objects but do not necessarily indicate a specific order or sequence.

Figure 5:
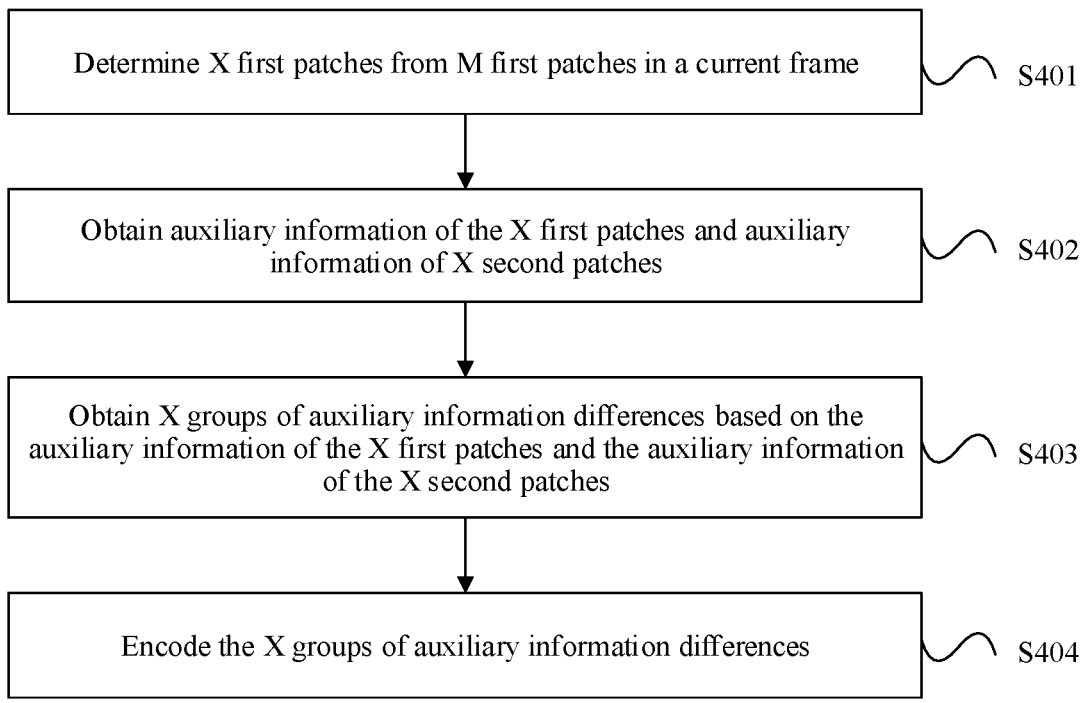
FIG. 5 is a flowchart of an encoding method according to Embodiment 1 of this application.

FIG. 5 is a flowchart of an encoding method according to Embodiment 1 of this application. The encoding method provided in this embodiment may be performed by an encoding apparatus. As shown in FIG. 5, the encoding method provided in this embodiment may include the following operations.

S401. Determine X first patches from M first patches in a current frame.

There is a preset matching relationship between the X first patches and X second patches, the X second patches are included in a previous frame of the current frame, X is less than or equal to M, and both X and M are positive integers.

Specifically, a patch in the current frame may be referred to as a first patch, and a quantity of patches in the current frame is M. A patch in the previous frame of the current frame may be referred to as a second patch. There is the preset matching relationship between the X first patches in the current frame and the X second patches in the previous frame. In other words, it can be learnt from the X first patches and the X second patches that there is a specific correlation between point cloud data of consecutive frames. The correlation can be utilized during subsequent encoding and decoding.

It should be noted that specific values of M and X are not limited in this embodiment. In addition, if a quantity of second patches in the previous frame is defined as N0, X is less than or equal to N0. In other words, X≤min(M, N0), where min(M, N0) is the smaller of M and N0. Optionally, X may be a preset value, and is a value known to the encoding apparatus and a decoding apparatus. For example, X=min(M, N0).

S402. Obtain auxiliary information of the X first patches and auxiliary information of the X second patches.

For the auxiliary information, refer to Table 1. Details are not described herein again.

It should be noted that the auxiliary information may include but is not limited to various types of auxiliary information shown in Table 1, and may further include other patch-related information. Optionally, the auxiliary information may further include an index value of a patch, where the index value indicates a sequence number of the patch in all patches. For example, based on a sorting order of the M first patches in the current frame, index values of the first patches may successively be 0, 1, 2, . . . , M−2, and M−1, or may be 1, 2, . . . , M−1, and M.

S403. Obtain X groups of auxiliary information differences based on the auxiliary information of the X first patches and the auxiliary information of the X second patches.

Specifically, one group of auxiliary information difference may be obtained based on auxiliary information of one first patch and auxiliary information of one second patch. In this way, the X groups of auxiliary information differences are obtained based on the auxiliary information of the X first patches and the auxiliary information of the X second patches. It should be noted that a quantity of types of auxiliary information is not limited in this embodiment. There may be one or more types of auxiliary information. When there is one type of auxiliary information, one group of auxiliary information difference includes only one value. When there are a plurality of types of auxiliary information, one group of auxiliary information difference includes a plurality of values, where each value corresponds to one type of auxiliary information.

The following provides a description with reference to Table 1 by using specific examples.

Assuming that there is one type of auxiliary information that is specifically u0 in Table 1, one group of auxiliary information difference is delta_u0=u0−pre_u0. u0 in the formula represents auxiliary information u0 of a first patch, and pre_u0 in the formula represents auxiliary information u0 of a second patch.

Assuming that there are seven types of auxiliary information that are specifically u0, v0, u1, v1, d1, sizeU0, and sizeV0 in Table 1, one group of auxiliary information difference is delta_x=x−pre_x. x in the formula represents auxiliary information x of a first patch, and pre_x in the formula represents auxiliary information x of a second patch, where x may be u0, v0, u1, v1, d1, sizeU0, or sizeV0. To be specific, the group of auxiliary information difference is {delta_u0, delta_v0, delta_u1, delta_v1, delta_d1, delta_sizeU0, delta_sizeV0}.

In one embodiment, the obtaining X groups of auxiliary information differences based on the auxiliary information of the X first patches and the auxiliary information of the X second patches may include:

determining, based on a sorting order of the X first patches and a sorting order of the X second patches, a difference between auxiliary information of a $k^{th}$ first patch in the X first patches and auxiliary information of a $k^{th}$ second patch in the X second patches as a $k^{th}$ group of auxiliary information difference in the X groups of auxiliary information differences, where k=1, . . . , X.

Specifically, there is the preset matching relationship between the X first patches and the X second patches. In this implementation, a first patch and a second patch with a same sequence number match each other based on the sorting order of the X first patches and the sorting order of the X second patches. Therefore, the difference between the auxiliary information of the $k^{th}$ first patch and the auxiliary information of the $k^{th}$ second patch is determined as the $k^{th}$ group of auxiliary information difference.

Subtraction is correspondingly performed on auxiliary information of each first patch and auxiliary information of a second patch having a same sequence number as the first patch, to obtain the X groups of auxiliary information differences. This simplifies complexity of calculating the differences, thereby increasing an encoding speed.

In one embodiment, the obtaining X groups of auxiliary information differences based on the auxiliary information of the X first patches and the auxiliary information of the X second patches may include:

determining, as the X groups of auxiliary information differences, differences between the auxiliary information of the X first patches and the auxiliary information of the X second patches that correspondingly match the X first patches; and the method may further include:

obtaining matching information, where the matching information indicates the matching relationship between the X first patches and the X second patches; and encoding the matching information.

Specifically, there is the preset matching relationship between the X first patches and the X second patches. In this implementation, a sequence number of a first patch, matching a second patch, in the X first patches may be the same as or different from a sequence number of the second patch in the X second patches. The differences between the auxiliary information of the X first patches and the auxiliary information of the X second patches that correspondingly match the X first patches are determined as the X groups of auxiliary information differences. This improves encoding accuracy, thereby improving coding performance.

In one embodiment, the matching information may include index values of the X first patches and index values of the X second patches. For example, X=3, index values of three first patches are successively 0, 1, 2, and index values of three second patches are successively 0, 1, 2. It is assumed that a first patch whose index value is 0 matches a second patch whose index value is 0, a first patch whose index value is 1 matches a second patch whose index value is 2, and a first patch whose index value is 2 matches a second patch whose index value is 1. In this case, the matching information may include the index values {0, 1, 2} of the three first patches and the index values {0, 2, 1} of the three second patches.

In one embodiment, the matching information may include index values of the X first patches and X index differences, where the X index differences are differences between the index values of the X first patches and index values of the X second patches that match the X first patches. The foregoing example is still used. The index values of the X first patches are {0, 1, 2}, and the index values of the X second patches that match the X first patches are {0, 2, 11}. Then, the X index differences may be {0−0, 1−2, 2−1}={0, −1, 1}. In this case, the matching information may include the index values {0, 1, 2} of the three first patches and the three index differences {0, −1, 1}.

In one embodiment, if sequence numbers of the X first patches are respectively the same as sequence numbers of the X second patches that match the X first patches, the matching information may include 1-bit indication information. Optionally, the 1-bit indication information may be 0 or 1.

The 1-bit indication information is used to indicate that a first patch and a second patch matching each other have a same sequence number. This further compresses a bitstream, thereby improving coding efficiency.

S404. Encode the X groups of auxiliary information differences.

Specifically, because there is the preset matching relationship between the X first patches and the X second patches, the X groups of auxiliary information differences are obtained based on the auxiliary information of the X first patches and the auxiliary information of the X second patches. The X groups of auxiliary information differences are encoded. This considers a correlation between data of two adjacent frames. Therefore, a coding loss is reduced, and coding/compression performance is improved.

It should be noted that a method for encoding the X groups of auxiliary information differences is not limited in this embodiment. An existing encoding method may be used provided that the encoding method corresponds to a decoding method. Optionally, the X groups of auxiliary information differences may be encoded through index Glomb Rice coding.

It can be learnt that in the encoding method provided in this embodiment, the X first patches are determined from the M first patches in the current frame, where there is the preset matching relationship between the X first patches and the X second patches in the previous frame of the current frame; and the X groups of auxiliary information differences obtained based on the auxiliary information of the X first patches and the auxiliary information of the X second patches are encoded. This considers a correlation between data of two adjacent frames. Therefore, a coding loss is reduced, and coding/compression performance is improved.

In one embodiment, the encoding method may further include:

encoding M.

It should be noted that a method for encoding M is not limited in this embodiment. An existing encoding method may be used provided that the encoding method corresponds to a decoding method. Optionally, M may be encoded through fixed-length coding with a preset quantity of bits for coding. A specific value of the preset quantity of bits for coding is not limited in this embodiment, for example, may be 32 bits.

In one embodiment, the encoding method may further include:

encoding X.

Specifically, X is encoded, so that a quantity of first patches in the current frame that match second patches in the previous frame can be clearly known during decoding. This improves coding efficiency.

In one embodiment, the encoding X may include:

determining a fourth quantity of bits for coding based on M; and encoding X by using the fourth quantity of bits for coding.

Specifically, X is less than or equal to M, and therefore a maximum quantity of bits for coding (the fourth quantity of bits for coding) required for encoding X may be determined based on M. Then, X is encoded by using the fourth quantity of bits for coding. This can further compress the bitstream, thereby improving coding/compression performance.

The following provides a description by using a specific example.

For example, M=200, and X=90. It may be determined, based on M=200, that the fourth quantity of bits for coding is 16. In this case, X may be encoded by using 16 bits, and a bitstream obtained after encoding may include 0×5A.

In one embodiment, the preset matching relationship may be determined according to the following operations:

obtaining N second patches in the previous frame of the current frame, where N is a positive integer;

for an $i^{th}$ second patch in the N second patches, where i=1, . . . , N, obtaining association values Qij between j first patches on which matching is unsuccessfully performed and the $i^{th}$ second patch, and determining a maximum association value Qik, where projection directions of the j first patches on which matching is unsuccessfully performed are the same as a projection direction of the $i^{th}$ second patch; and if Qik is greater than a preset threshold, determining that a $k^{th}$ first patch corresponding to Qik matches the $i^{th}$ second patch, where the $k^{th}$ first patch is one of the j first patches on which matching is unsuccessfully performed; or if Qik is less than or equal to a preset threshold, determining that no first patch matches the $i^{th}$ second patch.

The following provides a description by using specific examples.

It is assumed that N=10. Based on a sorting order of second patches, 10 second patches may be identified as pre_patch[i], where i=1, . . . , 10, and corresponding index values may be 1 to 10. It is assumed that M=20. Based on a sorting order of first patches, 20 first patches may be identified as patch[k], where k=1, . . . , 20, and corresponding index values may be 1 to 20. The preset threshold may be identified as thr.

The N second patches are traversed. pre_patch[1] (with an index value 1) is first obtained, and then a first set is traversed. The first set includes T first patches on which matching is unsuccessfully performed. In this case, T=M=20, The first set includes 20 first patches that may be identified as pre_patch[j], where j=1, . . . , 20, and corresponding index values are 1 to 20. It is assumed that first patches in the first set whose projection directions are the same as a projection direction of pre_patch[1] are patch[1] and patch[2]. Then, an association value Q11 between pre_patch[1] and patch[1] and an association value Q12 between pre_patch[1] and patch[2] are obtained. Assuming that Q11>Q12, Q11 is compared with the preset threshold thr. If Q11>thr, it is determined that pre_patch[1] matches patch[1]. In other words, a first patch whose index value is 1 in the current frame matches a second patch whose index value is 1 in the previous frame. patch[1] (with an index value 1) is deleted from the first set, to constitute a new first set. In this case, the new first set includes 19 first patches that may be re-identified as pre_patch[j], where 0<j≤19, and corresponding index values are 2 to 20.

The N second patches continue to be traversed. pre_patch[2] (with an index value 2) is obtained, and the first set is traversed. In this case, T=19. It is assumed that first patches in the first set whose projection directions are the same as a projection direction of pre_patch[2] are patch[3] and patch[4]. Then, an association value Q23 between pre_patch[2] and patch[3] and an association value Q24 between pre_patch[2] and patch[4] are obtained. Assuming that Q24>Q23, Q24 is compared with the preset threshold thr. If Q24<thr, it indicates that no first patch in the current frame matches pre_patch[2]. In this case, the first set remains unchanged. Afterwards, a next second patch continues to be traversed, until all the N second patches are traversed.

It can be learnt that, by traversing the N second patches and the M first patches and comparing association values between first patches and a second patch whose projection directions are the same, all first patches in a one-to-one matching relationship with the N second patches can be determined.

It should be noted that a specific value of the preset threshold is not limited in this embodiment, and is set depending on a requirement.

It should be noted that a specific value of N is not limited in this embodiment, and is set depending on a requirement. N≤N0, and N0 represents the quantity of second patches in the previous frame. It should be noted that a manner of obtaining the N second patches from the N0 second patches is not limited in this embodiment. For example, the first N second patches may be obtained based on a sorting order of the N0 second patches.

In one embodiment, the association value Qij may be a quotient obtained by dividing a first reference value by a second reference value; and the first reference value is an area of an intersection region of a first occupancy matrix and a second occupancy matrix, and the second reference value is an area of a union region of the first occupancy matrix and the second occupancy matrix; or the first reference value is a quantity of samples included in an intersection region of an effective region of a first occupancy matrix and an effective region of a second occupancy matrix, and the second reference value is a quantity of samples included in a union region of the effective region of the first occupancy matrix and the effective region of the second occupancy matrix; where the effective region of the first occupancy matrix is an actually occupied region obtained by projecting a $j^{th}$ first patch onto a two-dimensional plane in a projection direction, the effective region of the second occupancy matrix is an actually occupied region obtained by projecting an $i^{th}$ second patch onto the two-dimensional plane in the projection direction, the first occupancy matrix is a matrix region that corresponds to the effective region of the first occupancy matrix, and the second occupancy matrix is a matrix region that corresponds to the effective region of the second occupancy matrix.

In one embodiment, before the preset matching relationship is determined, the method may further include:

sorting the M first patches.

Specifically, the M first patches may be sorted in descending order of heights of the first patches in an occupancy map. For a plurality of first patches with a same height, the plurality of first patches may be sorted in descending order of widths of the first patches in the occupancy map, so that sorting the M first patches is completed. For example, as shown in the right side of FIG. 2, only a sorting order of the patches 31 to 34 is used as an example for description. A descending order of heights of the patches in the occupancy map is successively: the patch 31, the patch 32, the patch 33, and the patch 34. Because heights of the patch 32 and the patch 33 in the occupancy map are the same, the patch 32 and the patch 33 are sorted in descending order of widths of the patches in the occupancy map. In this case, a sequence obtained after the patch 31 to the patch 34 are sorted is successively: the patch 31, the patch 32, the patch 33, and the patch 34.

Before the matching relationship between the M first patches in the current frame and the N second patches in the previous frame is determined, the M first patches are sorted, so that a speed of matching the first patches and the second patches can be increased, thereby increasing an encoding processing speed.

In one embodiment, if it is determined that there is a matching relationship between O first patches and the N second patches, the determining X first patches from M first patches in a current frame may include:

determining the X first patches from the O first patches, where the O first patches are first patches matching the N second patches, and O≥X.

Specifically, the X first patches may be determined from all first patches matching the N second patches. In other words, X≤O, and O represents a quantity of first patches in a one-to-one matching relationship with the N second patches.

In one embodiment, the preset matching relationship may include:

the $k^{th}$ first patch in the X first patches matches the $k^{th}$ second patch in the X second patches based on the sorting order of the X first patches and the sorting order of the X second patches, where k=1, ..., X.

It is specified that a first patch and a second patch with a same sequence number match each other. This simplifies the matching relationship, thereby increasing an encoding speed.

It should be noted that in an encoding process, an execution sequence of encoding the X groups of auxiliary information differences and encoding M is not limited. If there are a plurality of types of auxiliary information, in a process of encoding the X groups of auxiliary information differences, an encoding sequence of various types of auxiliary information is not limited, provided that the encoding apparatus and the decoding apparatus predefine encoding and decoding sequences.

This embodiment provides the encoding method, including: determining the X first patches from the M first patches in the current frame; obtaining the auxiliary information of the X first patches and the auxiliary information of the X second patches; obtaining the X groups of auxiliary information differences based on the auxiliary information of the X first patches and the auxiliary information of the X second patches; and encoding the X groups of auxiliary information differences and M. According to the encoding method provided in this embodiment, the X groups of auxiliary information differences obtained based on the auxiliary information of the X first patches and the auxiliary information of the X second patches are encoded by using a correlation between point cloud data of two adjacent frames. This reduces a coding loss and improves coding/compression performance.

Figure 6:
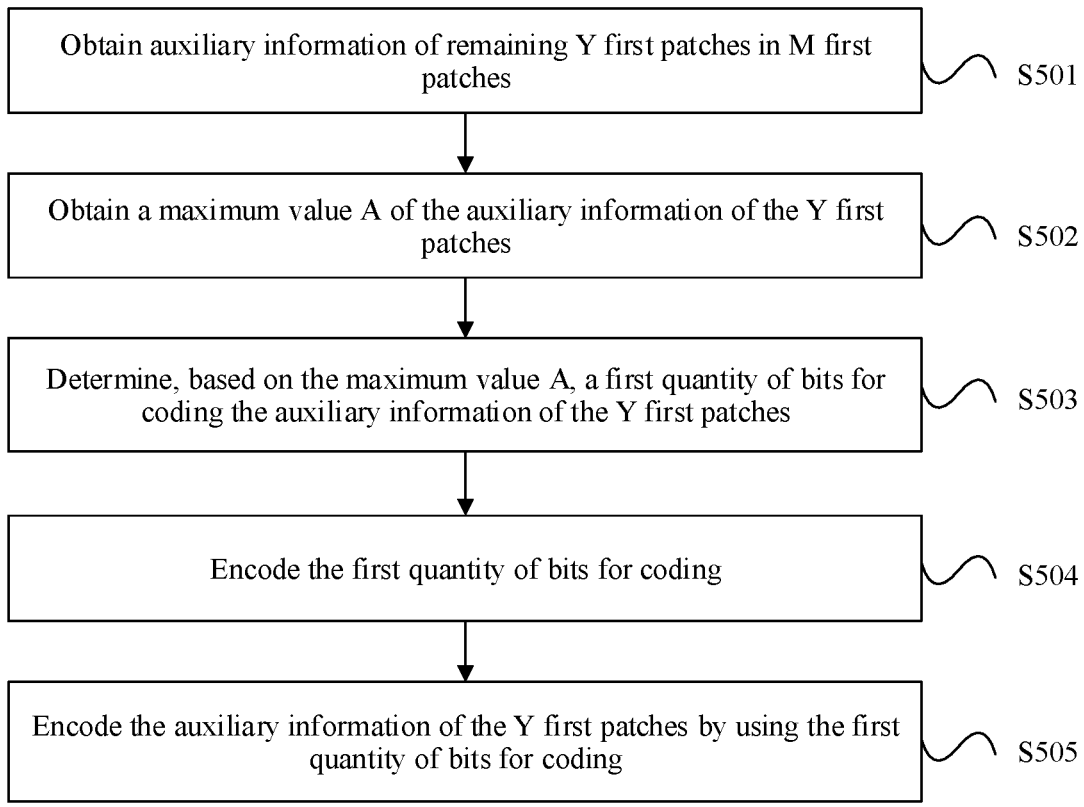
FIG. 6 is a flowchart of an encoding method according to Embodiment 2 of this application.

FIG. 6 is a flowchart of an encoding method according to Embodiment 2 of this application. Based on the method embodiment 1 shown in FIG. 5, the encoding method provided in this embodiment is another implementation of the encoding method, and is mainly a method for encoding auxiliary information of remaining Y first patches in M first patches other than X first patches when X<M. As shown in FIG. 6, the encoding method provided in this embodiment may further include the following operations.

S501. Obtain the auxiliary information of the remaining Y first patches in the M first patches, where Y=M−X in FIG. 5.

S502. Obtain a maximum value A of the auxiliary information of the Y first patches.

S503. Determine, based on the maximum value A, a first quantity of bits for coding the auxiliary information of the Y first patches.

S504. Encode the first quantity of bits for coding.

S505. Encode the auxiliary information of the Y first patches by using the first quantity of bits for coding.

It should be noted that an implementation of encoding the first quantity of bits for coding is not limited in this embodiment. Optionally, the first quantity of bits for coding may be encoded by using a preset quantity of bits. A specific value of the preset quantity of bits for coding is not limited in this embodiment, for example, is 8.

It should be noted that a quantity of types of auxiliary information is not limited in this embodiment. Optionally, the auxiliary information may include at least one of the following: a minimum X-coordinate value (u1) of a patch in a three-dimensional coordinate system, a minimum Y-coordinate value (v1) of the patch in the three-dimensional coordinate system, a minimum Z-coordinate value (d1) of the patch in the three-dimensional coordinate system, a minimum X-coordinate value (u0) of the patch in an occupancy map in a projection direction, and a minimum Y-coordinate value (v0) of the patch in the occupancy map in the projection direction.

The following provides a description with reference to Table 1 by using examples.

It is assumed that M=10, X=7, and Y=3; and the auxiliary information includes u0 and v0. After auxiliary information of seven first patches is encoded, auxiliary information of remaining three first patches needs to be encoded. Decimal values of auxiliary information u0 of the remaining three first patches are 2, 5, and 9, respectively, and decimal values of auxiliary information v0 of the remaining three first patches are 3, 4, and 7, respectively. The preset quantity of bits for coding is 8.

The encoding method is specifically as follows.

For auxiliary information u0, the auxiliary information u0 of the three first patches is {2, 5, 9} in which a maximum value is 9, and a quantity of bits required for coding is 4. 8-bit encoding is first performed on the quantity 4 of bits for coding, and a bitstream obtained after encoding includes 0×4. Then, the auxiliary information u0 of the three first patches is successively encoded by using the quantity 4 of bits for coding, and a bitstream obtained after encoding includes 0×2, 0×5, and 0×9.

For auxiliary information v0, the auxiliary information v0 of the three first patches is {3, 4, 7} in which a maximum value is 7, and a quantity of bits required for coding is 3. 8-bit encoding is first performed on the quantity 3 of bits for coding, and a bitstream obtained after encoding includes 0×3. Then, the auxiliary information v0 of the three first patches is successively encoded by using the quantity 3 of bits for coding, and a bitstream obtained after encoding includes 0×3, 0×4, and 0×7.

It should be noted that in an encoding process, an execution sequence of encoding the auxiliary information of the Y first patches and a first quantity of bits for coding such information is not limited. If there are a plurality of types of auxiliary information, an encoding sequence of various types of auxiliary information is not limited, provided that an encoding apparatus and a decoding apparatus predefine encoding and decoding sequences.

This embodiment provides the encoding method, including: obtaining the auxiliary information of the Y first patches; obtaining the maximum value A of the auxiliary information of the Y first patches; determining, based on the maximum value A, the first quantity of bits for coding the auxiliary information of the Y first patches; encoding the first quantity of bits for coding by using the preset quantity of bits for coding; and encoding the auxiliary information of the Y first patches by using the first quantity of bits for coding. According to the encoding method provided in this embodiment, a required quantity of bits for coding is determined based on the auxiliary information of the remaining Y first patches. This avoids determining the required quantity of bits for coding based on auxiliary information of all the M first patches. In this way, a data volume of to-be-processed data is reduced, coding efficiency and properness are improved, and coding performance is improved.

Figure 7:
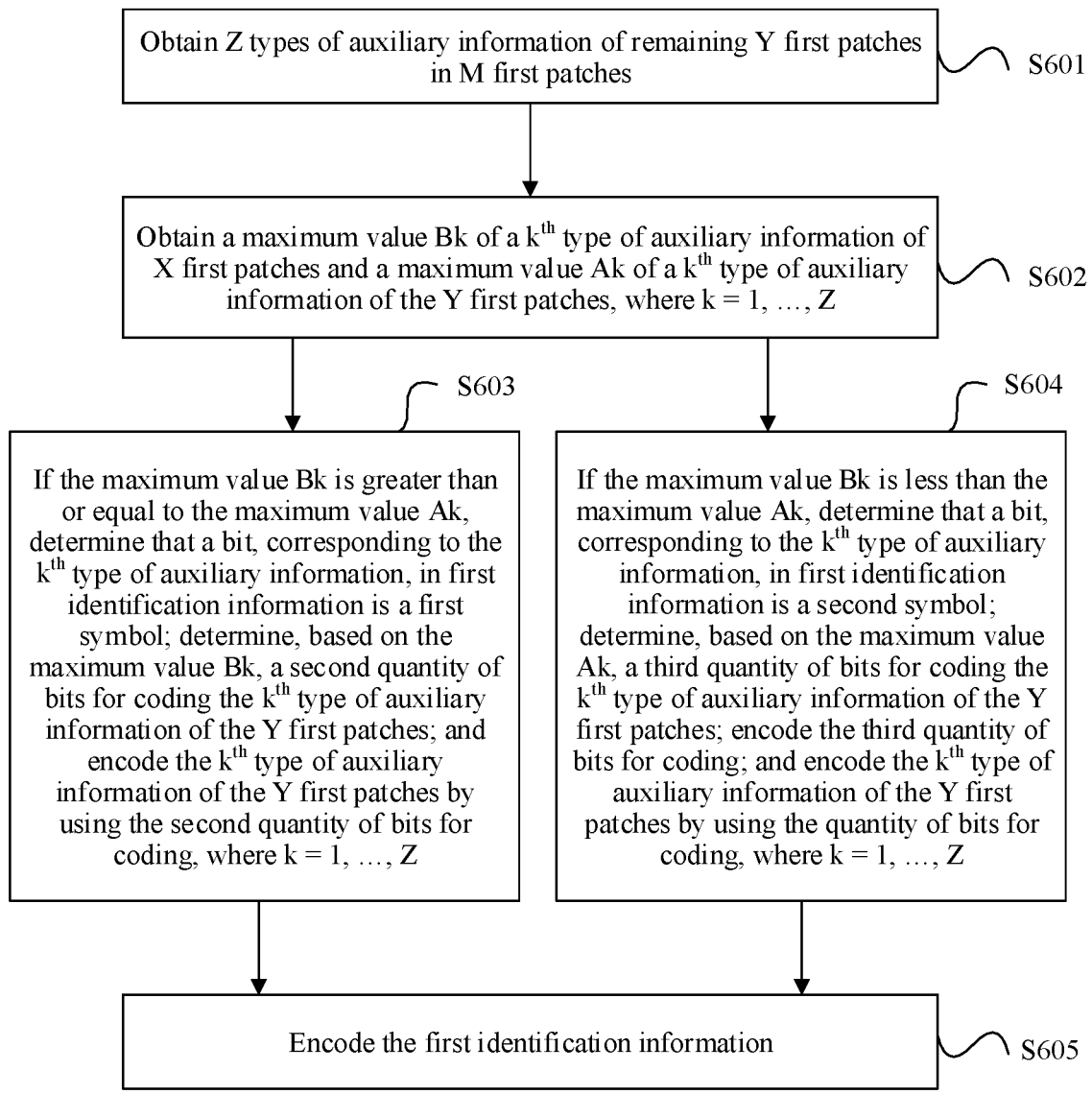
FIG. 7 is a flowchart of an encoding method according to Embodiment 3 of this application.

FIG. 7 is a flowchart of an encoding method according to Embodiment 3 of this application. Based on the method embodiment 1 shown in FIG. 5, the encoding method provided in this embodiment is still another implementation of the encoding method, and is mainly a method for encoding auxiliary information of remaining Y first patches in M first patches other than X first patches when X<M. As shown in FIG. 7, the encoding method provided in this embodiment may further include the following operations.

S601. Obtain Z types of auxiliary information of the remaining Y first patches in the M first patches, where Y=M−X, and Z≥1.

S602. Obtain a maximum value Bk of a $k^{th}$ type of auxiliary information of the X first patches and a maximum value Ak of a $k^{th}$ type of auxiliary information of the Y first patches, where k=1, . . . , Z.

S603. If the maximum value Bk is greater than or equal to the maximum value Ak, determine that a bit, corresponding to the $k^{th}$ type of auxiliary information, in first identification information is a first symbol; determine, based on the maximum value Bk, a second quantity of bits for coding the $k^{th}$ type of auxiliary information of the Y first patches; and encode the $k^{th}$ type of auxiliary information of the Y first patches by using the second quantity of bits for coding, where k=1, . . . , Z.

S604. If the maximum value Bk is less than the maximum value Ak, determine that a bit, corresponding to the $k^{th}$ type of auxiliary information, in first identification information is a second symbol; determine, based on the maximum value Ak, a third quantity of bits for coding the $k^{th}$ type of auxiliary information of the Y first patches; encode the third quantity of bits for coding; and encode the $k^{th}$ type of auxiliary information of the Y first patches by using the third quantity of bits for coding, where k=1, . . . , Z.

S605. Encode the first identification information.

In one embodiment, the first symbol may be 0 and the second symbol may be 1; or the first symbol may be 1 and the second symbol may be 0.

In one embodiment, the auxiliary information may include at least one of the following: a minimum X-coordinate value (u1) of a patch in a three-dimensional coordinate system, a minimum Y-coordinate value (v1) of the patch in the three-dimensional coordinate system, a minimum Z-coordinate value (d1) of the patch in the three-dimensional coordinate system, a minimum X-coordinate value (u0) of the patch in an occupancy map in a projection direction, and a minimum Y-coordinate value (v0) of the patch in the occupancy map in the projection direction.

It should be noted that an implementation of encoding the third quantity of bits for coding is not limited in this embodiment. Optionally, the third quantity of bits for coding may be encoded by using a preset quantity of bits. A specific value of the preset quantity of bits for coding is not limited in this embodiment, for example, is 8.

It should be noted that an implementation of encoding the first identification information is not limited in this embodiment. Optionally, the first identification information may be encoded by using a preset quantity of bits. A specific value of the preset quantity of bits for coding is not limited in this embodiment, for example, is 8 or Z. Z represents a quantity of types of auxiliary information.

The following provides a detailed description with reference to Table 1 by using specific examples.

Assuming that there are five types of auxiliary information: u0, v0, u1, v1, and d1, the first identification information includes five bits identified by A=abcde. Bits a, b, c, d, and e one-to-one correspond to u0, v0, u1, v1, and d1. The first symbol is 0 and the second symbol is 1.

Maximum values of five types of auxiliary information, that is, u0, v0, u1, v1, and d1, of the X first patches are max_u0, max_v0, max_u1, max_v1, and max_d1, respectively. Maximum values of five types of auxiliary information, that is, u0, v0, u1, v1, and d1, of the Y first patches are max_u0', max_v0', max_u1', max_v1', and max_d1', respectively.

For auxiliary information u0, if max_u0≥max_u0', a=0. In this case, a second quantity of bits for coding the auxiliary information u0 of the Y first patches may be determined based on max_u0, and the auxiliary information u0 of the Y first patches is encoded by using the second quantity of bits for coding. For example, max_u0=7, and the second quantity of bits for coding is 3. Then, the auxiliary information u0 of the Y first patches is encoded by using the second quantity of bits for coding 3. If max_u0<max_u0', a=1. In this case, a third quantity of bits for coding the auxiliary information u0 of the Y first patches may be determined based on max_u0', and the auxiliary information u0 of the Y first patches is encoded by using the third quantity of bits for coding.

Similarly, for auxiliary information v0, u1, v1, and d1, whether values of b, c, d, and e are 0 or 1 may be determined based on a comparison result. For a specific value of the first identification information, refer to Table 2.

TABLE 2

First identification information and second identification information

| F | A = abcde | F | A = abcde | F | A = abcde | F | A = abcde |
|---|---|---|---|---|---|---|---|
| 0 | 00000 | 1 | 01000 | 1 | 10000 | 1 | 11000 |
| 1 | 00001 | 1 | 01001 | 1 | 10001 | 1 | 11001 |
| 1 | 00010 | 1 | 01010 | 1 | 10010 | 1 | 11010 |
| 1 | 00011 | 1 | 01011 | 1 | 10011 | 1 | 11011 |
| 1 | 00100 | 1 | 01100 | 1 | 10100 | 1 | 11100 |
| 1 | 00101 | 1 | 01101 | 1 | 10101 | 1 | 11101 |
| 1 | 00110 | 1 | 01110 | 1 | 10110 | 1 | 11110 |
| 1 | 00111 | 1 | 01111 | 1 | 10111 | 1 | 11111 |

In this embodiment, auxiliary information of the X first patches is obtained by encoding X groups of auxiliary information differences. If the auxiliary information of the X first patches is first encoded, the auxiliary information of the X first patches is first decoded correspondingly. In other words, a decoding apparatus first obtains the auxiliary information of the X first patches. During encoding, a maximum value of the auxiliary information of the X first patches is compared with a maximum value of the auxiliary information of the Y first patches. If the maximum value of the auxiliary information of the X first patches is greater than or equal to the maximum value of the auxiliary information of the Y first patches, a required quantity of bits for coding determined based on the maximum value of the auxiliary information of the X first patches may be used as a quantity of bits for coding the auxiliary information of the Y first patches, to encode the auxiliary information of the Y first patches. In this way, the quantity of bits for coding the auxiliary information of the Y first patches does not need to be specially encoded and notified to the decoding apparatus. This further compresses a bitstream, thereby improving coding efficiency and compression performance. Correspondingly, during decoding, if it is learnt, based on a value of each bit in the first identification information, that the quantity of bits for coding the auxiliary information of the Y first patches is determined based on the maximum value of the auxiliary information of the X first patches, the quantity of bits for coding the auxiliary information of the Y first patches is obtained based on the auxiliary information of the X first patches that has been obtained through decoding; and the bitstream may further be parsed based on the quantity of bits for coding, to obtain the auxiliary information of the Y first patches.

In one embodiment, if there are Z types of auxiliary information and Z>1, before the encoding the first identification information, the method may further include:

determining that at least one bit in the first identification information is the second symbol.

Specifically, when there are a plurality of types of auxiliary information, for some types of auxiliary information, a maximum value of the types of auxiliary information of the X first patches is greater than or equal to a maximum value of the types of auxiliary information of the Y first patches; and for some other types of auxiliary information, a maximum value of the types of auxiliary information of the X first patches is less than a maximum value of the types of auxiliary information of the Y first patches. In this case, the first identification information is encoded.

In one embodiment, the method may further include:

determining that second identification information is a second symbol; and encoding the second identification information.

Specifically, the second identification information (which is represented by F) includes one bit, and indicates whether maximum values of Z types of auxiliary information of the X first patches are all greater than or equal to maximum values of the Z types of auxiliary information of the Y first patches. In this scenario, the second identification information is the second symbol. In the Z types of auxiliary information, for some types of auxiliary information, a maximum value of the types of auxiliary information of the X first patches is greater than or equal to a maximum value of the types of auxiliary information of the Y first patches; and for some other types of auxiliary information, a maximum value of the types of auxiliary information of the X first patches is less than a maximum value of the types of auxiliary information of the Y first patches. In this case, both the first identification information and the second identification information may be encoded. Optionally, the first identification information and the second identification information may be separately encoded. To be specific, the first identification information is encoded by using a preset quantity of bits, and the second identification information is encoded by using one bit. For example, if the first identification information is A=abcde, A may be encoded by using five bits, and the second identification information is encoded by using one bit. Optionally, the first identification information and the second identification information may be jointly encoded by using a preset quantity of bits. For example, if the first identification information is A=abcde, and the second identification information is F=f, abcdef or fabcde may be encoded by using one byte.

In one embodiment, if there are Z types of auxiliary information, Z>1, and each bit in the first identification information is the first symbol, the method may further include:

determining that second identification information is the first symbol; and encoding only the second identification information.

Specifically, the second identification information (which is represented by F) includes one bit. In this scenario, the second identification information is the first symbol. In the Z types of auxiliary information, for each type of auxiliary information, a maximum value of the type of auxiliary information of the X first patches is greater than or equal to a maximum value of the type of auxiliary information of the Y first patches. In this case, S604 is not performed. Only the 1-bit second identification information needs to be encoded. This further compresses the bitstream, thereby improving coding efficiency and compression performance. For example, for a specific value of the second identification information, refer to Table 2.

It should be noted that in an encoding process, an execution sequence of encoding the auxiliary information of the Y first patches, the first identification information, and/or the second identification information, and the third quantity of bits for coding is not limited. If there are a plurality of types of auxiliary information, an encoding sequence of various types of auxiliary information is not limited, provided that an encoding apparatus and the decoding apparatus predefine encoding and decoding sequences.

For example, the following provides a specific encoding sequence.

Operation 1: Obtain the Z types of auxiliary information of the remaining Y first patches in the M first patches, where Y=M−X.

Operation 2: Obtain the maximum value Bk of the $k^{th}$ type of auxiliary information of the X first patches and the maximum value Ak of the $k^{th}$ type of auxiliary information of the Y first patches, where k=1, ..., Z.

Operation 3: If the maximum value Bk is greater than or equal to the maximum value Ak, determine that the bit, corresponding to the $k^{th}$ type of auxiliary information, in the first identification information is the first symbol; or if the maximum value Bk is less than the maximum value Ak, determine that the bit, corresponding to the $k^{th}$ type of auxiliary information, in the first identification information is the second symbol.

Operation 4: If each bit in the first identification information is the first symbol, determine that the second identification information is the first symbol, and encode the second identification information; and determine, based on the maximum value Bk, the second quantity of bits for coding the $k^{th}$ type of auxiliary information of the Y first patches, and encode the $k^{th}$ type of auxiliary information of the Y first patches by using the second quantity of bits for coding, where k=1, ..., Z.

Operation 5: If at least one bit in the first identification information is the second symbol, determine that the second identification information is the second symbol, and encode the first identification information and the second identification information; and if the bit, corresponding to the $k^{th}$ type of auxiliary information, in the first identification information is the first symbol, determine, based on the maximum value Bk, the second quantity of bits for coding the $k^{th}$ type of auxiliary information of the Y first patches, and encode the $k^{th}$ type of auxiliary information of the Y first patches by using the second quantity of bits for coding, where k=1, ..., Z; or if the bit, corresponding to the $k^{th}$ type of auxiliary information, in the first identification information is the second symbol, determine, based on the maximum value Ak, the third quantity of bits for coding the $k^{th}$ type of auxiliary information of the Y first patches, encode the third quantity of bits for coding, and encode the $k^{th}$ type of auxiliary information of the Y first patches by using the third quantity of bits for coding, where k=1, ..., Z.

In one embodiment, the maximum value of the auxiliary information of the X first patches is compared with the maximum value of the auxiliary information of the Y first patches, and then the quantity of bits for coding the auxiliary information of the Y first patches may be determined. When the quantity of bits for coding determined based on the maximum value of the auxiliary information of the X first patches is used to encode the auxiliary information of the Y first patches, the bitstream is further compressed, thereby improving coding efficiency and compression performance.

Figure 8:
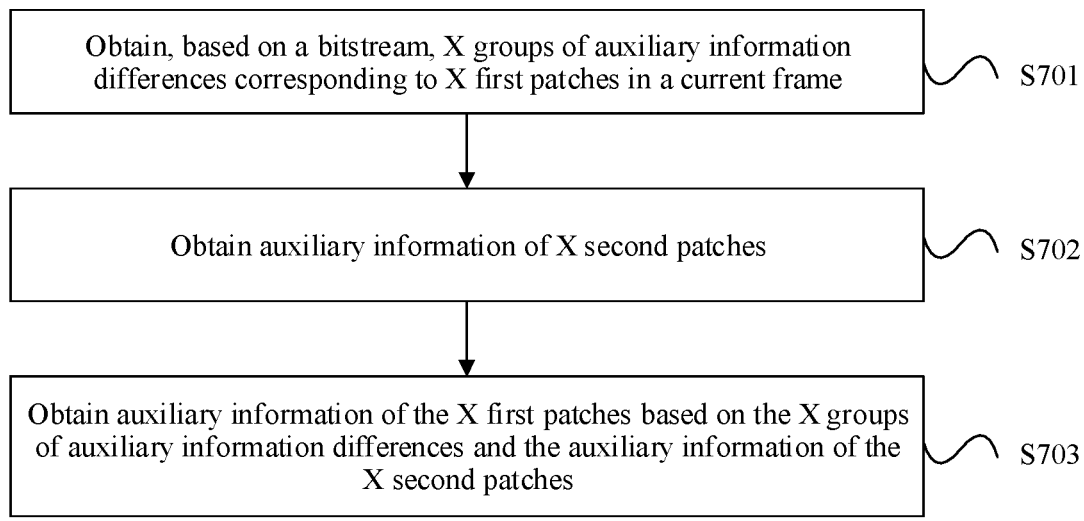
FIG. 8 is a flowchart of a decoding method according to Embodiment 1 of this application.

FIG. 8 is a flowchart of a decoding method according to Embodiment 1 of this application. The decoding method provided in this embodiment corresponds to the encoding methods provided in the method embodiments shown in FIG. 5 to FIG. 7. As shown in FIG. 8, the decoding method provided in this embodiment may include the following operations.

S701. Obtain, based on a bitstream, X groups of auxiliary information differences corresponding to X first patches in a current frame.

M first patches in the current frame include the X first patches, there is a preset matching relationship between the X first patches and X second patches in a previous frame of the current frame, X is less than or equal to M, and both X and M are positive integers.

S702. Obtain auxiliary information of the X second patches.

S703. Obtain auxiliary information of the X first patches based on the X groups of auxiliary information differences and the auxiliary information of the X second patches.

In one embodiment, if X<M, the decoding method provided in this embodiment further includes:

obtaining a first quantity of bits for coding based on the bitstream, where the first quantity of bits for coding is determined by an encoding apparatus based on a maximum value A of auxiliary information of remaining Y first patches in the M first patches, where Y=M−X; and obtaining the auxiliary information of the Y first patches based on the bitstream by using the first quantity of bits for coding.

In one embodiment, if X<M, there are Z types of auxiliary information, and Z≥1, the decoding method provided in this embodiment further includes:

obtaining first identification information based on the bitstream; and if a bit, corresponding to a $k^{th}$ type of auxiliary information, in the first identification information is a first symbol, determining a second quantity of bits for coding based on a maximum value Bk of a $k^{th}$ type of auxiliary information of the X first patches, and obtaining a $k^{th}$ type of auxiliary information of the remaining Y first patches in the M first patches based on the bitstream by using the second quantity of bits for coding, where k=1, ..., Z; or if a bit, corresponding to a $k^{th}$ type of auxiliary information, in the first identification information is a second symbol, obtaining a third quantity of bits for coding based on the bitstream, and obtaining a $k^{th}$ type of auxiliary information of the Y first patches based on the bitstream by using the third quantity of bits for coding, where the third quantity of bits for coding is determined by an encoding apparatus based on a maximum value Ak of the $k^{th}$ type of auxiliary information of the Y first patches, and k=1, ..., Z.

In one embodiment, if X<M, there are Z types of auxiliary information, and Z>1, the decoding method provided in this embodiment further includes:

obtaining identification information based on the bitstream; and if the identification information includes first identification information and a bit, corresponding to a $k^{th}$ type of auxiliary information, in the first identification information is a first symbol, determining a second quantity of bits for coding based on a maximum value Bk of a $k^{th}$ type of auxiliary information of the X first patches, and obtaining a $k^{th}$ type of auxiliary information of the remaining Y first patches in the M first patches based on the bitstream by using the second quantity of bits for coding, where k=1, ..., Z;

if the identification information includes first identification information and a bit, corresponding to a $k^{th}$ type of auxiliary information, in the first identification information is a second symbol, obtaining a third quantity of bits for coding based on the bitstream, and obtaining a $k^{th}$ type of auxiliary information of the Y first patches based on the bitstream by using the third quantity of bits for coding, where the third quantity of bits for coding is determined by an encoding apparatus based on a maximum value Ak of the $k^{th}$ type of auxiliary information of the Y first patches, and k=1, ..., Z;

if the identification information includes second identification information and the second identification information is a first symbol, determining a second quantity of bits for coding based on a maximum value Bk of a $k^{th}$ type of auxiliary information of the X first patches, and obtaining a $k^{th}$ type of auxiliary information of the remaining Y first patches in the M first patches based on the bitstream by using the second quantity of bits for coding, where k=1, . . . , Z;

if the identification information includes first identification information and second identification information, the second identification information is a second symbol, and a bit, corresponding to a $k^{th}$ type of auxiliary information, in the first identification information is a first symbol, determining a second quantity of bits for coding based on a maximum value Bk of a $k^{th}$ type of auxiliary information of the X first patches, and obtaining a $k^{th}$ type of auxiliary information of the remaining Y first patches in the M first patches based on the bitstream by using the second quantity of bits for coding, where k=1, . . . , Z; or if the identification information includes first identification information and second identification information, the second identification information is a second symbol, and a bit, corresponding to a $k^{th}$ type of auxiliary information, in the first identification information is a second symbol, obtaining a third quantity of bits for coding based on the bitstream, and obtaining a $k^{th}$ type of auxiliary information of the Y first patches based on the bitstream by using the third quantity of bits for coding, where the third quantity of bits for coding is determined by an encoding apparatus based on a maximum value Ak of the $k^{th}$ type of auxiliary information of the Y first patches, and k=1, . . . , Z.

For example, assuming that the identification information includes the first identification information and the second identification information, a specific decoding sequence is provided as follows:

Operation 11: Obtain the second identification information based on the bitstream.

Operation 12: If the second identification information is the first symbol, determine the second quantity of bits for coding based on the maximum value Bk of the $k^{th}$ type of auxiliary information of the X first patches, and obtain the $k^{th}$ type of auxiliary information of the remaining Y first patches in the M first patches based on the bitstream by using the second quantity of bits for coding, where k=1, . . . , Z.

Operation 13: If the second identification information is the second symbol, obtain the first identification information.

Operation 14: If the bit, corresponding to the $k^{th}$ type of auxiliary information, in the first identification information is the first symbol, determine the second quantity of bits for coding based on the maximum value Bk of the $k^{th}$ type of auxiliary information of the X first patches, and obtain the $k^{th}$ type of auxiliary information of the remaining Y first patches in the M first patches based on the bitstream by using the second quantity of bits for coding, where k=1, . . . , Z.

Operation 15: If the bit, corresponding to the $k^{th}$ type of auxiliary information, in the first identification information is the second symbol, obtain the third quantity of bits for coding based on the bitstream, and obtain the $k^{th}$ type of auxiliary information of the Y first patches based on the bitstream by using the third quantity of bits for coding, where the third quantity of bits for coding is determined by the encoding apparatus based on the maximum value Ak of the $k^{th}$ type of auxiliary information of the Y first patches, and k=1, . . . , Z.

In operation 13, a manner of obtaining the first identification information is determined based on a manner of encoding the first identification information and the second identification information. Optionally, if the first identification information and the second identification information are separately encoded, for example, if the first identification information is encoded by using Z bits, and the second identification information is encoded by using one bit, the bitstream is decoded to obtain the first identification information. Optionally, if the first identification information and the second identification information are jointly encoded, for example, if the first identification information and the second identification information are encoded by using one byte, the first identification information has been obtained in operation 11.

In one embodiment, the obtaining auxiliary information of the X first patches based on the X groups of auxiliary information differences and the auxiliary information of the X second patches includes:

determining, based on a sorting order of the X groups of auxiliary information differences and a sorting order of the X second patches, a sum of a $k^{th}$ group of auxiliary information difference in the X groups of auxiliary information differences and auxiliary information of a $k^{th}$ second patch in the X second patches as auxiliary information of a $k^{th}$ first patch in the X first patches.

In one embodiment, the obtaining auxiliary information of the X first patches based on the X groups of auxiliary information differences and the auxiliary information of the X second patches includes:

obtaining matching information based on the bitstream, where the matching information indicates the matching relationship between the X first patches and the X second patches; and obtaining the auxiliary information of the X first patches based on the matching information, the X groups of auxiliary information differences, and the auxiliary information of the X second patches.

In one embodiment, the decoding method further includes:

determining a fourth quantity of bits for coding based on M; and obtaining X based on the bitstream by using the fourth quantity of bits for coding.

In one embodiment, the auxiliary information includes at least one of the following: a minimum X-coordinate value (u1) of a patch in a three-dimensional coordinate system, a minimum Y-coordinate value (v1) of the patch in the three-dimensional coordinate system, a minimum Z-coordinate value (d1) of the patch in the three-dimensional coordinate system, a minimum X-coordinate value (u0) of the patch in an occupancy map in a projection direction, and a minimum Y-coordinate value (v0) of the patch in the occupancy map in the projection direction.

The decoding method provided in this embodiment of this application corresponds to the encoding methods provided in the method embodiments shown in FIG. 5 to FIG. 7. A technical principle and a technical effect of the decoding method are similar to a technical principle and a technical effect of the encoding methods. Details are not described herein again.

An embodiment of this application further provides a point cloud data packing method that may be performed by an encoder. The method is used for resolving an existing technical problem that patches are inconsistent in terms of time and space because point cloud data of each frame is separately packed.

The left side and the right side of FIG. 2 respectively show occupancy maps corresponding to patches in two adjacent frames. As shown in the left side of FIG. 2, patches in a former frame are separately sorted, and the first five patches are successively sorted as the patches 21 to 25. The patches 21 to 25 are successively inserted into an occupancy map of the former frame based on a sorting order of the patches. As shown in the right side of FIG. 2, patches in a latter frame are separately sorted, and the first five patches are successively sorted as the patches 31 to 35. The patches 31 to 35 are successively inserted into an occupancy map of the latter frame based on a sorting order of the patches. Because patches in each frame are separately sorted, locations of the patch 21 and the patch 22 on the left side of FIG. 2 are respectively different from locations of the patch 31 and the patch 32 on the right side of FIG. 2 in the occupancy maps of the two adjacent frames. This affects consistency of the patches in terms of time and space, and results in a compression performance loss during subsequent encoding of auxiliary information of the patches, thereby affecting coding performance.

The point cloud data packing method provided in this embodiment of this application mainly includes S101 in FIG. 3, and includes other operations similar to those in FIG. 3. In the point cloud data packing method provided in this embodiment of this application, sorting M first patches in a current frame may include:

obtaining N second patches in a previous frame of the current frame, where N is a positive integer;

for an $i^{th}$ second patch in the N second patches, where i=1, . . . , N, obtaining association values Qij between j first patches on which matching is unsuccessfully performed and the $i^{th}$ second patch, and determining a maximum association value Qik, where projection directions of the j first patches on which matching is unsuccessfully performed are the same as a projection direction of the $i^{th}$ second patch;

if Qik is greater than a preset threshold, determining that a $k^{th}$ first patch corresponding to Qik matches the $i^{th}$ second patch, where the $k^{th}$ first patch is one of the j first patches on which matching is unsuccessfully performed; or if Qik is less than or equal to a preset threshold, determining that no first patch matches the $i^{th}$ second patch; and successively sorting, based on a sorting order of the N second patches, first patches matching the N second patches.

It should be noted that a sorting order of first patches that do not match the N second patches is not limited in this embodiment.

In one embodiment, the association value Qij may be a quotient obtained by dividing a first reference value by a second reference value; and the first reference value is an area of an intersection region of a first occupancy matrix and a second occupancy matrix, and the second reference value is an area of a union region of the first occupancy matrix and the second occupancy matrix; or the first reference value is a quantity of samples included in an intersection region of an effective region of a first occupancy matrix and an effective region of a second occupancy matrix, and the second reference value is a quantity of samples included in a union region of the effective region of the first occupancy matrix and the effective region of the second occupancy matrix; where the effective region of the first occupancy matrix is an actually occupied region obtained by projecting a $j^{th}$ first patch onto a two-dimensional plane in a projection direction, the effective region of the second occupancy matrix is an actually occupied region obtained by projecting an $i^{th}$ second patch onto the two-dimensional plane in the projection direction, the first occupancy matrix is a matrix region that corresponds to the effective region of the first occupancy matrix, and the second occupancy matrix is a matrix region that corresponds to the effective region of the second occupancy matrix.

In one embodiment, before the obtaining N second patches in a previous frame of the current frame, the method may further include:

sorting the M first patches.

For detailed descriptions, refer to the method embodiment shown in FIG. 5. A technical principle and a technical effect thereof are similar to a technical principle and a technical effect of the method embodiment shown in FIG. 5. Details are not described herein again.

The following provides a description by using a specific example.

Figure 9:
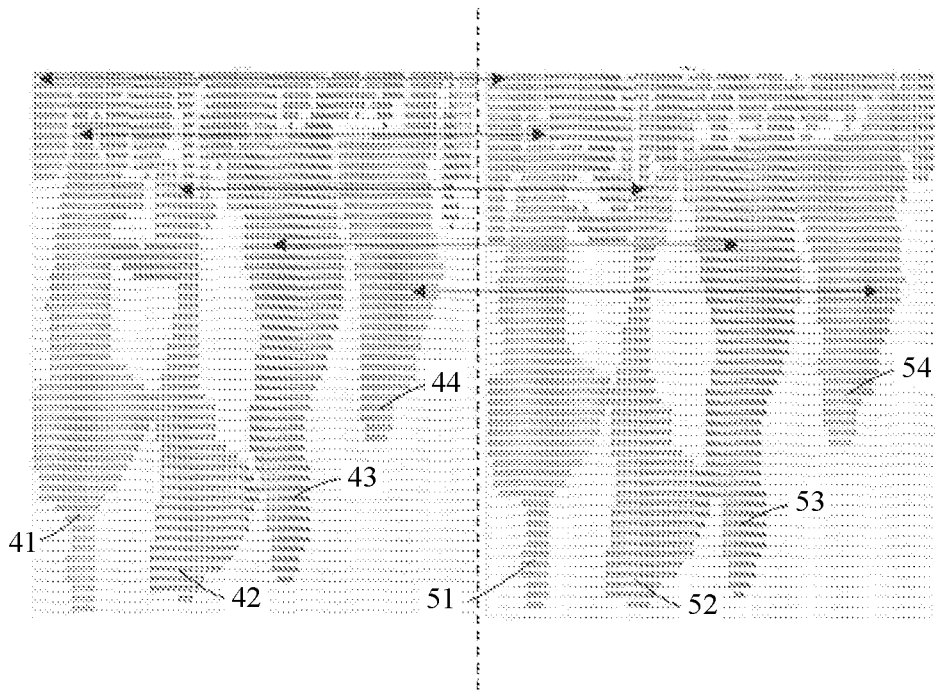
FIG. 9 is a schematic diagram of an occupancy map according to an embodiment of this application.

FIG. 9 is a schematic diagram of an occupancy map according to an embodiment of this application. The left side and the right side of FIG. 9 respectively show occupancy maps corresponding to patches in two adjacent frames. As shown in the left side of FIG. 9, patches 41 to 44 are used as an example. The patches 41 to 44 in a previous frame are successively sorted as: the patches 41 to 44. As shown in the right side of FIG. 9, when patches in a current frame are to be sorted, matching needs to be performed between the patches and the patches 41 to 44. After the matching is performed, patches 51 to 54 are successively sorted as: the patches 51 to 54. This ensures that patches having a matching relationship in the two adjacent frames have same locations respectively in the occupancy maps, and ensures consistency of the patches in terms of time and space. Therefore, coding/compression performance can be improved during subsequent encoding of auxiliary information of the patches.

According to the point cloud data packing method provided in this embodiment, a sorting order of the patches in the current frame is obtained based on a sorting order of the patches in the previous frame. This ensures consistency of the patches in the two adjacent frames in terms of time and space, thereby improving subsequent coding/compression performance.

An embodiment further provides an encoding apparatus, including a processing module configured to perform the point cloud data packing method provided in this embodiment of this application. A technical principle and a technical effect of the encoding apparatus are similar to a technical principle and a technical effect of the point cloud data packing method. Details are not described herein again.

Figure 10:
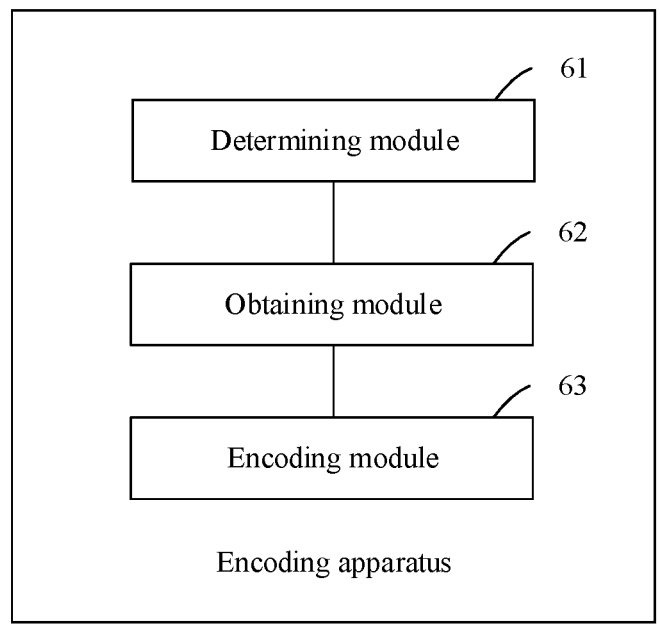
FIG. 10 is a schematic structural diagram of an encoding apparatus according to Embodiment 1 of this application.

FIG. 10 is a schematic structural diagram of an encoding apparatus according to Embodiment 1 of this application. The encoding apparatus provided in this embodiment of this application is configured to perform the encoding method provided in any one of the method embodiments shown in FIG. 5 to FIG. 7. As shown in FIG. 10, the encoding apparatus provided in this embodiment of this application may include:

a determining module 61, configured to determine X first patches from M first patches in a current frame, where there is a preset matching relationship between the X first patches and X second patches, the X second patches are included in a previous frame of the current frame, X is less than or equal to M, and both X and M are positive integers;

an obtaining module 62, configured to obtain auxiliary information of the X first patches and auxiliary information of the X second patches; and an encoding module 63, configured to: obtain X groups of auxiliary information differences based on the auxiliary information of the X first patches and the auxiliary information of the X second patches, and encode the X groups of auxiliary information differences.

In one embodiment, if X<M, the obtaining module 62 is further configured to:

obtain auxiliary information of remaining Y first patches in the M first patches, where Y=M−X; and obtain a maximum value A of the auxiliary information of the Y first patches.

The encoding module 63 is further configured to:

determine, based on the maximum value A, a first quantity of bits for coding the auxiliary information of the Y first patches;

encode the first quantity of bits for coding; and encode the auxiliary information of the Y first patches by using the first quantity of bits for coding.

In one embodiment, if X<M, there are Z types of auxiliary information, and Z>1, the obtaining module 62 is further configured to:

obtain Z types of auxiliary information of remaining Y first patches in the M first patches, where Y=M−X; and obtain a maximum value Bk of a $k^{th}$ type of auxiliary information of the X first patches and a maximum value Ak of a $k^{th}$ type of auxiliary information of the Y first patches, where k=1, . . . , Z.

The encoding module 63 is further configured to:

if the maximum value Bk is greater than or equal to the maximum value Ak, determine that a bit, corresponding to the $k^{th}$ type of auxiliary information, in first identification information is a first symbol; or if the maximum value Bk is less than the maximum value Ak, determine that a bit, corresponding to the $k^{th}$ type of auxiliary information, in first identification information is a second symbol;

if each bit in the first identification information is the first symbol, determine that second identification information is the first symbol, and encode the second identification information; and determine, based on the maximum value Bk, a second quantity of bits for coding the $k^{th}$ type of auxiliary information of the Y first patches, and encode the $k^{th}$ type of auxiliary information of the Y first patches by using the second quantity of bits for coding, where k=1, . . . , Z; and if at least one bit in the first identification information is the second symbol, determine that the second identification information is the second symbol, and encode the first identification information and the second identification information; and if the bit, corresponding to the $k^{th}$ type of auxiliary information, in the first identification information is the first symbol, determine, based on the maximum value Bk, the second quantity of bits for coding the $k^{th}$ type of auxiliary information of the Y first patches, and encode the $k^{th}$ type of auxiliary information of the Y first patches by using the second quantity of bits for coding, where k=1, . . . , Z; or if the bit, corresponding to the $k^{th}$ type of auxiliary information, in the first identification information is the second symbol, determine, based on the maximum value Ak, a third quantity of bits for coding the $k^{th}$ type of auxiliary information of the Y first patches, encode the third quantity of bits for coding, and encode the $k^{th}$ type of auxiliary information of the Y first patches by using the third quantity of bits for coding, where k=1, . . . , Z.

In one embodiment, the determining module 61 is specifically configured to determine the preset matching relationship according to the following operations:

obtaining N second patches in the previous frame of the current frame, where N is a positive integer;

for an $i^{th}$ second patch in the N second patches, where i=1, . . . , N, obtaining association values Qij between j first patches on which matching is unsuccessfully performed and the $i^{th}$ second patch, and determining a maximum association value Qik, where projection directions of the j first patches on which matching is unsuccessfully performed are the same as a projection direction of the $i^{th}$ second patch; and if Qik is greater than a preset threshold, determining that a $k^{th}$ first patch corresponding to Qik matches the $i^{th}$ second patch, where the $k^{th}$ first patch is one of the j first patches on which matching is unsuccessfully performed.

In one embodiment, if it is determined that there is a matching relationship between O first patches and the N second patches, the determining module 61 is specifically configured to:

determine the X first patches from the O first patches, where the O first patches are first patches matching the N second patches, and O≥X.

In one embodiment, the association value Qij is a quotient obtained by dividing a first reference value by a second reference value; and the first reference value is an area of an intersection region of a first occupancy matrix and a second occupancy matrix, and the second reference value is an area of a union region of the first occupancy matrix and the second occupancy matrix; or the first reference value is a quantity of samples included in an intersection region of an effective region of a first occupancy matrix and an effective region of a second occupancy matrix, and the second reference value is a quantity of samples included in a union region of the effective region of the first occupancy matrix and the effective region of the second occupancy matrix; where the effective region of the first occupancy matrix is an actually occupied region obtained by projecting a $j^{th}$ first patch onto a two-dimensional plane in a projection direction, the effective region of the second occupancy matrix is an actually occupied region obtained by projecting an $i^{th}$ second patch onto the two-dimensional plane in the projection direction, the first occupancy matrix is a matrix region that corresponds to the effective region of the first occupancy matrix, and the second occupancy matrix is a matrix region that corresponds to the effective region of the second occupancy matrix.

In one embodiment, the preset matching relationship includes: A $k^{th}$ first patch in the X first patches matches a $k^{th}$ second patch in the X second patches based on a sorting order of the X first patches and a sorting order of the X second patches, where k=1, . . . , X.

In one embodiment, the encoding module 63 is configured to:

determine, as the X groups of auxiliary information differences, differences between the auxiliary information of the X first patches and the auxiliary information of the X second patches that correspondingly match the X first patches;

the obtaining module 62 is further configured to obtain matching information, where the matching information indicates the matching relationship between the X first patches and the X second patches; and the encoding module 63 is further configured to encode the matching information.

In one embodiment, the encoding module 63 is configured to:

determine, based on the sorting order of the X first patches and the sorting order of the X second patches, a difference between auxiliary information of the $k^{th}$ first patch in the X first patches and auxiliary information of the $k^{th}$ second patch in the X second patches as a $k^{th}$ group of auxiliary information difference in the X groups of auxiliary information differences, where k=1, ..., X.

In one embodiment, the encoding module 63 is further configured to:
determine a fourth quantity of bits for coding based on M; and
encode X by using the fourth quantity of bits for coding.

In one embodiment, the auxiliary information includes at least one of the following: a minimum X-coordinate value of a patch in a three-dimensional coordinate system, a minimum Y-coordinate value of the patch in the three-dimensional coordinate system, a minimum Z-coordinate value of the patch in the three-dimensional coordinate system, a minimum X-coordinate value of the patch in an occupancy map in a projection direction, and a minimum Y-coordinate value of the patch in the occupancy map in the projection direction.

The encoding apparatus provided in this embodiment may perform the encoding method provided in any one of the embodiments shown in FIG. 5 to FIG. 7. A technical principle and a technical effect of the encoding apparatus are similar to a technical principle and a technical effect of the encoding method. Details are not described herein again.

Figure 11:
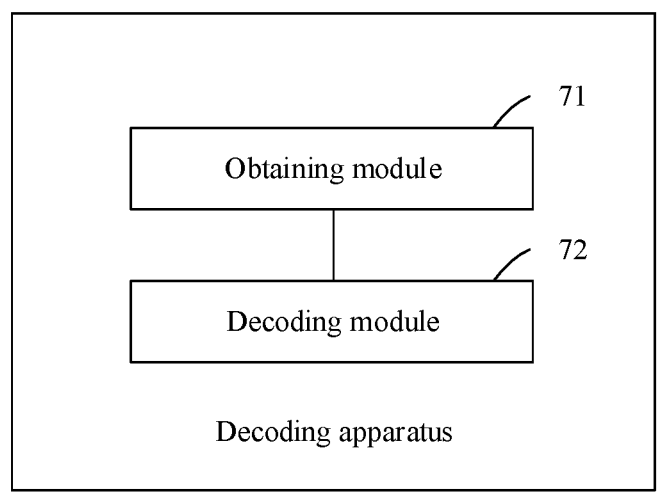
FIG. 11 is a schematic structural diagram of a decoding apparatus according to Embodiment 1 of this application.

FIG. 11 is a schematic structural diagram of a decoding apparatus according to Embodiment 1 of this application. The decoding apparatus provided in this embodiment of this application is configured to perform the decoding method provided in the method embodiment shown in FIG. 8. As shown in FIG. 11, the decoding apparatus provided in this embodiment of this application may include:
a decoding module 72, configured to obtain, based on a bitstream, X groups of auxiliary information differences corresponding to X first patches in a current frame, where M first patches in the current frame include the X first patches, there is a preset matching relationship between the X first patches and X second patches in a previous frame of the current frame, X is less than or equal to M, and both X and M are positive integers; and
an obtaining module 71, configured to obtain auxiliary information of the X second patches; where
the decoding module 72 is further configured to obtain auxiliary information of the X first patches based on the X groups of auxiliary information differences and the auxiliary information of the X second patches.

In one embodiment, if X<M, the decoding module 72 is further configured to:
obtain a first quantity of bits for coding based on the bitstream, where the first quantity of bits for coding is determined by an encoding apparatus based on a maximum value A of auxiliary information of remaining Y first patches in the M first patches, where Y=M−X; and
obtain the auxiliary information of the Y first patches based on the bitstream by using the first quantity of bits for coding.

In one embodiment, if X<M, there are Z types of auxiliary information, and Z>1, the decoding module 72 is further configured to:
obtain second identification information based on the bitstream;
if the second identification information is a first symbol, determine a second quantity of bits for coding based on a maximum value Bk of a $k^{th}$ type of auxiliary information of the X first patches, and obtain a $k^{th}$ type of auxiliary information of remaining Y first patches in the M first patches based on the bitstream by using the second quantity of bits for coding, where k=1, ..., Z;

if the second identification information is a second symbol, obtain first identification information; and
if a bit, corresponding to the $k^{th}$ type of auxiliary information, in the first identification information is a first symbol, determine the second quantity of bits for coding based on the maximum value Bk of the $k^{th}$ type of auxiliary information of the X first patches, and obtain the $k^{th}$ type of auxiliary information of the remaining Y first patches in the M first patches based on the bitstream by using the second quantity of bits for coding, where k=1, ..., Z; or
if a bit, corresponding to the $k^{th}$ type of auxiliary information, in the first identification information is a second symbol, obtain a third quantity of bits for coding based on the bitstream, and obtain the $k^{th}$ type of auxiliary information of the Y first patches based on the bitstream by using the third quantity of bits for coding, where the third quantity of bits for coding is determined by an encoding apparatus based on a maximum value Ak of the $k^{th}$ type of auxiliary information of the Y first patches, and k=1, ..., Z.

In one embodiment, the decoding module 72 is further configured to:
determine a fourth quantity of bits for coding based on M; and
obtain X based on the bitstream by using the fourth quantity of bits for coding.

The decoding apparatus provided in this embodiment may perform the decoding method provided in the embodiment shown in FIG. 8. A technical principle and a technical effect of the decoding apparatus are similar to a technical principle and a technical effect of the decoding method. Details are not described herein again.

Figure 12:
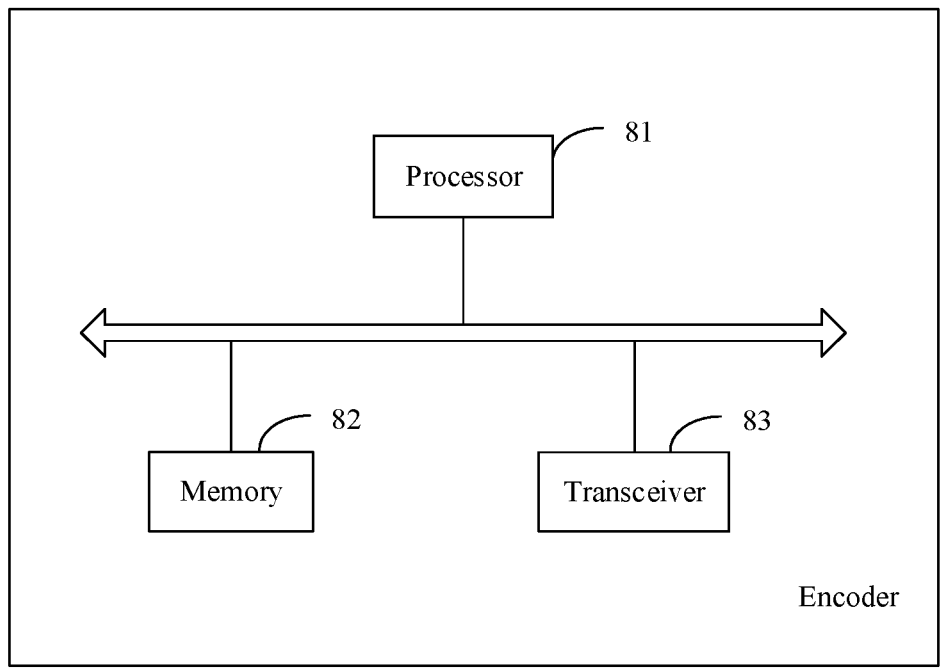
FIG. 12 is a schematic structural diagram of an encoder according to Embodiment 1 of this application.

FIG. 12 is a schematic structural diagram of an encoder according to Embodiment 1 of this application. As shown in FIG. 12, the encoder provided in this embodiment may include a processor 81 and a memory 82. The memory 82 is configured to store an instruction. The processor 81 is configured to execute the instruction stored in the memory, so that the encoder performs the encoding method provided in one of the embodiments shown in FIG. 5 to FIG. 7. A specific implementation and a technical effect of the encoder are similar to a specific implementation and a technical effect of the encoding method. Details are not described herein again. The encoder may further include a transceiver 83, where the transceiver 83 is configured to communicate with another device.

Figure 13:
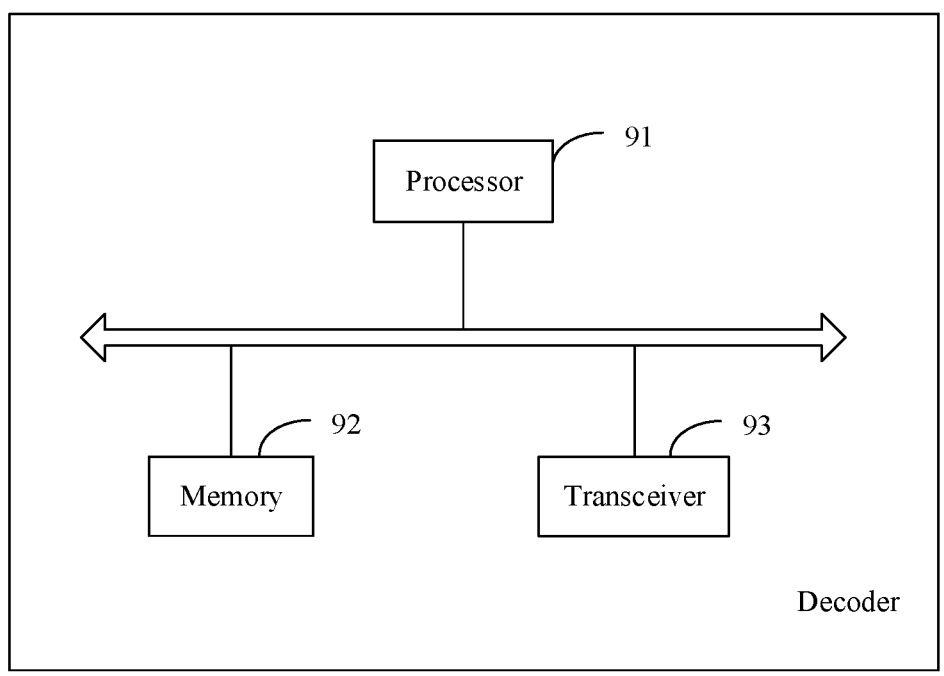
FIG. 13 is a schematic structural diagram of a decoder according to Embodiment 1 of this application.

FIG. 13 is a schematic structural diagram of a decoder according to Embodiment 1 of this application. As shown in FIG. 13, the decoder provided in this embodiment may include a processor 91 and a memory 92. The memory 92 is configured to store an instruction. The processor 91 is configured to execute the instruction stored in the memory, so that the decoder performs the decoding method provided in the embodiment shown in FIG. 8. A specific implementation and a technical effect of the decoder are similar to a specific implementation and a technical effect of the decoding method. Details are not described herein again. The decoder may further include a transceiver 93, where the transceiver 93 is configured to communicate with another device.

It may be understood that the processor in the embodiments of this application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In one embodiment, the matching information in the embodiments of this application may include either of the following:

index values of the X second patches that correspondingly match the X first patches; or X index differences, where the X index differences are differences between index values of the X first patches and index values of the X second patches that correspondingly match the X first patches.

In this embodiment, the decoding apparatus may obtain or derive the index values of the X first patches.

The following provides a description by using specific examples.

It is assumed that X is equal to 5. The encoding apparatus and the decoding apparatus may learn that the index values of the X first patches are successively 0, 1, 2, 3, and 4. Index values of five second patches that correspondingly match the five first patches are successively 0, 2, 3, 1, and 4.

In one embodiment, the matching information may include the index values of the five second patches that correspondingly match the five first patches, and the index values are specifically 0, 2, 3, 1, and 4. The matching information may be encoded by using 3 bits.

In one embodiment, the matching information may include X index differences. The X index differences may be the index values of the first patches minus the index values of the second patches that correspondingly match the first patches. Specifically, the X index differences may be 0–0, 1–2, 2–3, 3–1, and 4–4, that is, 0, −1, −1, 2, and 0.

In one embodiment, the matching information may include X index differences. The X index differences may be the index values of the second patches that correspondingly match the first patches minus the index values of the first patches. Specifically, the X index differences may be 0–0, 2–1, 3–2, 1–3, and 4–4, that is, 0, 1, 1, −2, and 0.

In one embodiment as shown in FIG. 5 in this application, if the matching information is obtained, the obtaining auxiliary information of the X first patches and auxiliary information of the X second patches in S402 may include:

obtaining the auxiliary information of the X first patches; and obtaining, based on the matching information, the auxiliary information of the X second patches that correspondingly match the X first patches.

The following provides a description by using specific examples.

It is assumed that there are seven types of auxiliary information that are specifically u0, v0, u1, v1, d1, sizeU0, and sizeV0 in Table 1. X=5.

Index values of five first patches are successively 0, 1, 2, 3, and 4. Seven types of auxiliary information of a first patch whose index value is i are marked as $u0_i$, $v0_i$, $u1_i$, $v1_i$, $d1_i$, $sizeU0_i$, and $sizeV0_i$, where i=0, 1, 2, 3, 4. For example, seven types of auxiliary information of a first patch whose index value is 0 are marked as $u0_0$, $v0_0$, $u1_0$, $v1_0$, $d1_0$, $sizeU0_0$, and $sizeV0_0$.

Index values of five second patches are successively 0, 1, 2, 3, and 4. Seven types of auxiliary information of a second patch whose index value is j are marked as $pre\_u0_j$, $pre\_v0_j$, $pre\_u1_j$, $pre\_v1_j$, $pre\_d1_j$, $pre\_sizeU0_j$, and $pre\_sizeV0_j$, where j=0, 1, 2, 3, 4. For example, seven types of auxiliary information of a second patch whose index value is 2 are marked as $pre\_u0_2$, $pre\_v0_2$, $pre\_u1_2$, $pre\_v1_2$, $pre\_d1_2$, $pre\_sizeU0_2$, and $pre\_sizeV0_2$.

In one embodiment, the matching information includes index values of the X first patches and index values of the X second patches that correspondingly match the X first patches. For example, the index values of the five first patches are {0, 1, 2, 3, 4} and the index values of the five second patches are {0, 2, 3, 1, 4}.

In this case, auxiliary information of the five first patches is as follows:

$u0_0$, $v0_0$, $u1_0$, $v1_0$, $d1_0$, $sizeU0_0$, $sizeV0_0$;
$u0_1$, $v0_1$, $u1_1$, $v1_1$, $d1_1$, $sizeU0_1$, $sizeV0_1$;
$u0_2$, $v0_2$, $u1_2$, $v1_2$, $d1_2$, $sizeU0_2$, $sizeV0_2$;
$u0_3$, $v0_3$, $u1_3$, $v1_3$, $d1_3$, $sizeU0_3$, $sizeV0_3$;
$u0_4$, $v0_4$, $u1_4$, $v1_4$, $d1_4$, $sizeU0_4$, $sizeV0_4$.

Auxiliary information of the five second patches that correspondingly match the five first patches is as follows:

$pre\_u0_0$, $pre\_v0_0$, $pre\_u1_0$, $pre\_v1_0$, $pre\_d1_0$, $pre\_sizeU0_0$, $pre\_sizeV0_0$;
$pre\_u0_2$, $pre\_v0_2$, $pre\_u1_2$, $pre\_v1_2$, $pre\_d1_2$, $pre\_sizeU0_2$, $pre\_sizeV0_2$;
$pre\_u0_3$, $pre\_v0_3$, $pre\_u1_3$, $pre\_v1_3$, $pre\_d1_3$, $pre\_sizeU0_3$, $pre\_sizeV0_3$;
$pre\_u0_1$, $pre\_v0_1$, $pre\_u1_1$, $pre\_v1_1$, $pre\_d1_1$, $pre\_sizeU0_1$, $pre\_sizeV0_1$;
$pre\_u0_4$, $pre\_v0_4$, $pre\_u1_4$, $pre\_v1_4$, $pre\_d1_4$, $pre\_sizeU0_4$, $pre\_sizeV0_4$.

Auxiliary information differences of the five first patches are as follows:

$delta\_u0_0 = u0_0 - pre\_u0_0$, $delta\_v0_0 = v0_0 - pre\_v0_0$, $delta\_u1_0 = u1_0 - pre\_u1_0$,
$delta\_v1_0 = v1_0 - pre\_v1_0$, $delta\_d1_0 = d1_0 - pre\_d1_0$,
$delta\_sizeU0_0 = sizeU0_0 - pre\_sizeU0_0$,
$delta\_sizeV0_0 = sizeV0_0 - pre\_sizeV0_0$;
$delta\_u0_1 = u0_1 - pre\_u0_2$, $delta\_v0_1 = v0_1 - pre\_v0_2$,
$delta\_u1_1 = u1_1 - pre\_u1_2$, $delta\_v1_1 = v1_1 - pre\_v1_2$, $delta\_d1_1 = d1_1 - pre\_d1_2$, $delta\_sizeU0_1 = sizeU0_1 - pre\_sizeU0_2$, $delta\_sizeV0_1 = sizeV0_1 - pre\_sizeV0_2$;

$delta\_u0_2 = u0_2 - pre\_u0_3$, $delta\_v0_2 = v0_2 - pre\_v0_3$, $delta\_u_2 = u1_2 - pre\_u1_3$, $delta\_v1_2 = v1_2 - pre\_v1_3$, $delta\_d1_2 = d1_2 - pre\_d1_3$, $delta\_sizeU0_2 = sizeU0_2 - pre\_sizeU0_3$, $delta\_sizeV0_2 = sizeV0_2 - pre\_sizeV0_3$;

$delta\_u0_3 = u0_3 - pre\_u0_1$, $delta\_v0_3 = v0_3 - pre\_v0_1$, $delta\_u_3 = u1_3 - pre\_u1_1$, $delta\_v1_3 = v1_3 - pre\_v1_1$, $delta\_d1_3 = d1_3 - pre\_d1_1$, $delta\_sizeU0_3 = sizeU0_3 - pre\_sizeU0_1$, $delta\_sizeV0_3 = sizeV0_3 - pre\_sizeV0_1$;

$delta\_u0_4 = u0_4 - pre\_u0_4$, $delta\_v0_4 = v0_4 - pre\_v0_4$, $delta\_u_4 = u1_4 - pre\_u1_4$, $delta\_v1_4 = v1_4 - pre\_v1_4$, $delta\_d1_4 = d1_4 - pre\_d1_4$, $delta\_sizeU0_4 = sizeU0_4 - pre\_sizeU0_4$, $delta\_sizeV0_4 = sizeV0_4 - pre\_sizeV0_4$.

In one embodiment, the matching information includes X index differences. The X index differences are differences obtained by subtracting index values of the X second patches that correspondingly match the X first patches from index values of the X first patches, for example, {0, −1, −1, 2, 0}.

It may be first learnt that index values of five first patches are successively 0, 1, 2, 3, and 4. The five index differences are 0, −1, −1, 2, 0, and in this case, index values of five second patches that correspondingly match the five first patches are successively 0−0, 1−(−1), 2−(−1), 3−2, 4−0, that is, 0, 2, 3, 1, 4.

Auxiliary information of the five first patches, auxiliary information of the five second patches that correspondingly match the five first patches, and auxiliary information differences corresponding to the five first patches are the same as those in the foregoing descriptions. Details are not described herein again.

It should be noted that an execution sequence of obtaining the auxiliary information of the first patches and obtaining the auxiliary information of the second patches is not limited in this embodiment.

In one embodiment as shown in FIG. 8 in this application, if the bitstream is parsed to obtain the matching information, the obtaining auxiliary information of the X first patches based on the X groups of auxiliary information differences and the auxiliary information of the X second patches in S703 may include:

determining, based on the matching information, the auxiliary information of the X second patches that correspondingly match the X first patches; and obtaining the auxiliary information of the X first patches based on the X groups of auxiliary information differences and the auxiliary information of the X second patches.

The following provides a description by using examples.

It is assumed that there are seven types of auxiliary information that are specifically u0, v0, u1, v1, d1, sizeU0, and sizeV0 in Table 1. X=5.

Index values of five second patches are successively 0, 1, 2, 3, and 4. Seven types of auxiliary information of a second patch whose index value is j are marked as $pre\_u0_j$, $pre\_v0_j$, $pre\_u1_j$, $pre\_v1_j$, $pre\_d1_j$, $pre\_sizeU0_j$, and $pre\_sizeV0_j$, where j=0, 1, 2, 3, 4. For example, seven types of auxiliary information of a second patch whose index value is 2 are marked as $pre\_u0_2$, $pre\_v0_2$, $pre\_u1_2$, $pre\_v1_2$, $pre\_d1_2$, $pre\_sizeU0_2$, and $pre\_sizeV0_2$.

In one embodiment, the matching information includes index values of the X second patches that correspondingly match the X first patches. For example, the index values of the five second patches are {0, 2, 3, 1, 4}.

It may be first learnt that index values of five first patches are successively 0, 1, 2, 3, and 4. Then, auxiliary information of the five second patches that correspondingly match the five first patches whose index values are 0, 1, 2, 3, and 4 is as follows:

$pre\_u0_0$, $pre\_v0_0$, $pre\_u1_0$, $pre\_v1_0$, $pre\_d1_0$, $pre\_sizeU0_0$, $pre\_sizeV0_0$;

$pre\_u0_2$, $pre\_v0_2$, $pre\_u1_2$, $pre\_v1_2$, $pre\_d1_2$, $pre\_sizeU0_2$, $pre\_sizeV0_2$;

$pre\_u0_3$, $pre\_v0_3$, $pre\_u1_3$, $pre\_v1_3$, $pre\_d1_3$, $pre\_sizeU0_3$, $pre\_sizeV0_3$;

$pre\_u0_1$, $pre\_v0_1$, $pre\_u1_1$, $pre\_v1_1$, $pre\_d1_1$, $pre\_sizeU0_1$, $pre\_sizeV0_1$;

$pre\_u0_4$, $pre\_v0_4$, $pre\_u1_4$, $pre\_v1_4$, $pre\_d1_4$, $pre\_sizeU0_4$, $pre\_sizeV0_4$.

In one embodiment, the matching information includes index values of the X first patches and X index differences. The X index differences are differences obtained by subtracting the index values of the X first patches from index values of the X second patches that correspondingly match the X first patches. For example, the index values of the five first patches are {0, 1, 2, 3, 4}, and the five index differences are {0, 1, 1, −2, 0}.

The index values of the first patches and the index differences are known, and in this case, the index values of the five second patches that correspondingly match the five first patches are successively 0+0, 1+1, 2+1, 3+(−2), and 4+0, that is, 0, 2, 3, 1, and 4.

Auxiliary information of the five second patches that correspondingly match the five first patches is the same as that in the foregoing descriptions. Details are not described herein again.

After the auxiliary information of the X second patches that correspondingly match the X first patches is determined, the auxiliary information of the X first patches may be obtained based on the X groups of auxiliary information differences and the auxiliary information of the X second patches.

It should be noted that if auxiliary information of a patch has a normal axis index normalAxis, on a decoder side, normal axis indexes normalAxis of the auxiliary information of the X first patches may be determined by using normal axis indexes normalAxis of the auxiliary information of the X second patches that match the X first patches.

For example, X=5.

Index values of five first patches are successively 0, 1, 2, 3, and 4. A normal axis index normalAxis of auxiliary information of a first patch whose index value is i is marked as $normalAxis_i$, where i=0, 1, 2, 3, 4. For example, a normal axis index normalAxis of auxiliary information of a first patch whose index value is 0 is marked as $normalAxis_0$.

Index values of five second patches are successively 0, 1, 2, 3, and 4. A normal axis index normalAxis of auxiliary information of a second patch whose index value is j is marked as $pre\_normalAxis_j$, where j=0, 1, 2, 3, 4. For example, a normal axis index normalAxis of auxiliary information of a second patch whose index value is 0 is marked as $pre\_normalAxis_0$.

In one embodiment, the matching information includes index values of the X second patches that correspondingly match the X first patches. For example, the index values of the five second patches are {0, 2, 3, 1, 4}.

It may be first learnt that index values of five first patches are successively 0, 1, 2, 3, and 4. Then, normal axis indexes normalAxis of auxiliary information of the five second patches that correspondingly match the five first patches whose index values are 0, 1, 2, 3, and 4 are as follows:

pre_normalAxis$_0$;
pre_normalAxis$_2$;
pre_normalAxis$_3$;
pre_normalAxis$_1$;
pre_normalAxis$_4$.

In this case, the normal axis index normalAxis, marked as normalAxis$_i$, of the auxiliary information of the first patch whose index value is i (i=0, 1, 2, 3, 4) may be obtained by using the following formulas:

normalAxis$_0$=pre_normalAxis$_0$;
normalAxis$_1$=pre_normalAxis$_2$;
normalAxis$_2$=pre_normalAxis$_3$;
normalAxis$_3$=pre_normalAxis$_1$;
normalAxis$_4$=pre_normalAxis$_4$.

In one embodiment, the matching relationship may be determined according to the following operations:

obtaining N second patches in a previous frame of a current frame, where N is a positive integer;

for an $i^{th}$ second patch in the N second patches, where i=1, . . . , N, obtaining association values between j first patches on which matching is unsuccessfully performed and the $i^{th}$ second patch, and determining a maximum association value Qik, where projection directions of the j first patches on which matching is unsuccessfully performed are the same as a projection direction of the $i^{th}$ second patch; and if Qik is greater than a preset threshold, determining that a $k^{th}$ first patch corresponding to Qik matches the $i^{th}$ second patch, where the $k^{th}$ first patch is one of the j first patches on which matching is unsuccessfully performed; or if Qik is less than or equal to a preset threshold, determining that no first patch matches the $i^{th}$ second patch.

The following provides a description by using another example.

It is assumed that N=10. A second patch is identified as pre_patch, and a first patch is identified as "patch". Based on a sorting order of second patches, 10 second patches may be identified as pre_patch[i], where i=1, . . . , 10, and corresponding index values may be 1 to 10. It is assumed that M=20. Based on a sorting order of first patches, 20 first patches may be identified as patch[k], where k=1, . . . , 20, corresponding index values may be 1 to 20, and corresponding best match indexes bestMatchIndex are all −1. A default value of bestMatchIndex is −1, or may be another value. For example, a value greater than or equal to N may be selected. The best match index is used to indicate an index of a second patch matching a current first patch. The preset threshold may be identified as thr.

The N second patches are traversed. pre_patch[1] (with an index value 1) is first obtained, and then M first patches are traversed. patch[k] is assumed, where k=1, . . . , 20. If a projection direction of patch[k] is the same as a projection direction of pre_patch[1], and a best match index bestMatchIndex of patch[k] is −1, association values between all first patches patch[k] that satisfy the foregoing condition and pre_patch[1] are calculated, and a maximum value Q1m in the association values is obtained. m represents an index of a first patch corresponding to the maximum value in the association values. A value of Q1m is compared with a value of the preset threshold thr. If Q1m>thr, it is determined that pre_patch[1] matches patch[m]. In other words, a first patch whose index value is m in the current frame matches a second patch whose index value is 1 in the previous frame. A best match index bestMatchIndex of patch[m] is updated to m, and is stored into an array W. If Q1m≤thr, it indicates that no patch in the M first patches has a matching relationship with pre_patch[1].

The N second patches continue to be traversed. pre_patch[2] (with an index value 2) is obtained, and the same operations are performed. The M first patches are searched for a patch that has a matching relationship with pre_patch[2]. If an index value of a first patch matching pre_patch[2] is −1, it indicates that in the M first patches, no patch has a matching relationship with pre_patch[2]. If an index value of a first patch matching pre_patch[2] is n, it indicates that an $n^{th}$ patch in the M first patches has a matching relationship with pre_patch[2]. In other words, a best match index bestMatchIndex of patch[n] is n. A next second patch continues to be traversed, until all the N second patches are traversed.

According to the foregoing operations, the array W stores all first patches that respectively have a matching relationship with the second patches, and it is assumed that there are matchedPatchCount first patches. In the array W, a sorting order of the matchedPatchCount first patches that have a matching relationship with the N second patches is the same as a sorting order of the N second patches. Remaining first patches (patch), in the M first patches, that do not have a matching relationship with the N second patches are stored into the array W, and are stored after the matchedPatchCount first patches that have a matching relationship. The former matchedPatchCount patches in the array W are patches that have a matching relationship, and the remaining patches are patches that do not have a matching relationship. It should be noted that a sequence of storing, into the array W, the first patches that do not have a matching relationship is not limited in this embodiment of this application. The patches, in the M first patches, that do not have a matching relationship (that is, patches whose bestMatchIndex are −1) are successively stored into the array W. Alternatively, the patches, in the M first patches, that do not have a matching relationship (that is, the patches whose bestMatchIndex are −1) are stored into the array W in a random order.

Then, a sequence of the patches in the M first patches is updated by using the array W. In this way, the former matchedPatchCount first patches in the M first patches are first patches that have a matching relationship, and the latter M−matchedPatchCount first patches are first patches that do not have a matching relationship (whose best match indexes bestMatchIndex are −1).

Optionally, an embodiment of this application further provides an encoding method, and is mainly a method for encoding auxiliary information of remaining Y first patches in M first patches other than X first patches when X<M. The encoding method provided in this embodiment may include:

Operation 21: Obtain Z types of auxiliary information of the remaining Y first patches in the M first patches, where Y=M−X, and Z≥1.

Operation 22: Obtain a maximum value Bk of a $k^{th}$ type of auxiliary information of the X first patches and a maximum value Ak of a $k^{th}$ type of auxiliary information of the Y first patches, where k=1, . . . , Z.

Operation 23: If a quantity of bits required for coding the maximum value Bk is greater than or equal to a quantity of bits required for coding the maximum value Ak, determine that a bit, corresponding to the $k^{th}$ type of auxiliary information, in first identification information is a first symbol; determine, based on the quantity of bits required for coding the maximum value Bk or the maximum value Bk, a second quantity of bits for coding the $k^{th}$ type of auxiliary information of the Y first patches; and encode the $k^{th}$ type of auxiliary information of the Y first patches by using the second quantity of bits for coding, where k=1, . . . , Z.

The following provides a description by using an example.

It is assumed that the maximum value Bk of the $k^{th}$ type of auxiliary information of the X first patches is 200, and the quantity of bits required for coding Bk is 8; and the maximum value Ak of the $k^{th}$ type of auxiliary information of the Y first patches is 209, and the quantity of bits required for coding Ak is 8. In this case, it may be determined, based on the quantity of bits required for coding the maximum value Bk or the maximum value Bk, that the second quantity of bits for coding the $k^{th}$ type of auxiliary information of the Y first patches is 8. Then, the $k^{th}$ type of auxiliary information of the Y first patches is encoded by using the second quantity of bits for coding 8.

In comparison with the embodiment shown in FIG. 7, in the encoding method provided in this embodiment, compared objects are the quantity of bits required for coding the maximum value Bk and the quantity of bits required for coding the maximum value Ak, instead of the maximum value Bk and the maximum value Ak. When the quantity of bits required for coding the maximum value Bk is greater than or equal to the quantity of bits required for coding the maximum value Ak, the $k^{th}$ type of auxiliary information of the Y first patches may be encoded directly by using the quantity of bits required for coding the maximum value Bk. The quantity of bits for coding the auxiliary information of the Y first patches does not need to be specially encoded and notified to a decoding apparatus. This further compresses a bitstream, thereby improving coding efficiency and compression performance.

Operation 24: If a quantity of bits required for coding the maximum value Bk is less than a quantity of bits required for coding the maximum value Ak, determine that a bit, corresponding to the $k^{th}$ type of auxiliary information, in first identification information is a second symbol; determine, based on the quantity of bits required for coding the maximum value Ak or the maximum value Ak, a third quantity of bits for coding the $k^{th}$ type of auxiliary information of the Y first patches; encode the third quantity of bits for coding; and encode the $k^{th}$ type of auxiliary information of the Y first patches by using the third quantity of bits for coding, where k=1, . . . , Z.

Operation 25: Encode the first identification information.

It should be noted that for operation 21, refer to the description of S601 in the embodiment shown in FIG. 7; for operation 22, refer to the description of S602; and for operation 25, refer to the description of S605. A technical principle and a technical effect thereof are similar to a technical principle and a technical effect of the embodiment shown in FIG. 7. Details are not described herein again.

In one embodiment, the encoding the third quantity of bits for coding in S604 in the embodiment shown in FIG. 7 and operation 24 may include:

directly encoding the third quantity of bits for coding.

The following provides a description by using an example.

Assuming that the third quantity of bits for coding is 6, the third quantity of bits for coding may be encoded directly by using 3 bits, and a bitstream obtained after encoding includes 0×6.

Correspondingly, on a decoder side, a decoding apparatus may parse the bitstream to obtain the third quantity of bits for coding.

The foregoing example is still used. The decoding apparatus may parse, from the bitstream, 3 bits that are assumed to be 0×6, to obtain the third quantity of bits for coding 6.

In one embodiment, the encoding the third quantity of bits for coding in S604 in the embodiment shown in FIG. 7 and operation 24 may include:

encoding a difference between the third quantity of bits for coding and the quantity of bits required for coding the maximum value Bk.

The following provides a description by using an example.

Assuming that the third quantity of bits for coding is 7, the third quantity of bits for coding is generally greater than or equal to the quantity of bits for coding required for coding the maximum value Ak, and the quantity of bits required for coding the maximum value Bk is 3, the difference between the third quantity of bits for coding and the quantity of bits required for coding the maximum value Bk is 4. The difference may be encoded by using 2 bits, and a bitstream obtained after encoding includes 0×4.

Correspondingly, on a decoder side, a decoding apparatus may obtain difference bit information from the bitstream. The difference bit information is used to indicate a difference between the quantity of bits required for coding the maximum value Ak of the $k^{th}$ type of auxiliary information of the Y first patches and the quantity of bits required for coding the maximum value Bk, where k=1, . . . , Z. Then, the third quantity of bits for coding is obtained based on the difference bit information and the quantity of bits required for coding the maximum value Bk.

The foregoing example is still used. The decoding apparatus may parse, from the bitstream, 2 bits that are assumed to be 0×4, to obtain the difference bit information 4; the obtained quantity of bits required for coding the maximum value Bk is 3. In this case, the third quantity of bits for coding 7 may be obtained based on the difference bit information 4 and the quantity 3 of bits required for coding the maximum value Bk.

It should be noted that except operation 23 and operation 24, other content of the encoding method provided in this embodiment is similar to that of the embodiment shown in FIG. 7. A technical principle and technical effects thereof are similar to those of the embodiment shown in FIG. 7. Details are not described herein again.

It should be noted that in the embodiments of this application, a correlation between point cloud data of consecutive frames is utilized, where a current frame and a previous frame of the current frame are two consecutive frames. In some implementations, two consecutive frames may also be referred to as a current frame and a reference frame of the current frame. The reference frame of the current frame may be a previous frame of the current frame or a next frame of the current frame. A patch in the current frame may be referred to as a first patch, and a patch in the reference frame may be referred to as a reference patch.

It should be noted that the previous frame or the next frame of the current frame may be a frame obtained after a sequence is adjusted. The previous frame or the next frame of the current frame is unnecessarily a previous frame or a next frame in a time sequence. For example, input to-be-processed point clouds of several frames may be a sequence obtained after a time sequence is adjusted. For example, a frame sequence in a time sequence is the first frame, the second frame, the third frame, . . . , and the seventh frame, and an adjusted sequence is changed to the first frame, the third frame, the seventh frame, the fourth frame, the fifth frame, the second frame, and the sixth frame. Assuming that the current frame is the seventh frame, a previous frame of the seventh frame in a frame sequence obtained after the sequence is adjusted is the third frame, and a next frame of the seventh frame in the frame series obtained after the sequence is adjusted is the fourth frame.

What is claimed is:

1. A point cloud data decoding method, comprising:
parsing a bitstream to obtain X groups of auxiliary information differences between auxiliary information of X first patches and auxiliary information of X reference patches that match the X first patches, wherein X represents a quantity of first patches in a current frame that includes M first patches, wherein X is less than M and, wherein both X and M are positive integers;
obtaining the auxiliary information of the X reference patches, wherein the reference patches are comprised in a reference frame of the current frame;
obtaining the auxiliary information of X first patches in the current frame based on the X groups of auxiliary information differences and the auxiliary information of the X reference patches;
wherein each auxiliary information difference comprises at least one of the following:
a difference between a height of a first patch in an occupancy map and a height of a reference patch in the occupancy map; and
a difference between a width of the first patch in the occupancy map and a width of the reference patch in the occupancy map.

2. The method according to claim 1, wherein if X<M, the method further comprises:
parsing the bitstream to obtain at least one first quantity of bits for coding, wherein each first quantity of bits for coding represents a quantity of bits required for coding a maximum value A of one type of auxiliary information, corresponding to the first quantity of bits for coding, in at least one type of auxiliary information of Y first patches, Y=M−X, and Y is a positive integer; and
obtaining the at least one type of auxiliary information of the Y first patches from the bitstream by using the at least one first quantity of bits for coding.

3. The method according to claim 1, wherein there are Z types of auxiliary information, and Z≥1, the method further comprises:
obtaining second identification information from the bitstream; and
when the second identification information includes a third symbol, determining a second quantity of bits for coding based on a maximum value Bk of a $k^{th}$ type of auxiliary information of the X first patches, and obtaining a $k^{th}$ type of auxiliary information of Y first patches from the bitstream by using the second quantity of bits for coding, wherein k=1, . . . , Z, Y=M−X, and Y is a positive integer.

4. The method according to claim 3, further comprising:
when the second identification information includes a fourth symbol, obtaining first identification information from the bitstream; and
when a bit, corresponding to the $k^{th}$ type of auxiliary information, in the first identification information includes a first symbol, determining the second quantity of bits for coding based on the maximum value Bk of the $k^{th}$ type of auxiliary information of the X first patches, and obtaining the $k^{th}$ type of auxiliary information of the Y first patches from the bitstream by using the second quantity of bits for coding, wherein k=1, . . . , Z.

5. The method according to claim 4, further comprising:
when the bit, corresponding to the $k^{th}$ type of auxiliary information, in the first identification information includes a second symbol, obtaining a third quantity of bits for coding from the bitstream, and obtaining the $k^{th}$ type of auxiliary information of the Y first patches from the bitstream by using the third quantity of bits for coding, wherein the third quantity of bits for coding represents a quantity of bits required for coding a maximum value Ak of the $k^{th}$ type of auxiliary information of the Y first patches, and k=1, . . . , Z.

6. The method according to claim 4, further comprising:
when the bit, corresponding to the $k^{th}$ type of auxiliary information, in the first identification information includes a second symbol, obtaining a difference from the bitstream, wherein the difference is a difference between a quantity of bits required for coding a maximum value Ak of the $k^{th}$ type of auxiliary information of the Y first patches and a quantity of bits required for coding the maximum value Bk, and k=1, . . . , Z;
obtaining a third quantity of bits for coding based on the difference and the quantity of bits required for coding the maximum value Bk, wherein the third quantity of bits for coding represents a quantity of bits required for coding the maximum value Ak of the $k^{th}$ type of auxiliary information of the Y first patches, and k=1, . . . , Z; and
obtaining the $k^{th}$ type of auxiliary information of the Y first patches from the bitstream by using the third quantity of bits for coding.

7. The method according to claim 1, further comprising:
parsing the bitstream to obtain matching information, wherein the matching information is used to indicate a matching relationship between the X first patches and the X reference patches; and
the obtaining of the auxiliary information of X reference patches comprises:
determining, based on the matching information, the X reference patches that correspondingly match the X first patches; and
obtaining the auxiliary information of the X reference patches.

8. The method according to claim 7, wherein the matching information comprises either of the following:
index values of the X reference patches that correspondingly match the X first patches; or
X index differences between index values of the X first patches and index values of the X reference patches that correspondingly match the X first patches.

9. The method according to claim 7, wherein the matching information comprises either of the following:
index values of the X first patches and index values of the X reference patches that correspondingly match the X first patches; or
index values of the X first patches and X index differences respectively corresponding to the X first patches, wherein the X index differences are differences between the index values of the X first patches and index values of the X reference patches that correspondingly match the X first patches.

10. The method according to claim 1, further comprising:
determining a fourth quantity of bits for coding based on M; and parsing the bitstream by using the fourth quantity of bits for coding to obtain X.

11. The method according to claim 1, wherein the auxiliary information difference further comprises at least one of the following:
a difference between a minimum X-coordinate value of a first patch of the X first patches in a three-dimensional (3D) coordinate system and a minimum X-coordinate value of a reference patch of the X reference patches in the 3D coordinate system;
a difference between a minimum Y-coordinate value of the first patch in the 3D coordinate system and a minimum Y-coordinate value of the reference patch in the 3D coordinate system;
a difference between a minimum Z-coordinate value of the first patch in the 3D coordinate system and a minimum Z-coordinate value of the reference patch in the 3D coordinate system;
a difference between a minimum X-coordinate value of the first patch in an occupancy map in a projection direction and a minimum X-coordinate value of the reference patch in the occupancy map in the projection direction; or
a difference between a minimum Y-coordinate value of the first patch in the occupancy map in the projection direction and a minimum Y-coordinate value of the reference patch in the occupancy map in the projection direction.

12. A point cloud data decoding apparatus, comprising:
a memory storing instructions; and
a processor coupled to the memory to execute the instructions to:
parse a bitstream to obtain X groups of auxiliary information differences between auxiliary information of X first patches and auxiliary information of X reference patches that match the X first patches, wherein X represents a quantity of first patches in a current frame that includes M first patches, wherein X is less than M, and wherein both X and M are positive integers;
obtain the auxiliary information of the X reference patches, wherein the reference patches are comprised in a reference frame of the current frame;
obtain the auxiliary information of X first patches in the current frame based on the X groups of auxiliary information differences and the auxiliary information of the X reference patches;
wherein each auxiliary information difference comprises at least one of the following:
a difference between a height of a first patch in an occupancy map and a height of a reference patch in the occupancy map; and
a difference between a width of the first patch in the occupancy map and a width of the reference patch in the occupancy map.

13. The decoding apparatus according to claim 12, wherein if X<M, and the processor is further configured to:
parse the bitstream to obtain at least one first quantity of bits for coding, wherein each first quantity of bits for coding represents a quantity of bits required for coding a maximum value A of one type of auxiliary information, corresponding to the first quantity of bits for coding, in at least one type of auxiliary information of Y first patches, Y=M−X, and Y is a positive integer; and obtain the at least one type of auxiliary information of the Y first patches from the bitstream by using the at least one first quantity of bits for coding.

14. The point cloud data decoding apparatus according to claim 12, wherein when X<M, there are Z types of auxiliary information, and Z≥1, the processor is further configured to:
obtain second identification information from the bitstream; and
when the second identification information includes a third symbol, determine a second quantity of bits for coding based on a maximum value Bk of a $k^{th}$ type of auxiliary information of the X first patches, and obtain a $k^{th}$ type of auxiliary information of Y first patches from the bitstream by using the second quantity of bits for coding, wherein k=1, . . . , Z, Y=M−X, and Y is a positive integer.

15. The point cloud data decoding apparatus according to claim 14, wherein the processor is further configured to:
when the second identification information includes a fourth symbol, obtain first identification information from the bitstream;
when a bit, corresponding to the $k^{th}$ type of auxiliary information, in the first identification information includes a first symbol, determine the second quantity of bits for coding based on the maximum value Bk of the $k^{th}$ type of auxiliary information of the X first patches, and obtain the $k^{th}$ type of auxiliary information of the Y first patches from the bitstream by using the second quantity of bits for coding, wherein k=1, . . . , Z.

16. The point cloud data decoding apparatus according to claim 15, wherein the processor is further configured to:
when the bit, corresponding to the $k^{th}$ type of auxiliary information, in the first identification information includes a second symbol, obtain a third quantity of bits for coding from the bitstream, and obtain the $k^{th}$ type of auxiliary information of the Y first patches from the bitstream by using the third quantity of bits for coding, wherein the third quantity of bits for coding represents a quantity of bits required for coding a maximum value Ak of the $k^{th}$ type of auxiliary information of the Y first patches, and k=1, . . . , Z.

17. The point cloud data decoding apparatus according to claim 15, wherein the processor is further configured to:
when the bit, corresponding to the $k^{th}$ type of auxiliary information, in the first identification information includes a second symbol, obtain a difference from the bitstream, wherein the difference is a difference between a quantity of bits required for coding a maximum value Ak of the $k^{th}$ type of auxiliary information of the Y first patches and a quantity of bits required for coding the maximum value Bk, and k=1, . . . , Z;
obtain a third quantity of bits for coding based on the difference and the quantity of bits required for coding the maximum value Bk, wherein the third quantity of bits for coding represents a quantity of bits required for coding the maximum value Ak of the $k^{th}$ type of auxiliary information of the Y first patches, and k=1, . . . , Z; and
obtain the $k^{th}$ type of auxiliary information of the Y first patches from the bitstream by using the third quantity of bits for coding.

18. The point cloud data decoding apparatus according to claim 12, wherein the processor is further configured to:

parse the bitstream to obtain matching information, wherein the matching information is used to indicate a matching relationship between the X first patches and the X reference patches;

determine, based on the matching information, the X reference patches that correspondingly match the X first patches; and obtain the auxiliary information of the X reference patches.

19. The point cloud data decoding apparatus according to claim 18, wherein the matching information comprises either of the following:

index values of the X reference patches that correspondingly match the X first patches; or X index differences, wherein the X index differences are differences between index values of the X first patches and index values of the X reference patches that correspondingly match the X first patches.

20. The point cloud data decoding apparatus according to claim 18, wherein the matching information comprises either of the following:

index values of the X first patches and index values of the X reference patches that correspondingly match the X first patches; or index values of the X first patches and X index differences respectively corresponding to the X first patches, wherein the X index differences are differences between the index values of the X first patches and index values of the X reference patches that correspondingly match the X first patches.

21. The point cloud data decoding apparatus according to claim 12, wherein the processor is further configured to:

determine a fourth quantity of bits for coding based on M; and parse the bitstream by using the fourth quantity of bits for coding, to obtain X.

22. The point cloud data decoding apparatus according to claim 12, wherein the auxiliary information difference comprises at least one of the following:

a difference between a minimum X-coordinate value of a first patch of the X first patches in a three-dimensional (3D) coordinate system and a minimum X-coordinate value of a reference patch of the X reference patches in the 3D coordinate system;

a difference between a minimum Y-coordinate value of the first patch in the 3D coordinate system and a minimum Y-coordinate value of the reference patch in the 3D coordinate system;

a difference between a minimum Z-coordinate value of the first patch in the 3D coordinate system and a minimum Z-coordinate value of the reference patch in the 3D coordinate system;

a difference between a minimum X-coordinate value of the first patch in an occupancy map in a projection direction and a minimum X-coordinate value of the reference patch in the occupancy map in the projection direction; or a difference between a minimum Y-coordinate value of the first patch in the occupancy map in the projection direction and a minimum Y-coordinate value of the reference patch in the occupancy map in the projection direction.

* * * * *